United States Patent
Marwitz et al.

(10) Patent No.: US 7,588,612 B2
(45) Date of Patent: Sep. 15, 2009

(54) MOBILE NITROGEN GENERATION DEVICE

(75) Inventors: Herman Theodore Marwitz, Riverside, CA (US); Terry Wheaton, Corona, CA (US); Brian Chung, Mission Viejo, CA (US); David Scheierl, Corona, CA (US); James Yang, Santa Ana, CA (US); Keith Michael, West Chester, PA (US)

(73) Assignee: Bank of America, N.A., McLean, VA (US)

( * ) Notice: Subject to any disclaimer, the term of this patent is extended or adjusted under 35 U.S.C. 154(b) by 224 days.

(21) Appl. No.: 11/489,698

(22) Filed: Jul. 19, 2006
(Under 37 CFR 1.47)

(65) Prior Publication Data

US 2007/0151454 A1 Jul. 5, 2007

Related U.S. Application Data

(60) Provisional application No. 60/700,672, filed on Jul. 19, 2005, provisional application No. 60/812,843, filed on Jun. 12, 2006.

(51) Int. Cl.
*B01D 53/22* (2006.01)
(52) U.S. Cl. .................................. 55/356; 55/485; 96/7
(58) Field of Classification Search .................... 55/315, 55/315.1, 356, 485, 490; 96/4, 7–9, 108, 96/134; 95/47
See application file for complete search history.

(56) References Cited

U.S. PATENT DOCUMENTS 2,617,275 A 11/1952 Goff et al.
3,925,037 A * 12/1975 Ward et al. ........................ 96/5
3,979,190 A * 9/1976 Hedman ........................... 96/7
4,176,069 A * 11/1979 Metz et al. ............. 210/321.75
4,239,728 A * 12/1980 Stenberg et al. ............... 422/46
4,595,405 A 6/1986 Agrawal et al.
4,695,380 A * 9/1987 Hilgendorff et al. ........ 210/347
4,871,379 A * 10/1989 Edwards .......................... 96/8
5,256,172 A 10/1993 Keefer
5,284,506 A 2/1994 Barbe
5,425,801 A 6/1995 Prasad
5,438,841 A 8/1995 Cahill-O'Brien et al.
5,470,379 A 11/1995 Garrett
5,536,405 A * 7/1996 Myrna et al. ........... 210/321.75
5,588,984 A 12/1996 Verini
5,688,306 A 11/1997 Verini
5,711,916 A 1/1998 Riggs et al.

(Continued)

OTHER PUBLICATIONS

Brooks, Kenneth. *Lindes' Membranes: Top of the heap?*, Chemical Week, 29 (Jun. 8, 1998).

(Continued)

*Primary Examiner*—Frank M Lawrence
(74) *Attorney, Agent, or Firm*—Knobbe Martens Olson & Bear LLP

(57) ABSTRACT

A mobile inert gas generator can include various components supported by a wheeled vehicle. The generator can include a feed air compressor, a separation device for separating an inert gas from a feed air gas, and a booster compressor, each of which can have various sensors and actuators for controlling the operation thereof. An electronic control system can be connected to the sensors and actuators to allow for convenient operation of the generator. The electronic control system can include a control panel disposed in a cab.

12 Claims, 44 Drawing Sheets

U.S. PATENT DOCUMENTS

| | | | |
|---|---|---|---|
| 5,829,272 | A | 11/1998 | Barry |
| 5,837,032 | A | 11/1998 | Moll et al. |
| 5,839,886 | A | 11/1998 | Shaw |
| 5,840,098 | A | 11/1998 | Barbe et al. |
| 5,976,221 | A | 11/1999 | Bowman et al. |
| 5,989,312 | A | 11/1999 | Barnhard et al. |
| 6,256,994 | B1 | 7/2001 | Dillon, IV |
| 6,273,936 | B1 | 8/2001 | Barry et al. |
| 6,315,814 | B1 | 11/2001 | Barry et al. |
| 6,345,493 | B1 | 2/2002 | Smith et al. |
| 6,502,421 | B2 | 1/2003 | Kotliar |
| 6,729,359 | B2 | 5/2004 | Jones |
| 6,764,787 | B2 * | 7/2004 | Grasso et al. .............. 429/38 |
| 7,303,681 | B2 * | 12/2007 | Sabottke et al. ............. 210/653 |

OTHER PUBLICATIONS

Brooks, Kenneth. *A Low-cost Way to Recover Nitrogen,* Chemical Week, 26 (Apr. 30, 1986).

Brooks, Kenneth. *Membranes Take Aim at Nitrogen Separation,* Chemical Week, 32 (Mar. 27, 1985).

Engineering. *Vying for a U.S. Foothold Among Air Separators,* Chemical Week, 26 (Feb. 23, 1983).

Markets Newsletter, *Praxiar Gets Dupont Awar,* Chemical Week, 43 (Apr. 21, 1993).

Technology Newsletter, *A Carbon Molecular Sieve for Air Separation,* Chemical Week, 60 (Apr. 23, 1996).

* cited by examiner

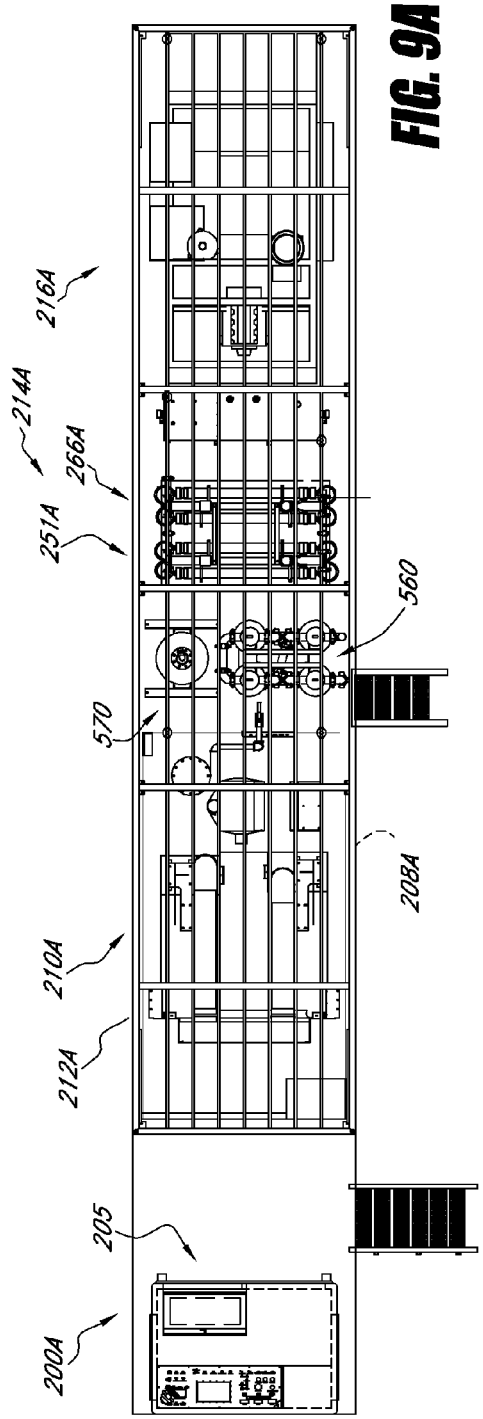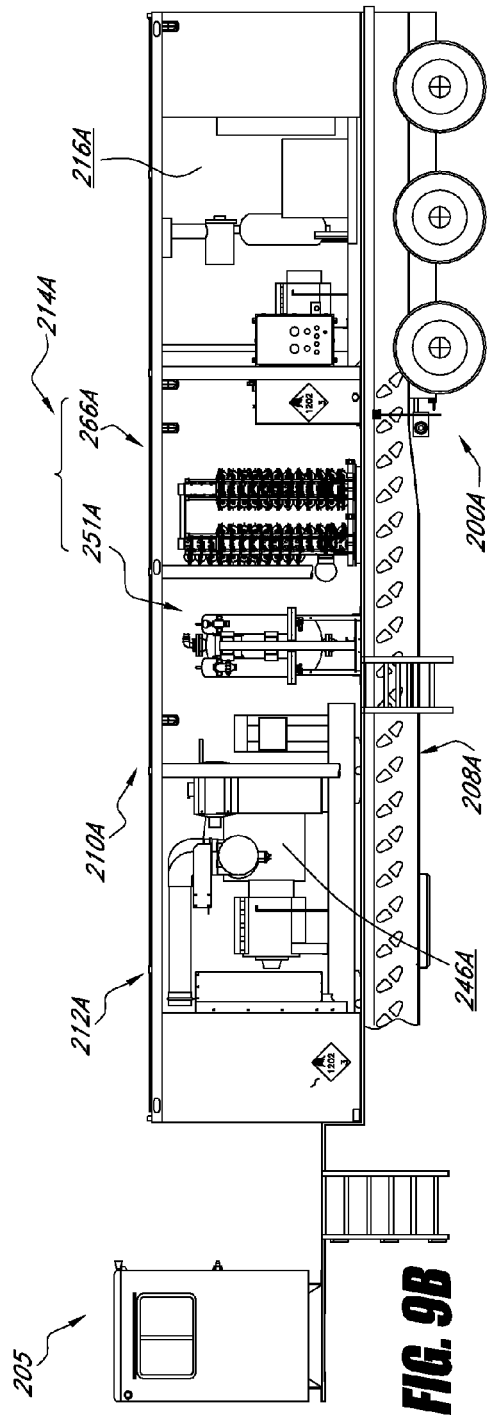

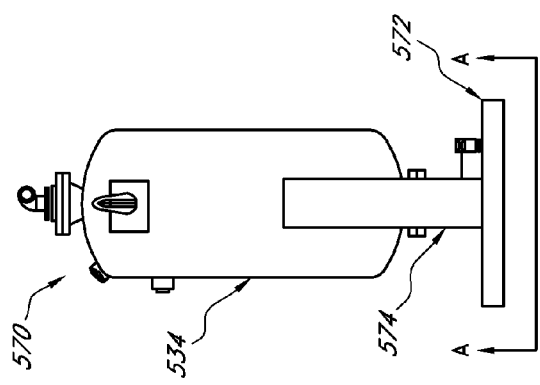
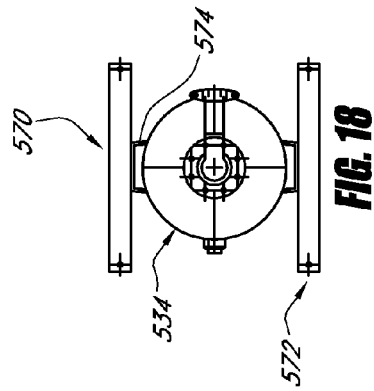
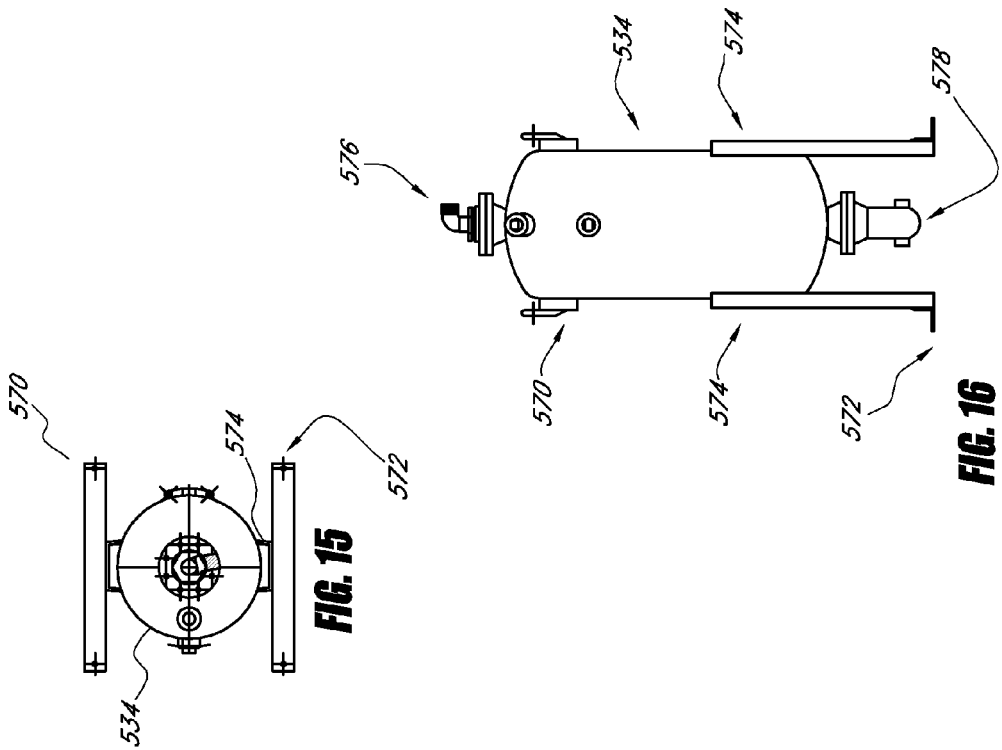

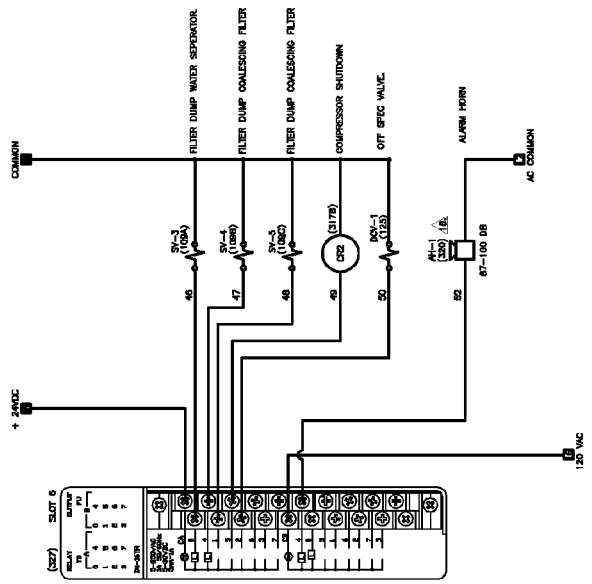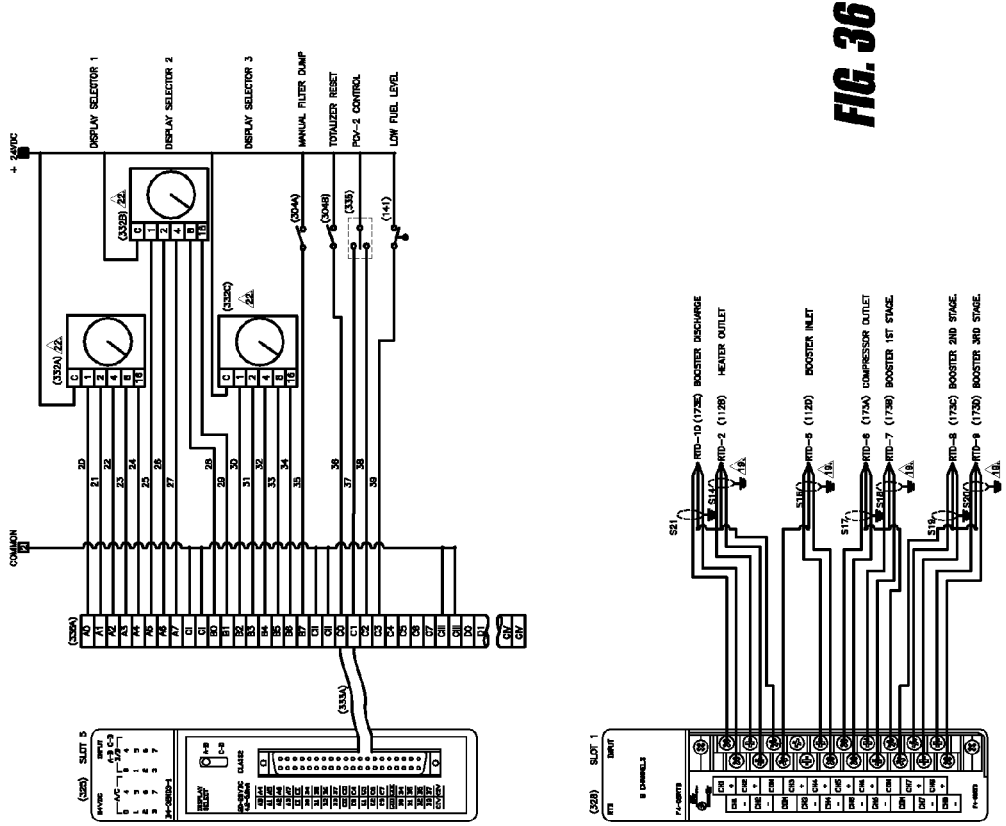
FIG. 36

| ALL DEVICES | | | |
|---|---|---|---|
| MEMBRANE INLET TEMP DEGREES F | BOOSTER DISCHARGE PRESSURE | NITROGEN FLOW SM3/MIN | N2 % PURITY |
| -83648 | -83648 | -8364.8 | -8364.8 |
| HEATER OUTLET TEMP DEGREES F | BOOSTER INLET PRESSURE | FLOW TOTAL SM3 | BOOSTER DISCHARGE TEMPERATURE DEGREES F |
| -83648 | -83648 | -83648 | -83648 |
| HEATER INLET TEMP DEGREES F | COMP DISCHARGE PRESSURE | COMPRESSOR OUTLET TEMPERATURE DEGREES F | BOOSTER 1ST STAGE TEMPERATURE DEGREES F |
| -83648 | -83648 | -83648 | -83648 |
| BOOSTER INLET TEMPERATURE DEGREES F | BOOSTER 1ST STAGE PRESSURE | BOOSTER OIL PRESSURE | BOOSTER 2ND STAGE TEMPERATURE DEGREES F |
| -83648 | -83648 | -83648 | -83648 |
| BOOSTER 2ND STAGE PRESSURE | BOOSTER 3RD STAGE TEMPERATURE | SILENCE | PREV |
| -83648 | -83648 | SYSTEM CONFIG | CALIBRATION | LOG OUT |

FIG. 44

| TIME & DATE | | | PASSWORD MANAGEMENT | |
|---|---|---|---|---|
| DD-MM-YY | HH:MM | 1= SUNDAY 7=SATURDAY | MANAGER | ENGINEER |
| 02-NOV-05 | 10:48 | Dynamic Text | | |
| DAY | HOUR | DAY OF THE WEEK | METEROLOGY | OPERATOR |
| MONTH | MINUTES | | | |
| YEAR | | | STRT SCRM OFF | |

| SYSTEM STATUS | | |
|---|---|---|
| PLC BATTERY VOLTAGE | T/S HOUR METER | RIG FLOW TOTAL SM3 |
| 0.0 | 0 | -2147483648 |

| Alarm History | Off Spec Control On | TEMPERATURE CONTROLS | EXIT |

FIG. 45

| DEVICE SELECTION ||||
|---|---|---|---|
| BOOSTER INLET PRESSURE (117A) | BOOSTER DISCHARGE PRESSURE (128) | NITROGEN FLOWMETER (127) | O2 SENSOR (124) |
| BOOSTER 1ST STAGE PRESSURE (171) | BOOSTER 2ND STAGE PRESSURE (172) | COMPRESSOR DISCHARGE PRESSURE (117B) | BOOSTER OIL PRESSURE (117C) |
| BOOSTER DISCHARGE TEMPERATURE (173E) | HEATER OUTLET TEMPERATURE (112B) | TOUCH SCREEN TEMPERATURE (334) | BOOSTER INLET TEMPERATURE (112D) |
| COMPRESSOR OUTLET TEMPERATURE (173A) | BOOSTER 1ST STAGE TEMPERATURE (173B) | BOOSTER 2ND STAGE TEMPERATURE (173C) | BOOSTER 3RD STAGE TEMPERATURE (173D) |
| HEATER INLET TEMPERATURE (112A) | MEMBRANE INLET TEMPERATURE (112C) | | |
| | | | EXIT |

*FIG. 48*

| DEVICE SETTINGS | | |
|---|---|---|
| DATE OF LAST CAL DD-MM-YY | DEVICE FS ACCURACY | OPERATOR NAME |
| 00 00 00 | 0.000 | TEXT ENTRY |
| CALIBRATION DUE DD-MM-YY | DEVICE MINIMUM | SENSOR SERIAL NUMBER |
| 00 00 00 | 0.0 | TEXT ENTRY |
| CALIBRATION INTERVAL MONTHS | DEVICE FULL SCALE | |
| 1 | 0.0 | ACCEPT  EXIT |

FIG. 49

| O2 SENSOR | | |
|---|---|---|
| ALL MEASUREMENTS ARE % N2 | | |
| DEVICE FS ACCURACY | RAW SIGNAL DATA | CALIBRATED ZERO |
| -1.000e+10 | -1.0e+10 | 0.0 |
| DEVICE MINIMUM | DEVICE CALIBRATED DATA | CALIBRATED MID |
| -1.0e+10 | -1e+10 | 0.0 |
| DEVICE FULL SCALE | CALIBRATION INTERVAL | CALIBRATED FULL |
| -1.0e+10 | 0 | 0.0 |
| | | ACCEPT  EXIT |

FIG. 50

FLOW DEVICE CALIBRATION
ALL MEASUREMENTS ARE IN SM3/MIN

| DEVICE FS ACCURACY | RAW SIGNAL DATA | CALIBRATED ZERO |
|---|---|---|
| -1.000e+10 | -1.0e+10 | 0.0 |
| DEVICE MINIMUM | DEVICE CALIBRATED DATA | CALIBRATED MID |
| -1.0e+10 | -1e+10 | 0.0 |
| DEVICE FULL SCALE | CALIBRATION INTERVAL | CALIBRATED FULL |
| -1.0e+10 | 0 | 0.0 |

ACCEPT  EXIT

FIG. 51

PRESSURE DEVICE CALIBRATION
ALL MEASUREMENTS ARE IN PSI

| DEVICE FS ACCURACY | RAW SIGNAL DATA | CALIBRATED ZERO |
|---|---|---|
| -1.000e+10 | -1.0e+10 | 0.0 |
| DEVICE MINIMUM | DEVICE CALIBRATED DATA | CALIBRATED MID |
| -1.0e+10 | -1e+10 | 0.0 |
| DEVICE FULL SCALE | CALIBRATION INTERVAL | CALIBRATION FULL |
| -1.0e+10 | 0 | 0.0 |

ACCEPT  EXIT

FIG. 52

| TEMPERATURE DEVICE CALIBRATION | | |
|---|---|---|
| ALL MEASUREMENTS ARE IN °F | | |
| DEVICE FS ACCURACY | RAW SIGNAL DATA | CALIBRATED ZERO |
| -1.000e+10 | -1.0e+10 | 0.0 |
| DEVICE MINIMUM | DEVICE CALIBRATED DATA | CALIBRATED MID |
| -1.0e+10 | -1.0e+10 | 0.0 |
| DEVICE FULL SCALE | CALIBRATION INTERVAL | CALIBRATED FULL |
| -1.0e+10 | 0 | 0.0 |

FIG. 53

MOBILE NITROGEN GENERATION DEVICE

PRIORITY INFORMATION

The present application claims priority to U.S. Provisional Application Ser. No. 60/700,672, filed Jul. 19, 2005 and U.S. Provisional Application Ser. No. 60/812,843, filed Jun. 12, 2006, the entire contents of both of which is hereby expressly incorporated by reference.

BACKGROUND OF THE INVENTIONS

1. Field of the Inventions

The present inventions are directed to systems and methods for generating inert gas, and more particularly, systems and methods for producing inert gas on a mobile platform.

2. Description of the Related Art

In the art of drilling, such as drilling for oil or natural gas, inert gases are commonly used for numerous purposes. Typically, inert gases are often used to displace oxygen from the volume of space above a liquid surface in a storage tank used for storing flammable substances, such as, for example, crude oil.

Additionally, inert gases are often used to suppress fire or explosion and prevent corrosion during a drilling operation. For example, an inert gas such as nitrogen, can be injected into a borehole during a drilling operation to prevent ignition of substances within the borehole and to prevent corrosion of the drill bit.

SUMMARY OF THE INVENTIONS

In accordance with at least one of the embodiments disclosed herein, a system can be configured to separate nitrogen from atmospheric air. The system can comprise a feed air compressor unit having a screw compressor with an inlet and outlet driven by an air/fuel engine so as to compress atmospheric air to a pressure of at least 200 psi at the outlet of the screw compressor. A filtration assembly can comprise at least first, second, third, and fourth coalescence filters supported on a filter frame, the first, second, and third coalescence filtered being connected in series with an inlet of the first coalescence filter connected to the outlet of the screw compressor, the first, second, third, and fourth coalescence filters disposed adjacent to each other on the filter frame. A carbon tower filter can have an inlet communicating with an outlet of the carbon tower filter and can be connected to an inlet of the fourth coalescence filter. The carbon tower filter can also be disposed in a position that is not spatially between the third and fourth coalescence filters. A heater device can have an inlet connected to an outlet of the third coalescence filter and an outlet connected to an inlet of the carbon tower filter. A membrane separation assembly can have a plurality of membrane separation devices arranged in at least first and second vertical stacks, at least first and second vertical members supporting the first and second vertical stacks, at least the first vertical member defining either an inlet or an outlet manifold of a plurality of the membrane separation devices, an inlet of the membrane separation assembly being connected to an outlet of the fourth coalescence filter and being configured to distribute a filtered gas from the fourth coalescence filter to inlets of a plurality of the membrane separation devices. The heater device can be supported by at least one of the first and second vertical members. A booster compressor can have an inlet connected to an outlet of the membrane separation assembly and can be configured to raise a pressure of nitrogen rich gas discharged from the membrane separation assembly.

The booster compressor can also have an engine driving a compressor device having an outlet. The compressor device can be configured to raise a pressure of the nitrogen rich gas to at least 1000 psi. Additionally, a control can have an electronic control system comprising at least a first sensor configured to detect an operational parameter of the feed air compressor, at least a second sensor being configured to detect an operational parameter of the membrane separation assembly, and at least a third sensor configured to detect an operational parameter of the booster compressor. The electronic control system can further comprise an electronic control unit connected to the first second and third sensors and can be configured to allow an operator of the electronic control system to monitor the output of the first, second, and third sensors. A wheeled vehicle can support the feed air compressor, the filtration assembly, the carbon tower filter, the heater device, the membrane separation assembly, the booster compressor, and the control cab.

In accordance with at least one of the embodiments disclosed herein, a system can be configured to separate an inert gas from atmospheric air. The system can comprise a wheeled vehicle comprising at least one pair of wheels, a feed air compressor and a booster compressor, the feed air compressor and the booster compressor being disposed on opposite sides of the at least one pair of wheels, in the longitudinal direction of the wheeled vehicle.

In accordance with at least one of the embodiments disclosed herein a system can be configured to separate nitrogen from atmospheric air. The system can comprise a filter assembly comprising at least first and second coalescence filters supported on the first filter support assembly, the first and second coalescence filters being disposed adjacent to each other. Additionally, a carbon tower filter device can have an inlet connected to an outlet of the first coalescence filter and can have an outlet connected to an inlet of the second coalescence filter, the carbon tower being disposed in a position that is not spatially between the first and second coalescence filters.

In accordance with at least one of the embodiments disclosed herein a system can be configured to separate a component gas from atmospheric air. The system can comprise a plurality of membrane separation devices supported by at least first and second generally vertical members, wherein at least one of the generally vertical members define an intake or discharge manifold for the plurality of membrane separation devices.

In accordance with at least one of the embodiments disclosed herein a system can be configured for separating and inert gas from atmospheric air. The system can comprise at least a first compressor. At least a first separation device can be configured to separate the inert gas from atmospheric air, the first separation device being connected to the first compressor. An electronic control system can be configured to control an operation of at least the first compressor. The control system can also comprise at least one sensor configured to detect an operational parameter of the first compressor and at least a second sensor configured to detect an operational parameter of the first separation device. A wheeled vehicle clone support the first compressor, the first separation device, and the electronic control system. Additionally, a third sensor that is not supported by the wheeled vehicle can be configured to detect a parameter external to the system.

In accordance with at least one of the embodiments disclosed herein, a system can be configured to separate an inert gas from atmospheric air. The system can comprise a feed air compressor configured to compress and thereby raise a pressure of atmospheric air. A separation device can be configured to separate the inert gas from the pressurized atmospheric air from the feed air compressor. A booster compressor can be configured to raise a pressure of the inert gas from the separation device. At least a first sensor can be configured to detect an operational parameter of the feed air compressor. At least a second sensor can be configured to detect an operational parameter related to the operation of the separation device. At least a third sensor can be configured to detect an operational parameter of the booster compressor. Additionally, an electronic control system can be connected to the first, second, and third sensors. The electronic control system can comprise a display device configured to display a graphical user interface having at least first, second, and third screens. The first screen can include a plurality of data related to the operation of the feed air compressor including data indicative of the output of the first sensor. The second screen can include a plurality of data related to the operation of the separation device including data indicative of the output of the second sensor. Additionally, the third screen can include a plurality of data related to the operation of the booster compressor including data indicative of the output of the third sensor.

In accordance with at least one of the embodiments disclosed herein, a system can be configured to separate an inert gas from atmospheric air. The system can comprise a feed air compressor subsystem configured to pressurize atmospheric air. A filter subsystem can be configured to filter the pressurized air from the feed air compressor. A separation subsystem can be configured to separate an inert gas from the pressurized atmospheric air from the feed air compressor. A booster compressor subsystem can be configured to raise a pressure of an inert gas discharged from the separation subsystem. A lubricant circulation subsystem can be configured to circulate lubricant and from at least one of the feed air compressor subsystem and the booster compressor subsystem to at least one of the filter subsystem and the separation subsystem. A wheeled vehicle can support the feed air compressor subsystem, the filter subsystem, the separation subsystem, the booster compressor subsystem, and the lubricant circulation subsystem.

In accordance with at least one of the embodiments disclosed herein, a system can be configured to separate inert gas from atmospheric air. The system can comprise a feed air compressor having an air fuel engine and an exhaust discharge configured to guide exhaust gases away from the air fuel engine. The feed air compressor can have an inlet connected to the exhaust discharge and can be configured to exhaust gas from the exhaust discharge. A separation assembly can be configured to separate an inert gas from the pressurized exhaust gas from the booster compressor. A booster compressor can be configured to raise a pressure of the inert gas from the separation assembly. A wheeled vehicle can support the feed air compressor, the separation assembly, and the booster compressor.

Figure 6:
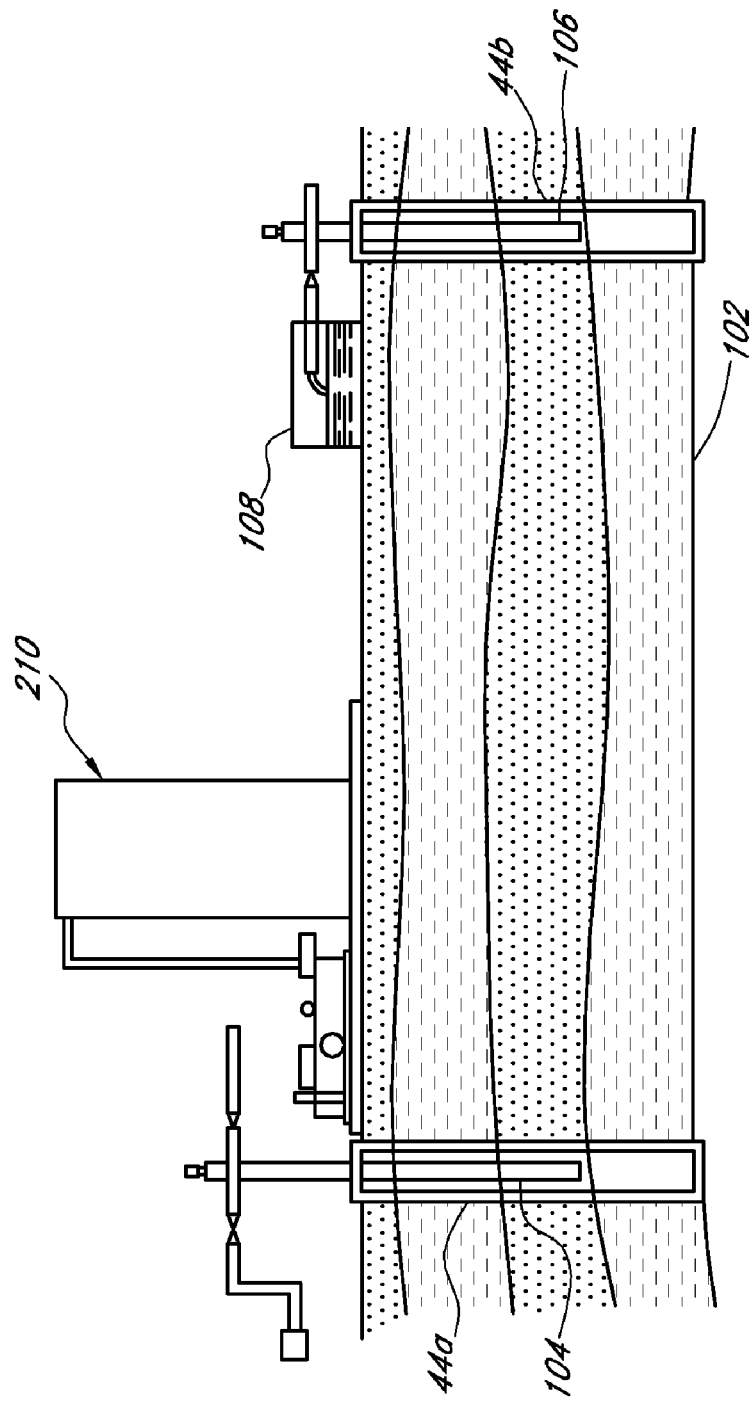
FIG. 6 is a cross-sectional schematic view of a reservoir and the injection of an inert rich gas to remove gas and/or oil from the reservoir.
Figure 6A:
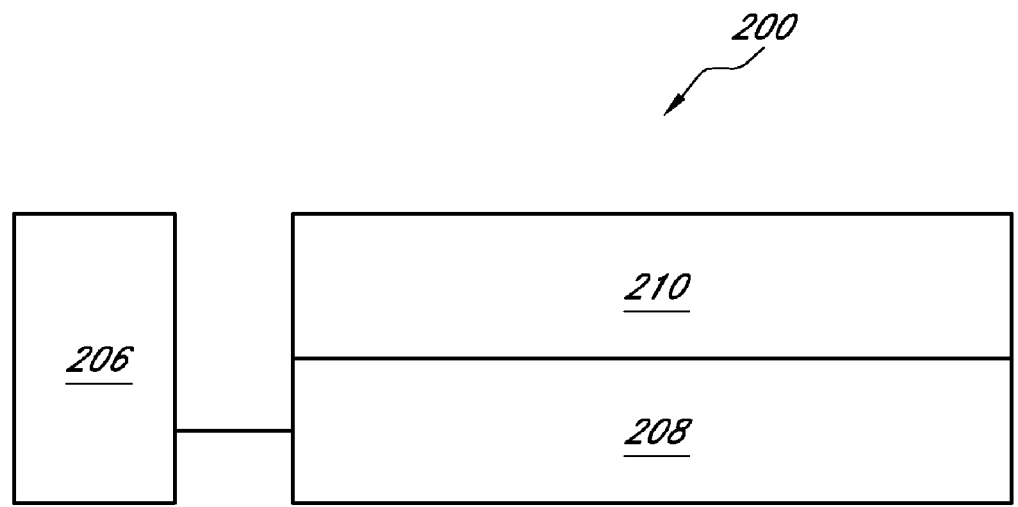

The above-mentioned and the other features of the inventions disclosed herein are described below with reference to the drawings of the preferred embodiments. The illustrated embodiments are intended to illustrate, but not to limit the inventions. The drawings contain the following figures:

FIG. 6A is a schematic diagram of a mobile inert gas separation system.

Figure 7:
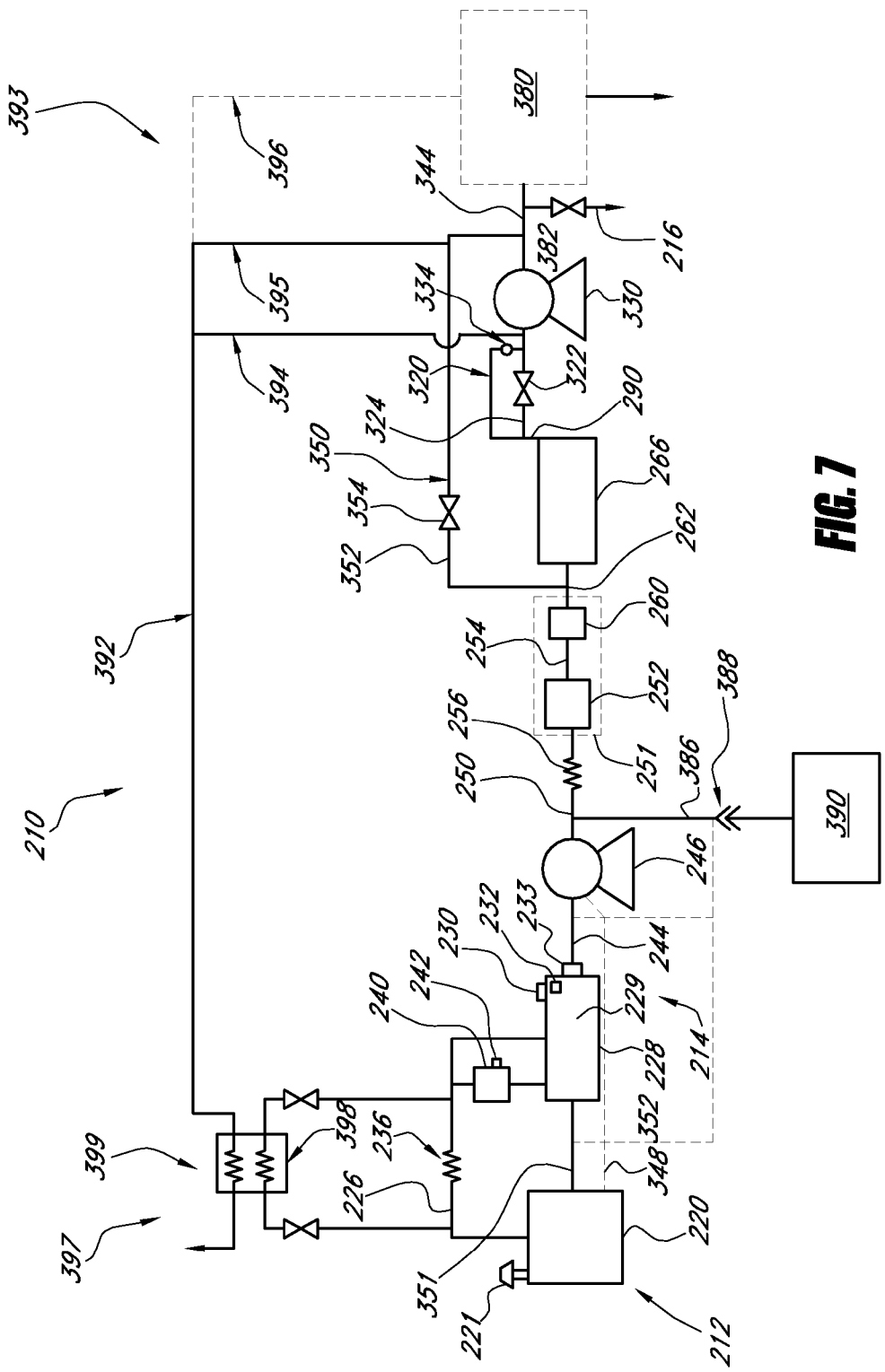

FIG. 7 is a schematic diagram of an embodiment of an inert gas separation system in which air or exhaust from an engine is subjected to a separation process to separate inert gas therefrom.

Figure 7A:
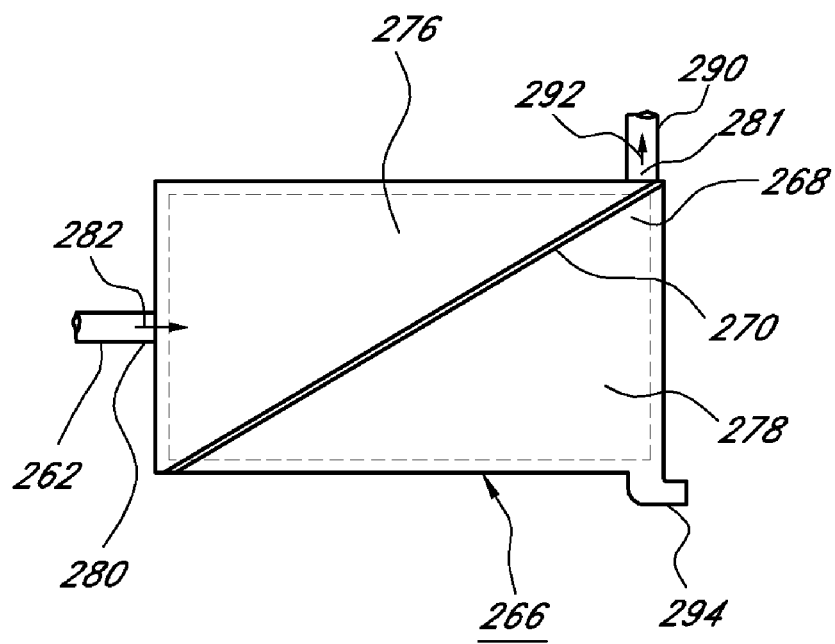

FIG. 7A is a schematic illustration of an embodiment of the separation system of FIG. 7.

Figure 7B:
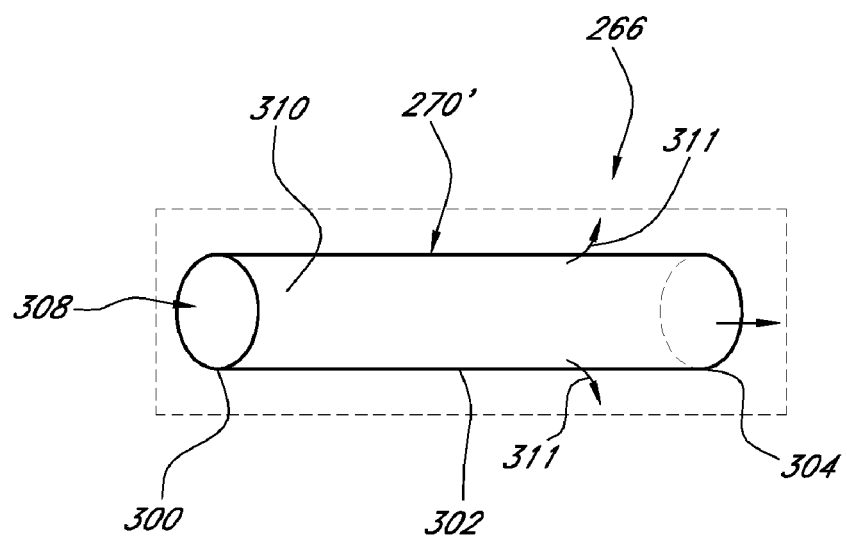

FIG. 7B is a schematic illustration of an embodiment of the separation system of FIG. 7.

Figure 7C:
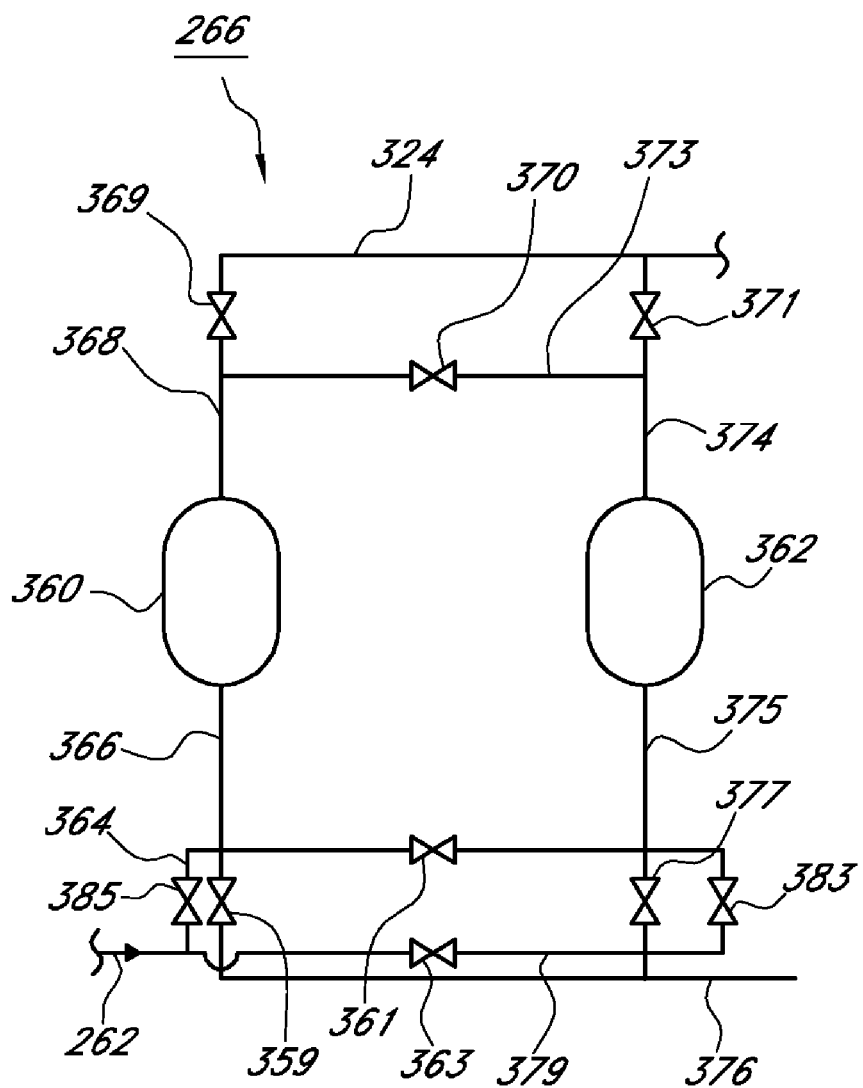

FIG. 7C is a schematic illustration of another embodiment of the separation system of FIG. 7.

Figure 7D:
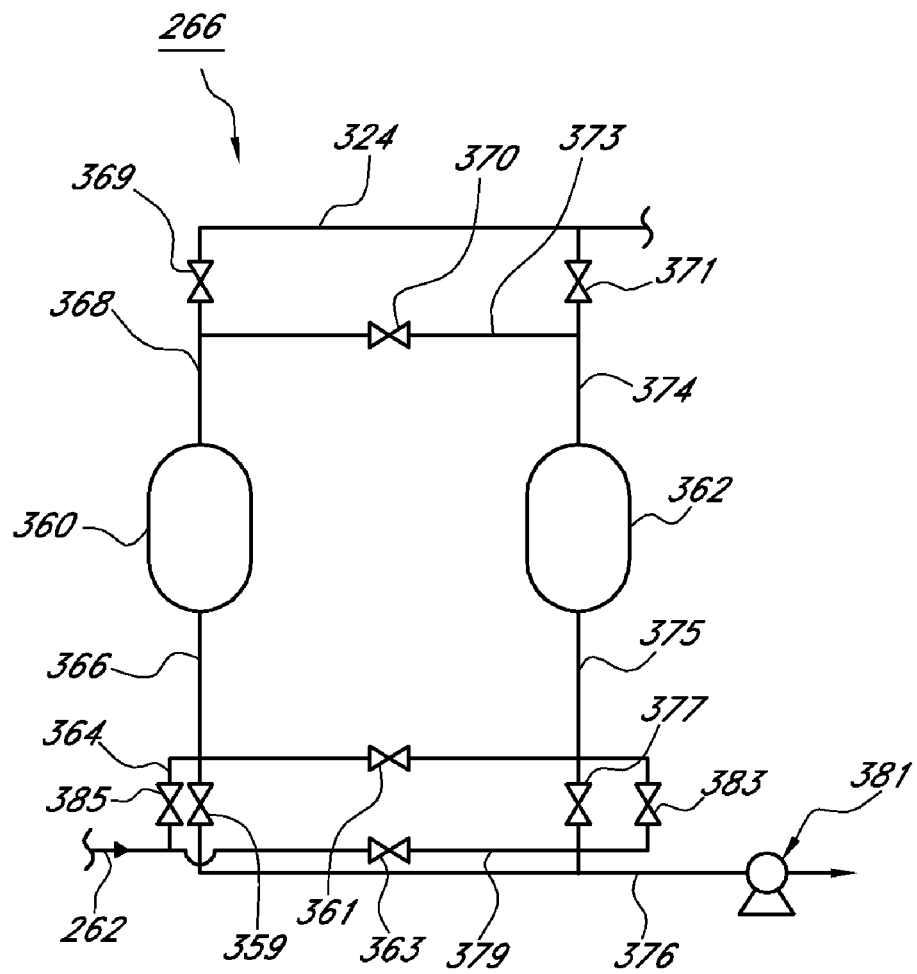

FIG. 7D is a schematic illustration of yet another embodiment of the separation system of FIG. 7.

Figure 7E:
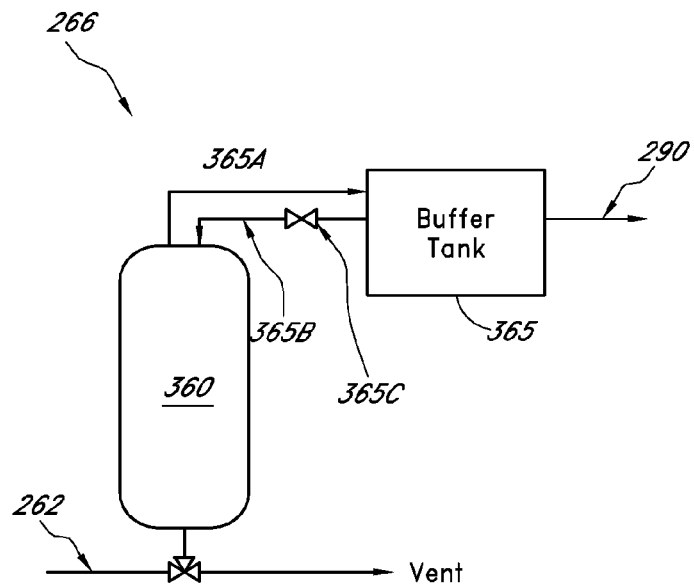

FIG. 7E is a schematic illustration of a further embodiment of the separation system of FIG. 7 and can include a single bed pressure swing adsorption system with a buffer tank.

Figure 7F:
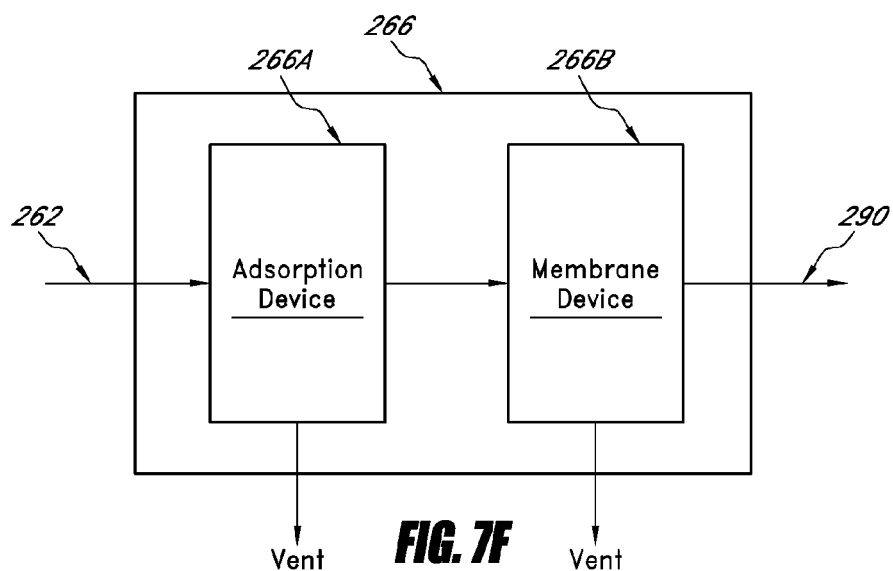

FIG. 7F is a schematic illustration of another embodiment of the separation system of FIG. 7 and can include a combination of adsorption and/or membrane separation units.

Figure 7G:
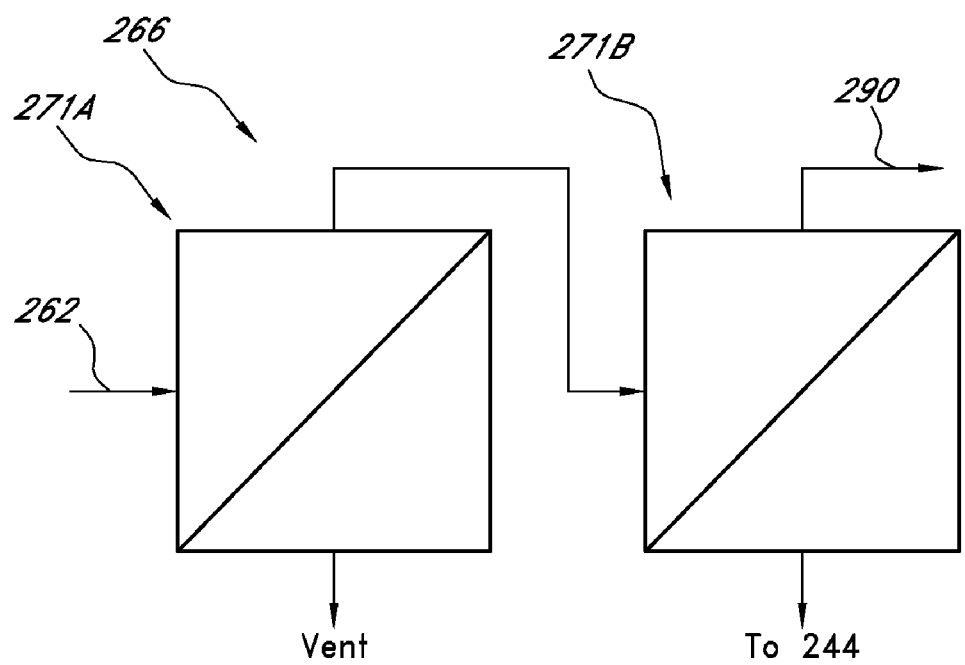

FIG. 7G is a schematic illustration of yet another embodiment of the separation system of FIG. 7 and can include multiple membrane separation units.

Figure 7H:
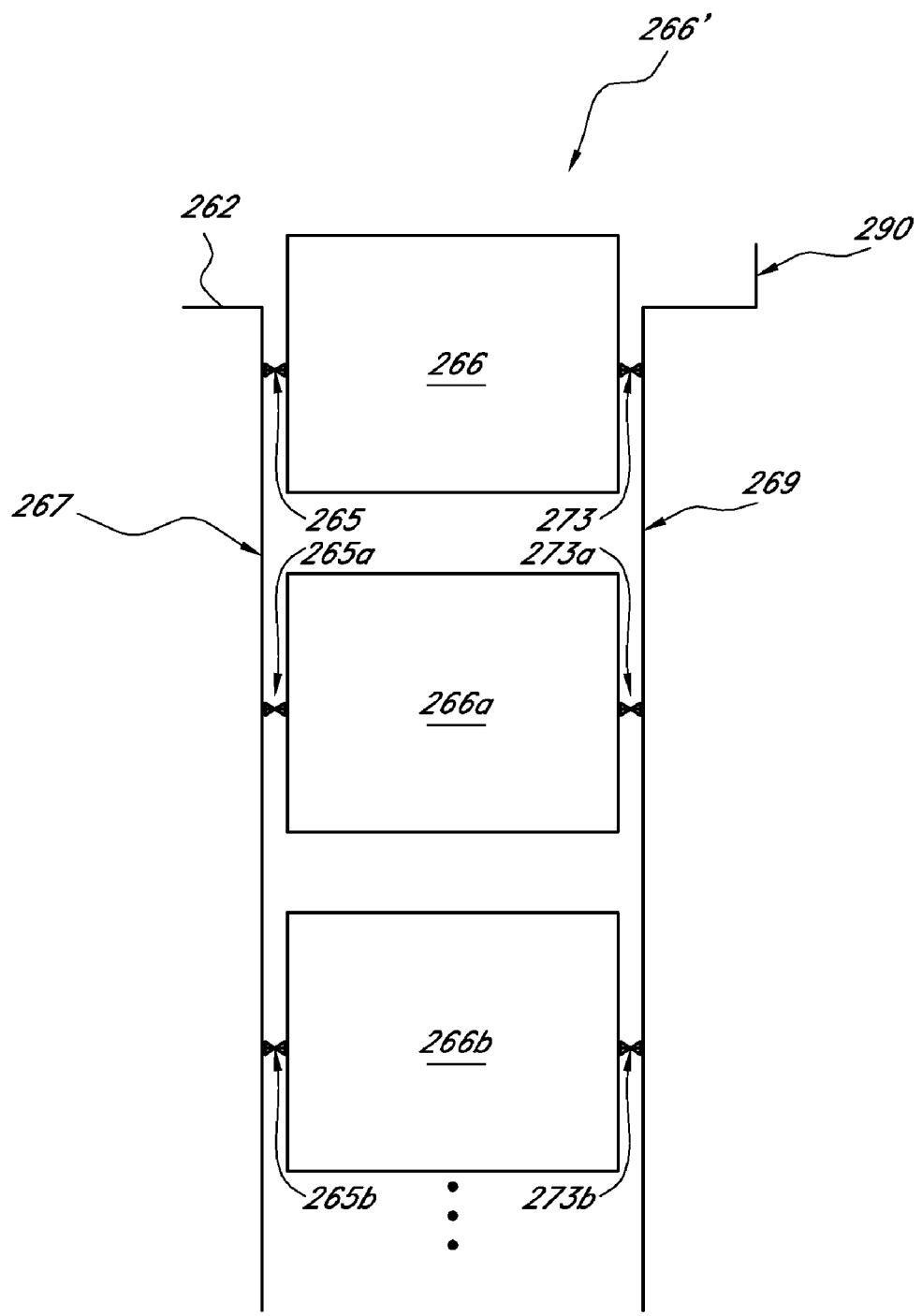

FIG. 7H is a schematic illustration of a further embodiment of the separation system of FIG. 7.

Figure 8:
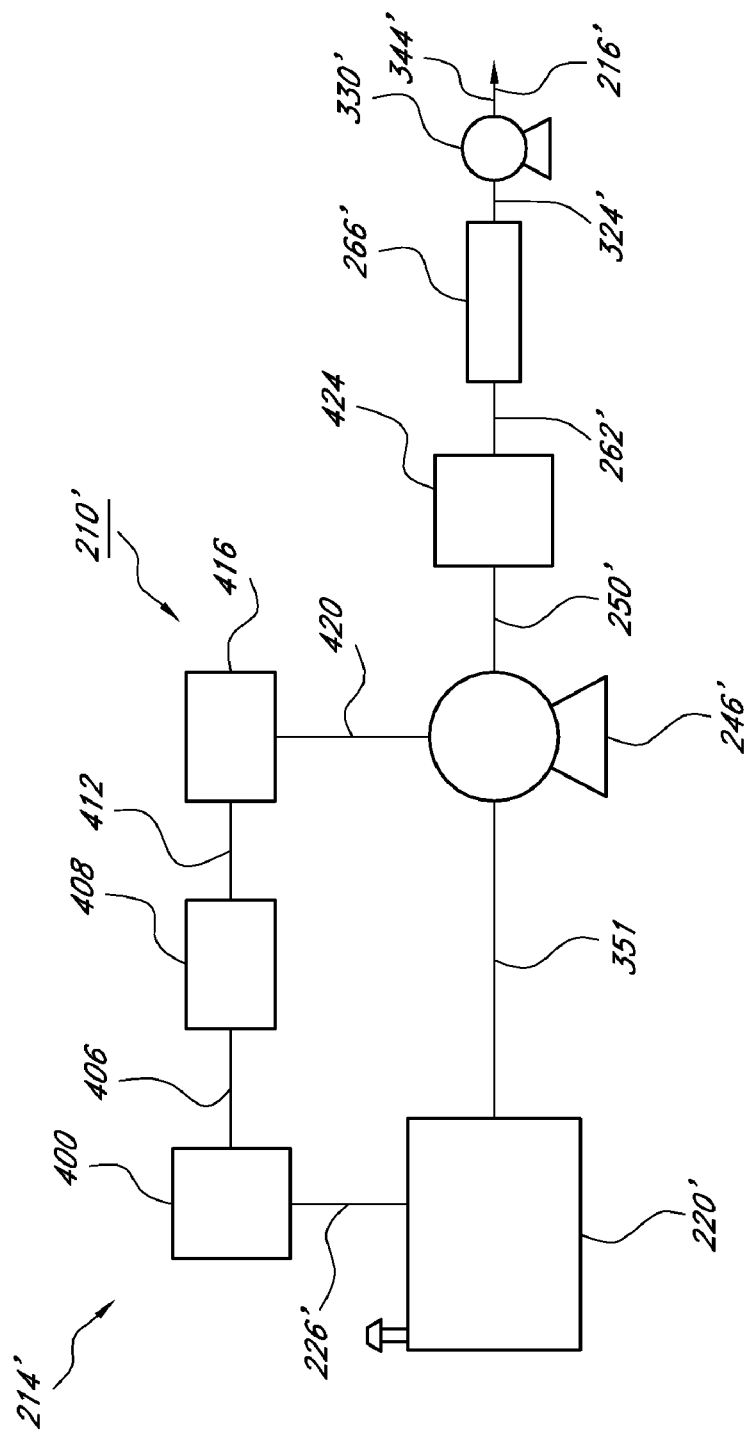

FIG. 8 is a schematic diagram of another embodiment in which air or exhaust from an engine is subjected to a separation process to produce inert rich gas therefrom.

FIG. 9A is a top plan view of a mobile inert gas separation system mounted on a trailer, which can include any of the above described separation systems, the trailer being configured to be towed over the road by a towing vehicle.

FIG. 9B is a side elevational view of the system shown in FIG. 9A.

Figure 10:
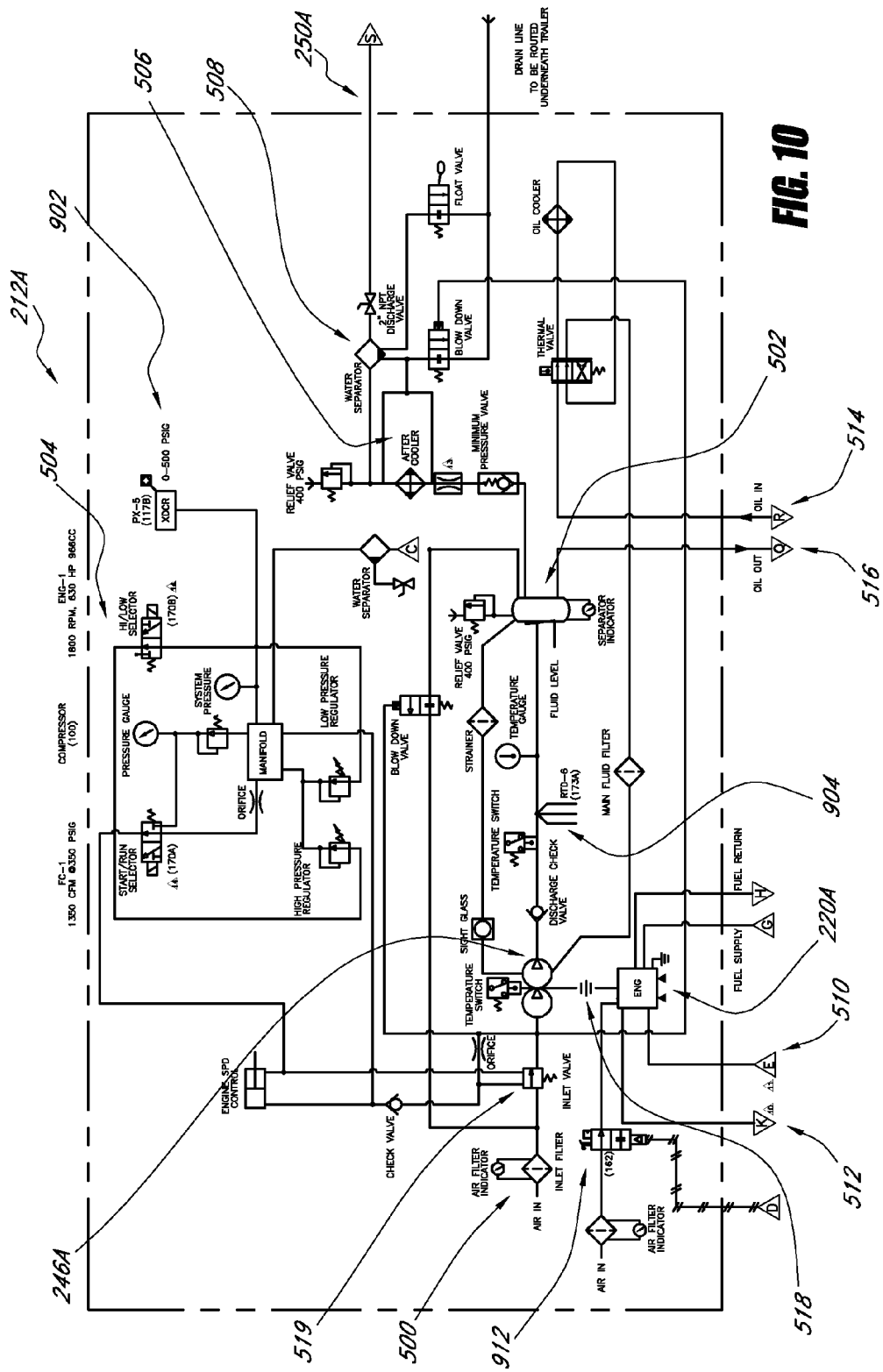

FIG. 10 is a schematic diagram of an exemplary feed air compressor that can be used with any of the above illustrated inert gas separation systems.

Figure 11:
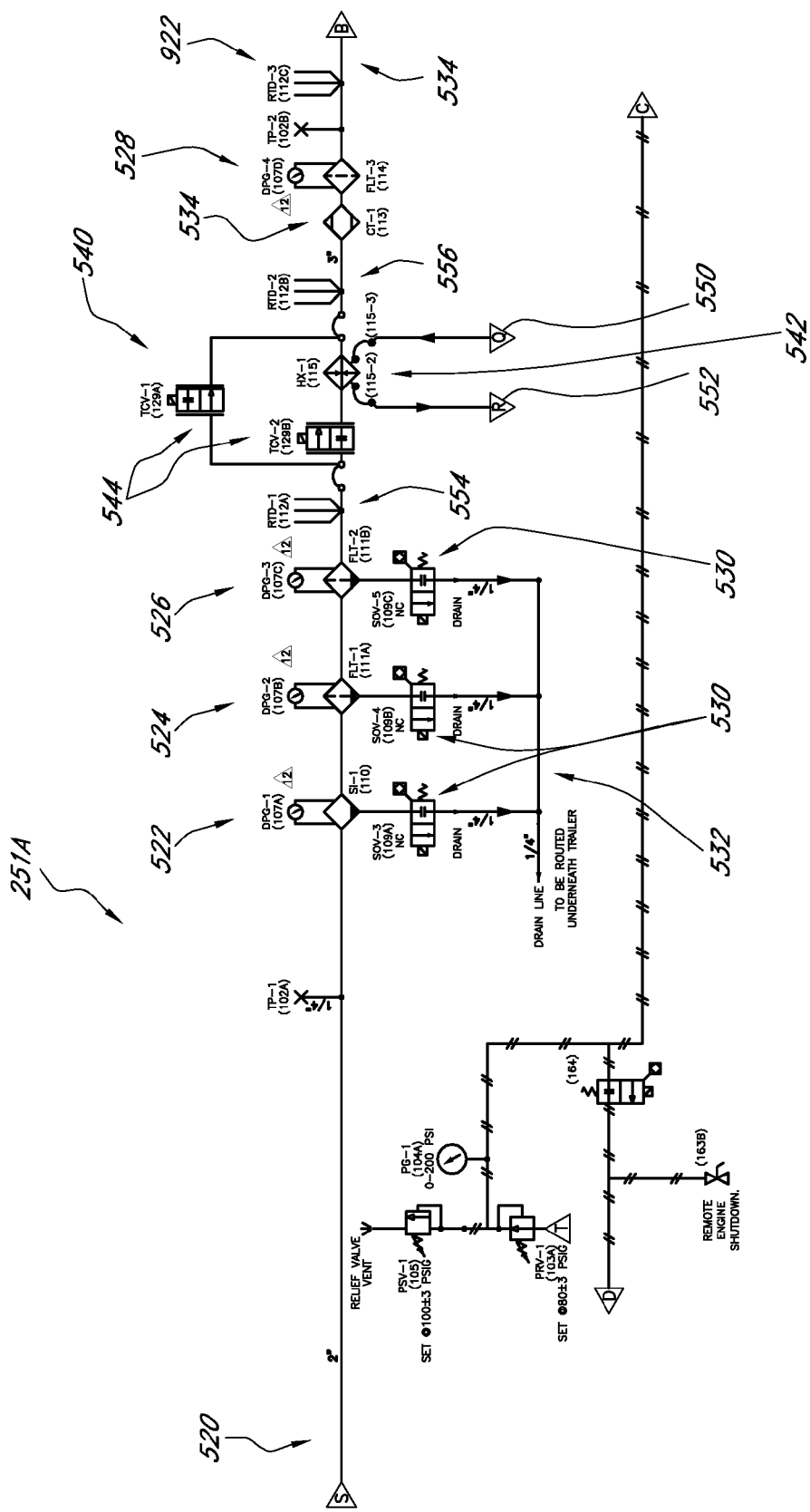

FIG. 11 is a schematic illustration of an exemplary filter assembly that can be used with any of the above illustrated inert gas separation systems.

Figure 12:
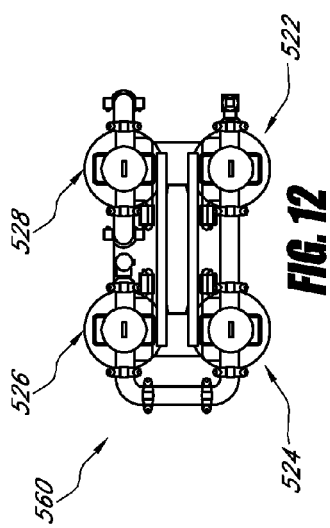

FIG. 12 is a top plan view of the filter system illustrated in FIG. 11.

Figure 13:
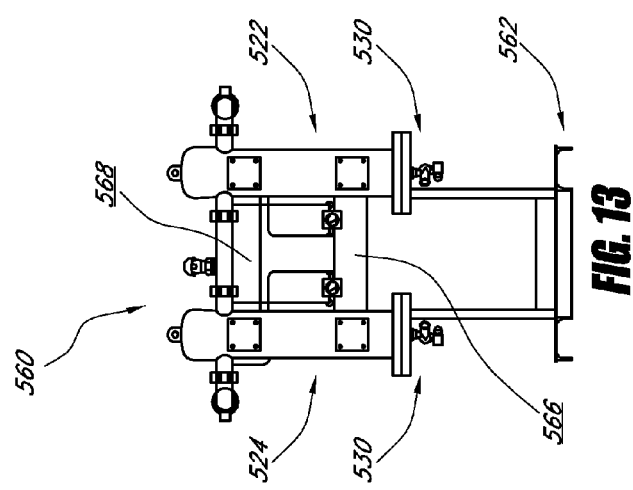

FIG. 13 is a front elevational view of the filter assembly illustrated in FIG. 12.

Figure 14:
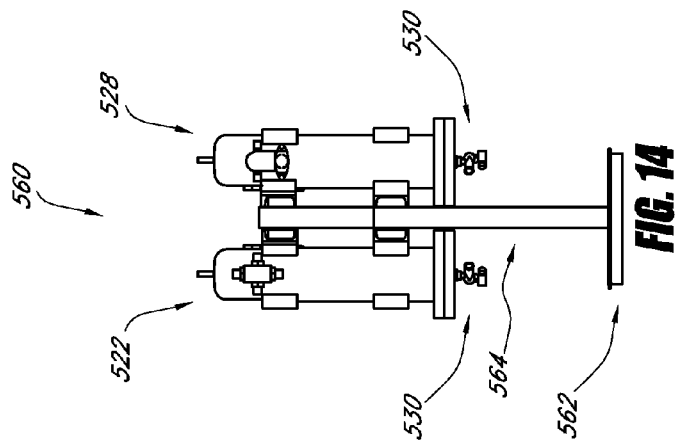

FIG. 14 is a side elevational view of the filter assembly illustrated in FIG. 12.

FIG. 15 is a top plan view of an exemplary carbon tower that can be used with any of the above-identified inert gas separation systems.

FIG. 16 is a front elevational view of the carbon tower of FIG. 15.

FIG. 17 is a side elevational view of the carbon tower of FIG. 15.

FIG. 18 is a bottom plan view of the carbon tower of FIG. 15.

Figure 19:
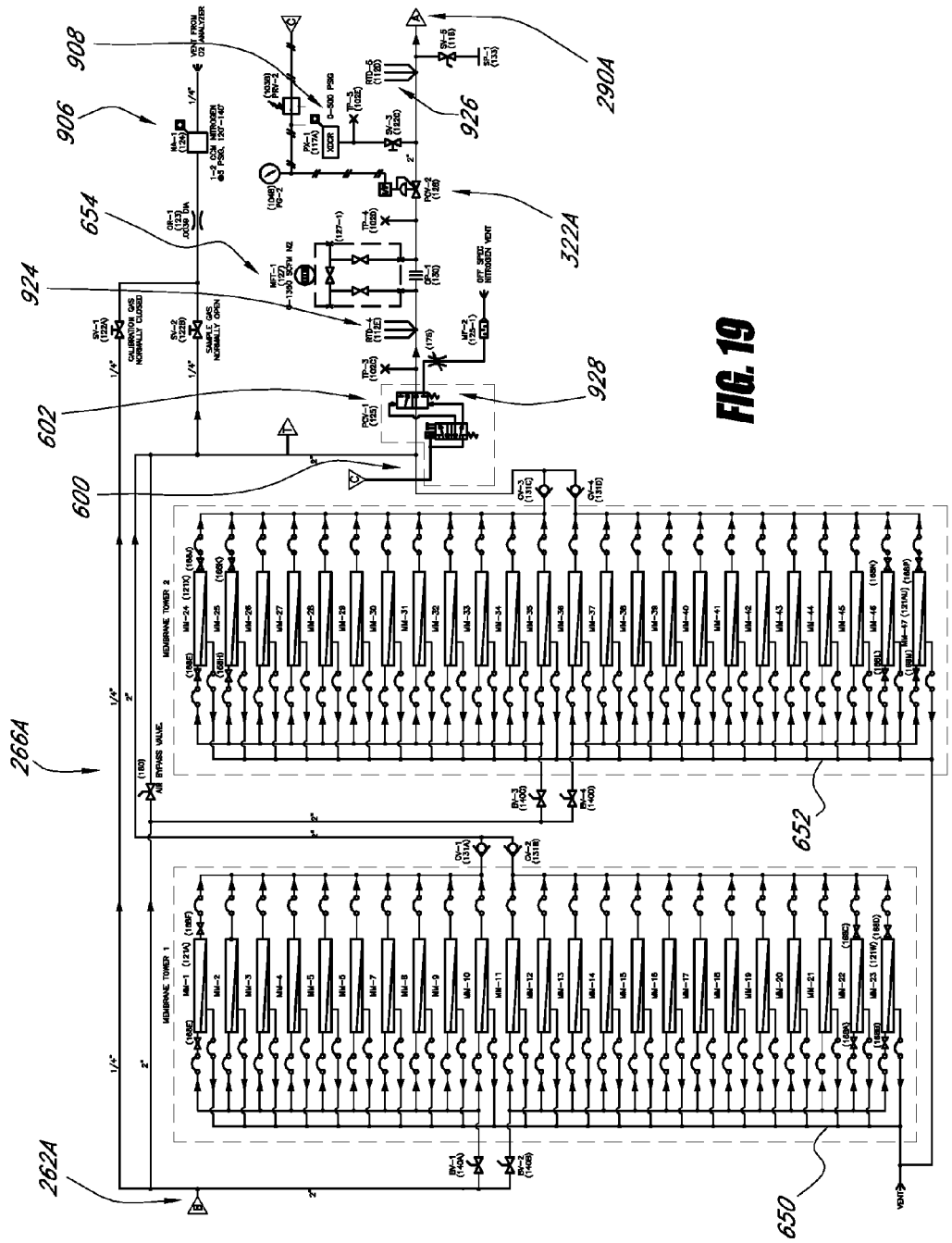

FIG. 19 is a schematic illustration of an exemplary membrane separation unit that can be used with any of the above-illustrated inert gas separation systems.

Figure 20:
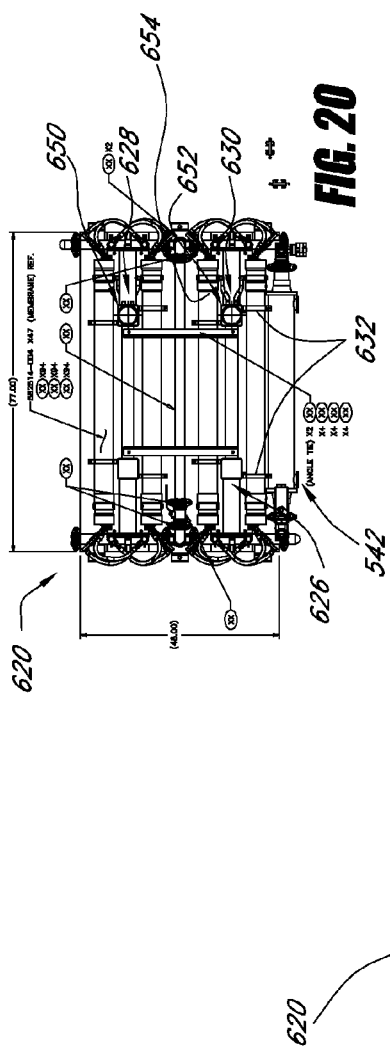

FIG. 20 is a top plan view of an exemplary embodiment of the membrane unit of FIG. 19.

Figure 21:
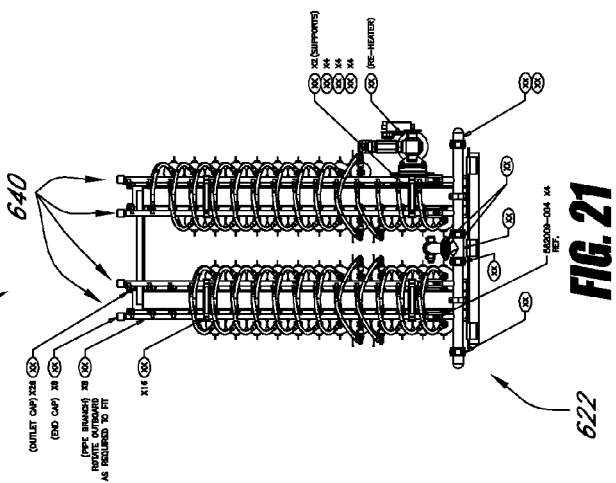

FIG. 21 is a right side elevational view of the membrane unit illustrated in FIG. 20.

Figure 22:
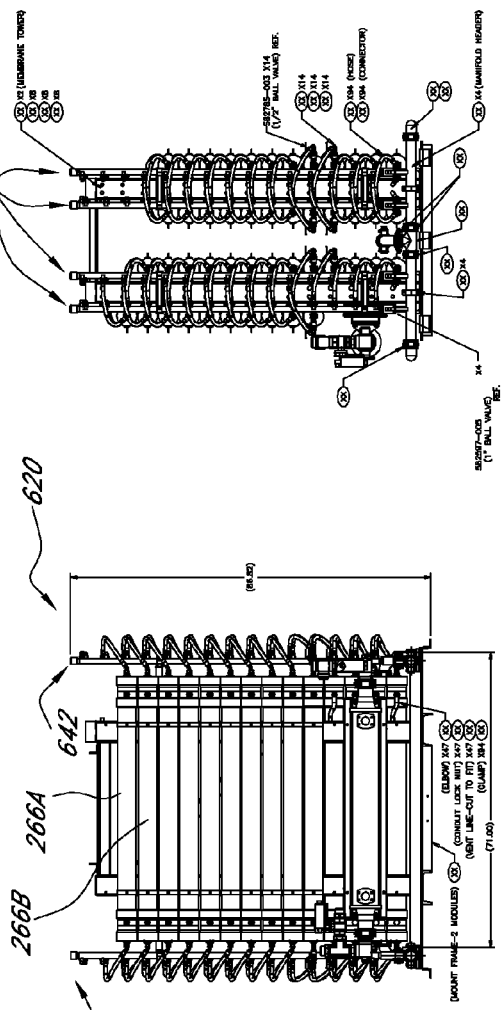

FIG. 22 is a rear elevational view of the membrane unit illustrated in FIG. 20.

Figure 23:
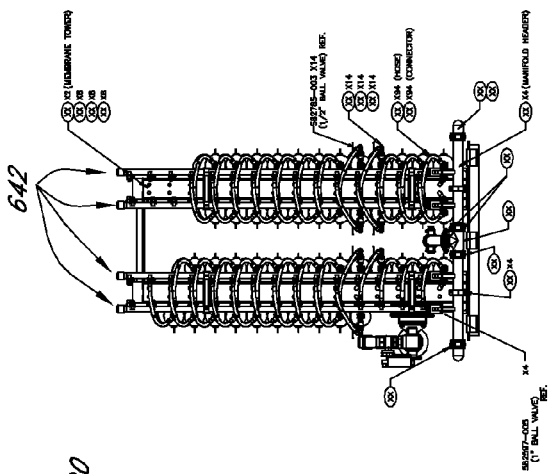

FIG. 23 is a left side elevational view of the membrane unit illustrated in FIG. 20.

Figure 24:
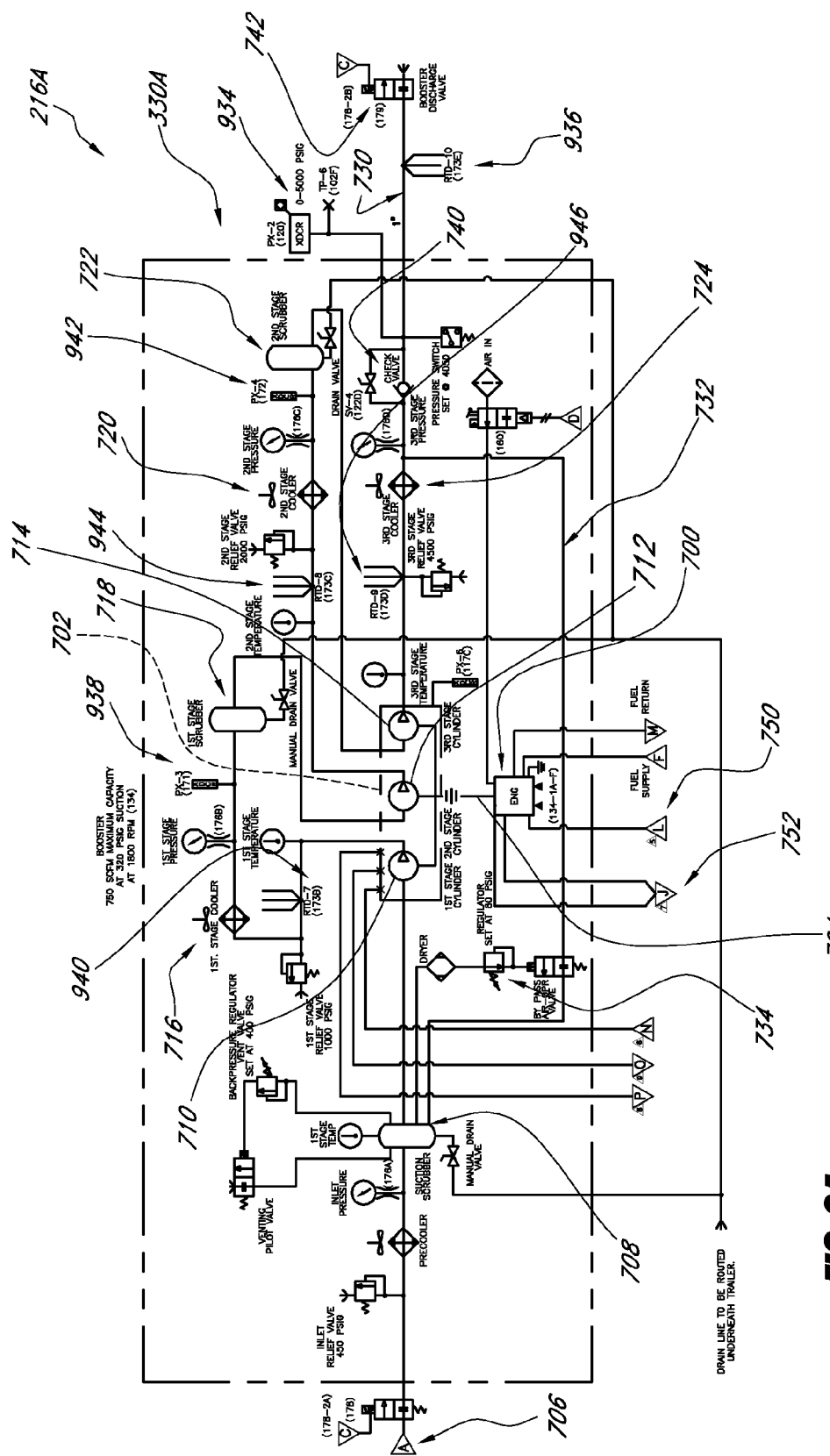

FIG. 24 is a schematic diagram of an exemplary booster compressor that can be used with any of the above-illustrated inert gas separation systems.

Figure 25:
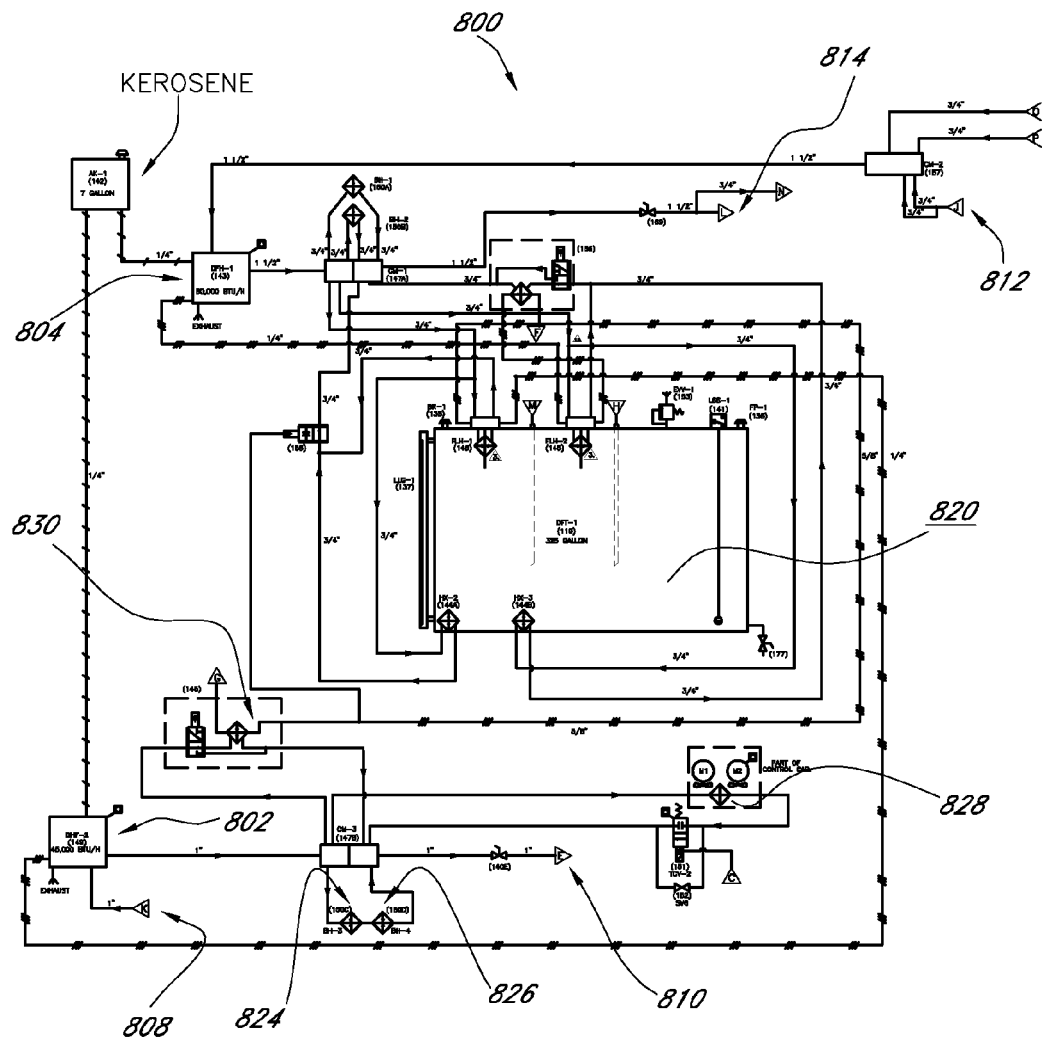

FIG. 25 is a schematic diagram of an exemplary auxiliary heater system that can be used with any of the above-illustrated inert gas separation systems.

Figure 26:
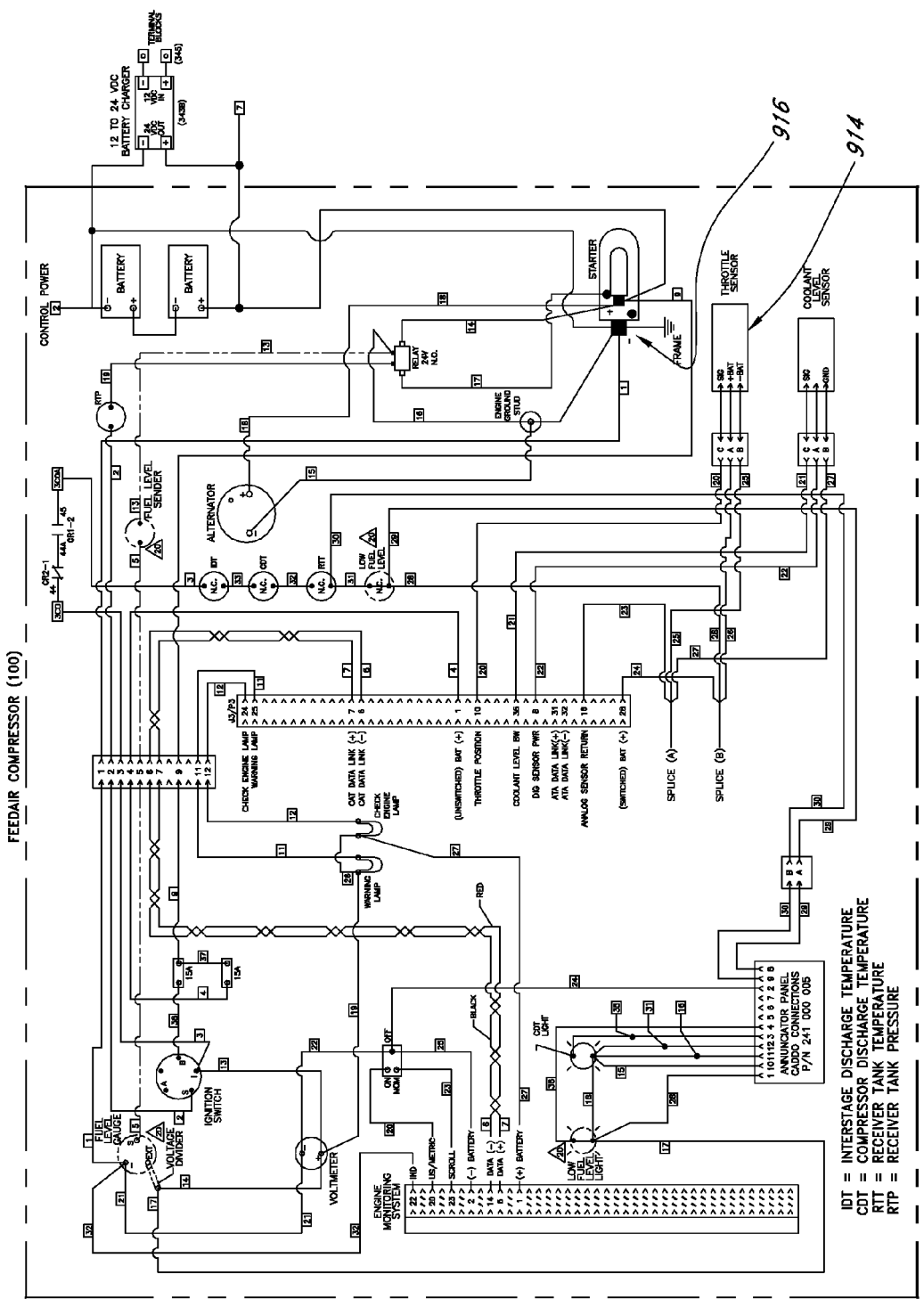

FIG. 26 is a schematic electrical diagram that can be used to operate the compressor of FIG. 10.

Figure 27:
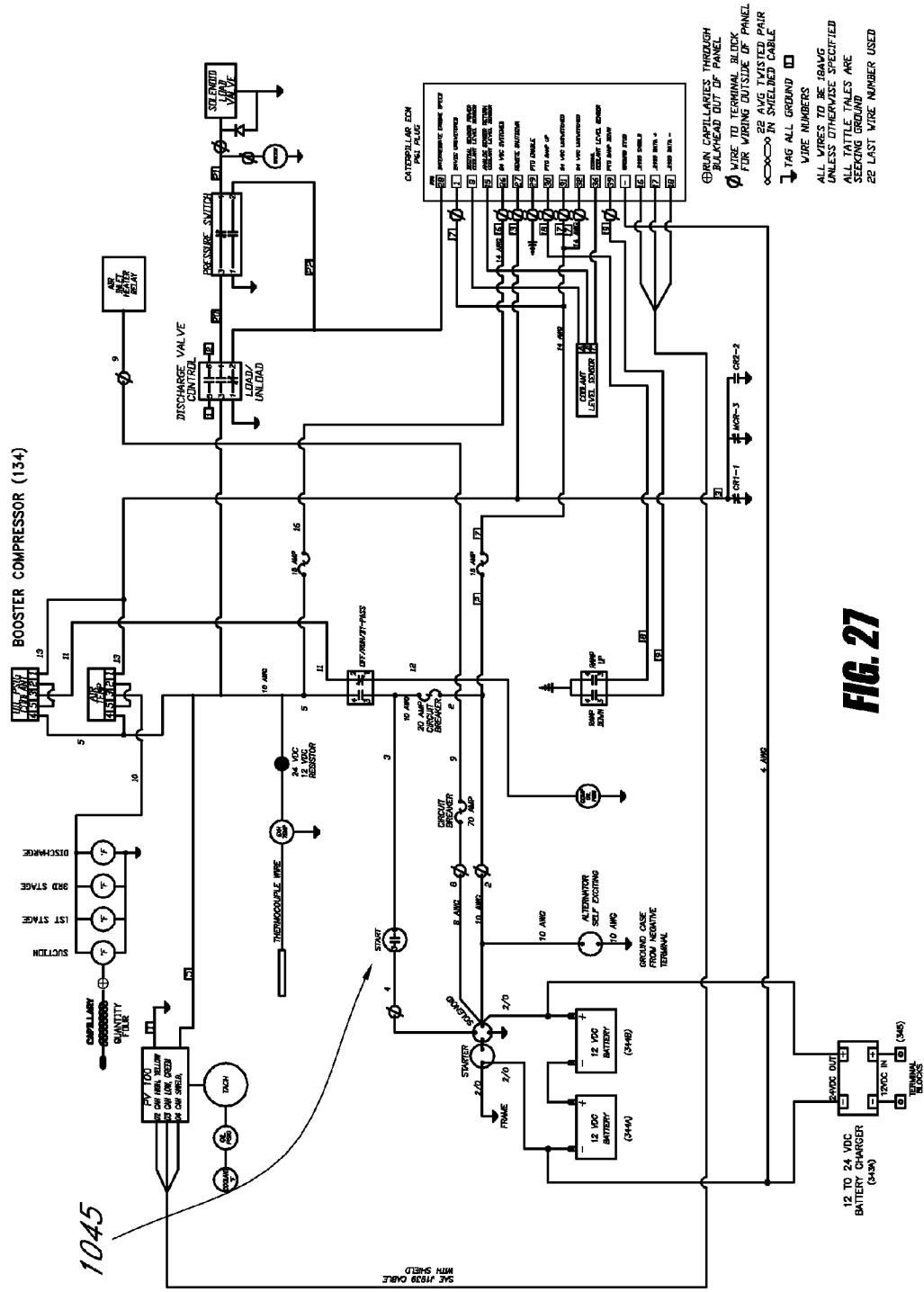

FIG. 27 is a schematic electrical diagram that can be used to operate the booster compressor of FIG. 24.

Figure 28:
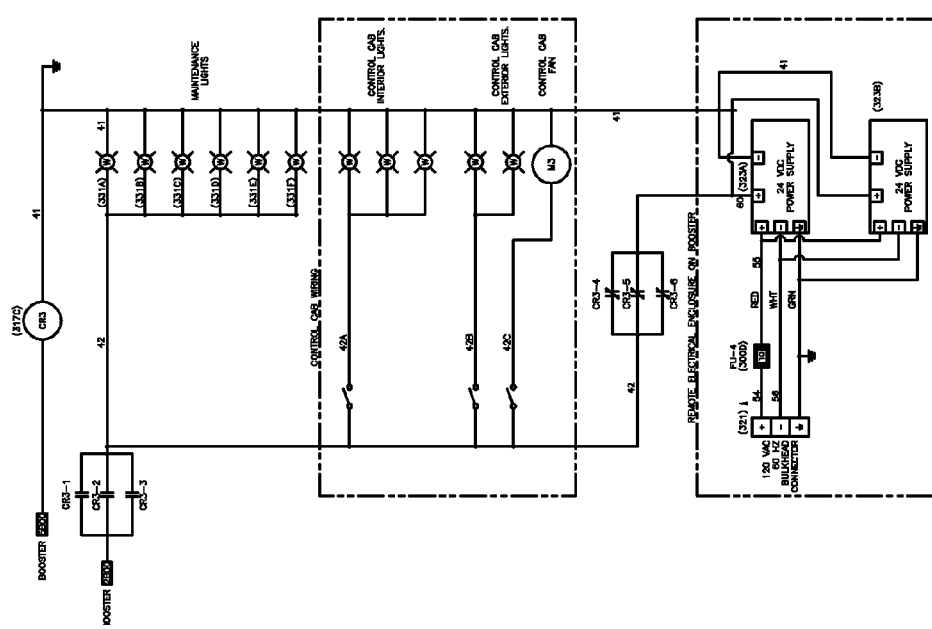

FIG. 28 is a schematic electrical diagram of a lighting system that can be used with any of the above-illustrated inert gas separation systems.

Figure 29:
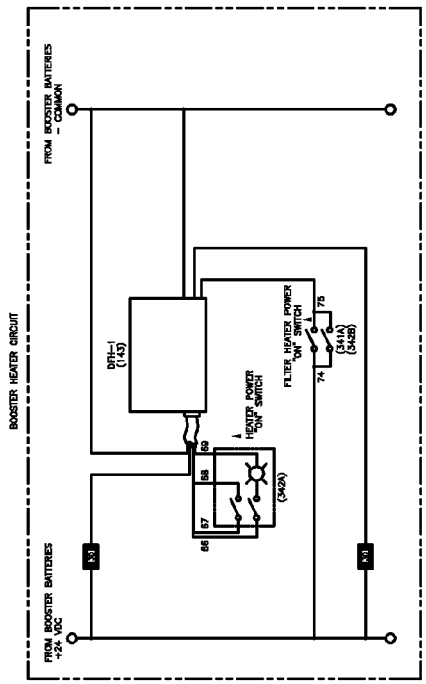

FIG. 29 is a schematic electrical diagram of a circuit that can be used to operate a portion of the heater system of FIG. 25.

Figure 30:
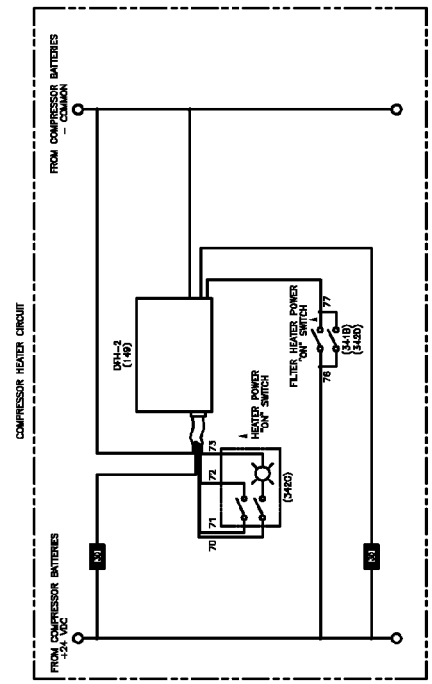

FIG. 30 is a schematic electrical diagram of a circuit that can be used to operate a portion of the heater system of FIG. 25.

Figure 31:
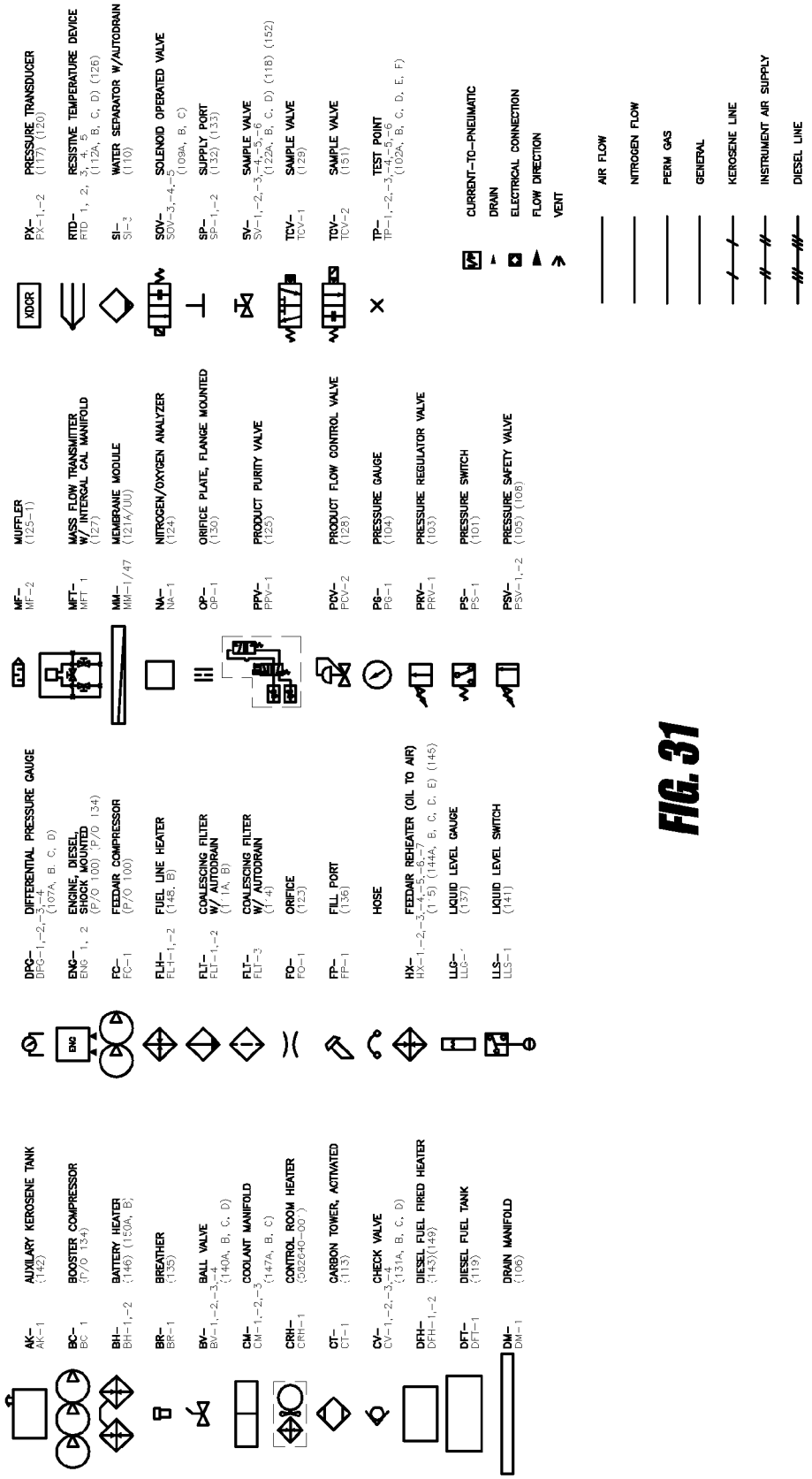

FIG. 31 includes a legend defining the symbols used in the figures contained herein.

Figure 32:
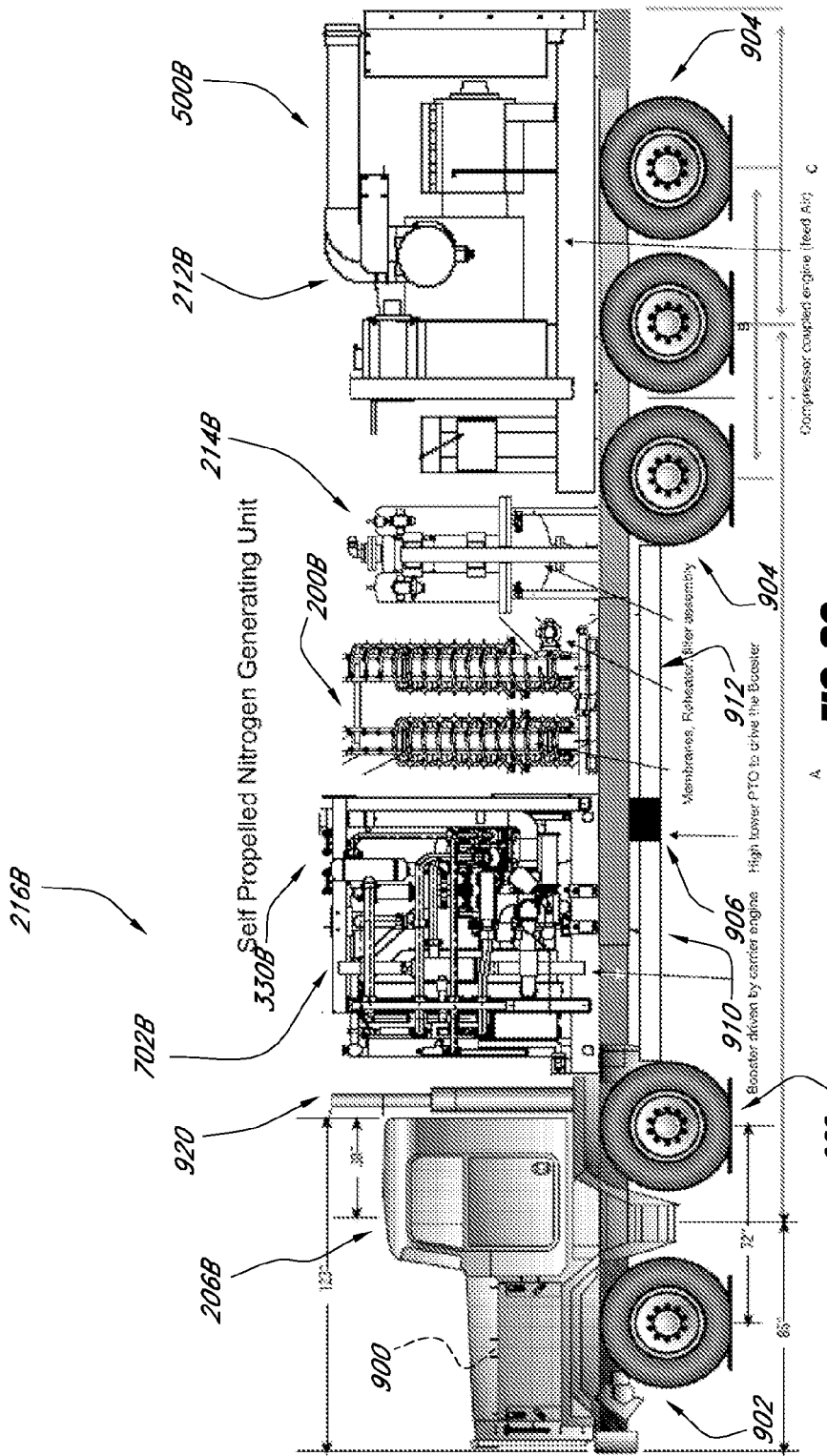
Figure 33:
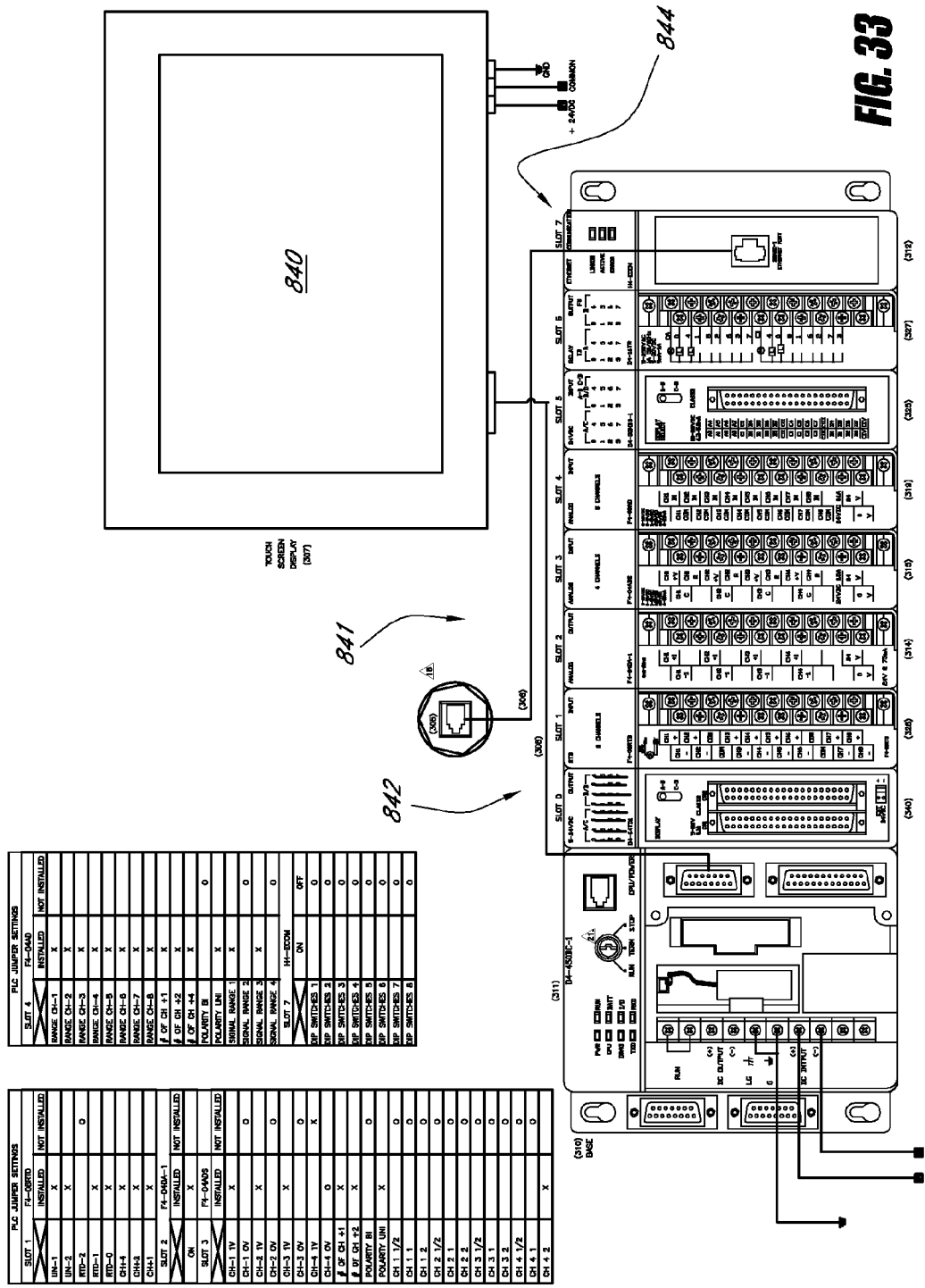

FIG. 32 is an illustration of another modification of the inert gas separation systems illustrated above, which can utilize any of the above-identified components and systems, and which includes a power take-off (PTO) device driven by an engine used for moving the system and which can be used to FIG. 33 is a schematic diagram illustrating a control panel with a touch screen that can be used for remotely controlling any of the above-illustrated mobile systems.

Figure 34:
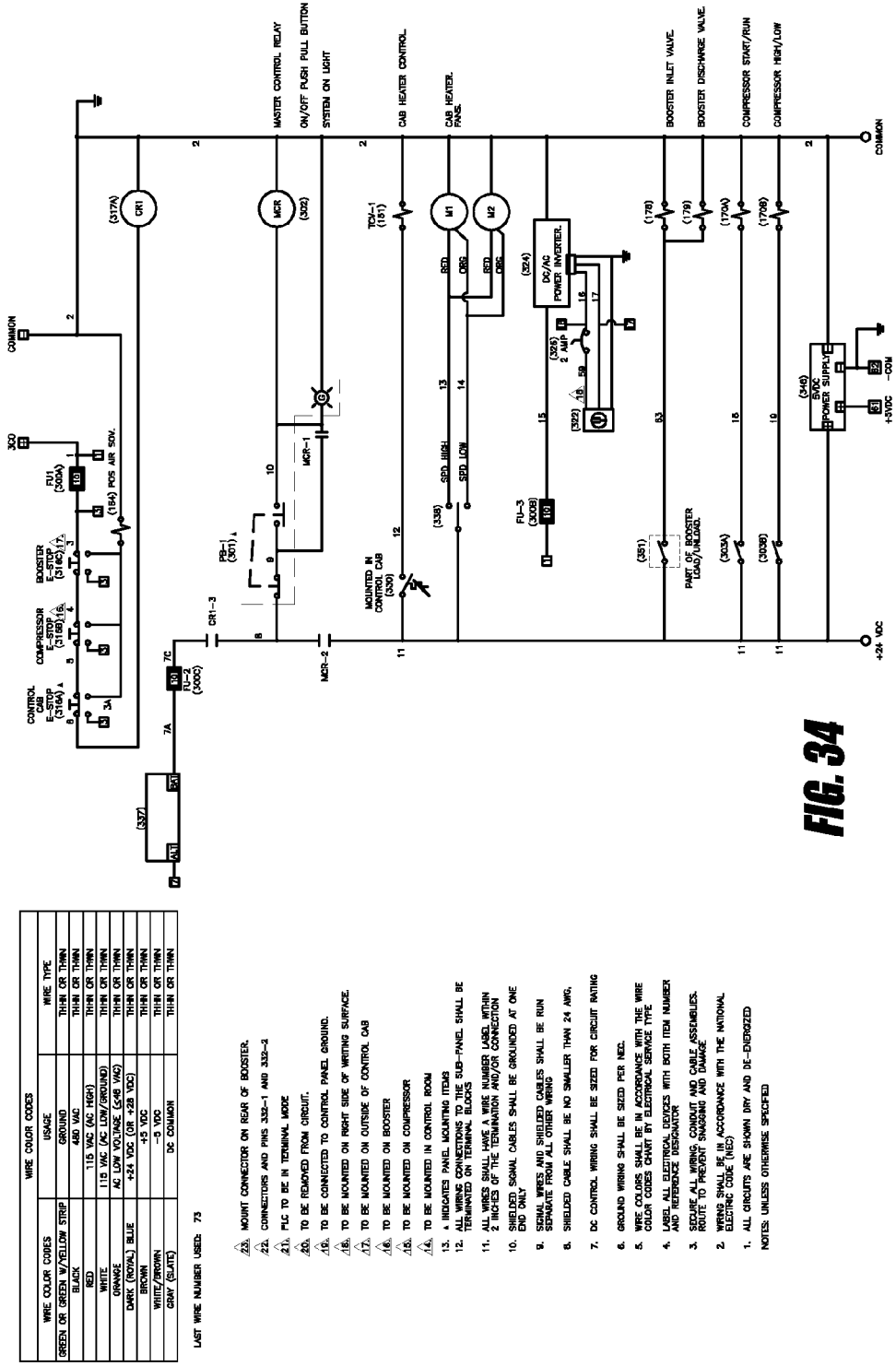

FIG. 34 is a schematic electrical diagram of a power supply system that can be used with any of the above-illustrated mobile systems.

Figure 35:
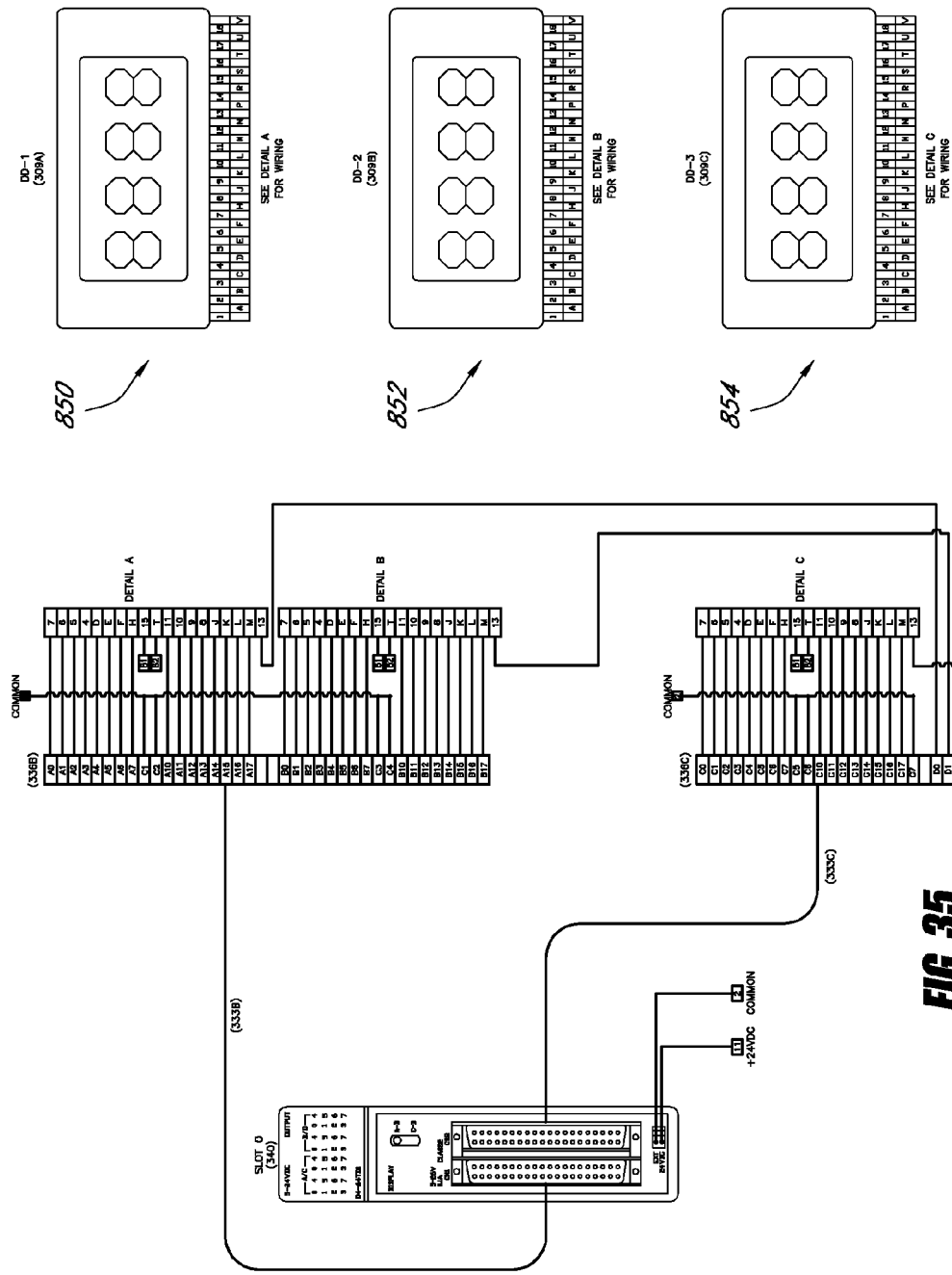

FIG. 35 is a schematic diagram of an optional display arrangement that can be used with any of the above-illustrated mobile systems.

FIG. 36 is a schematic diagram of control devices that can be used with any of the above-illustrated mobile systems.

Figure 37:
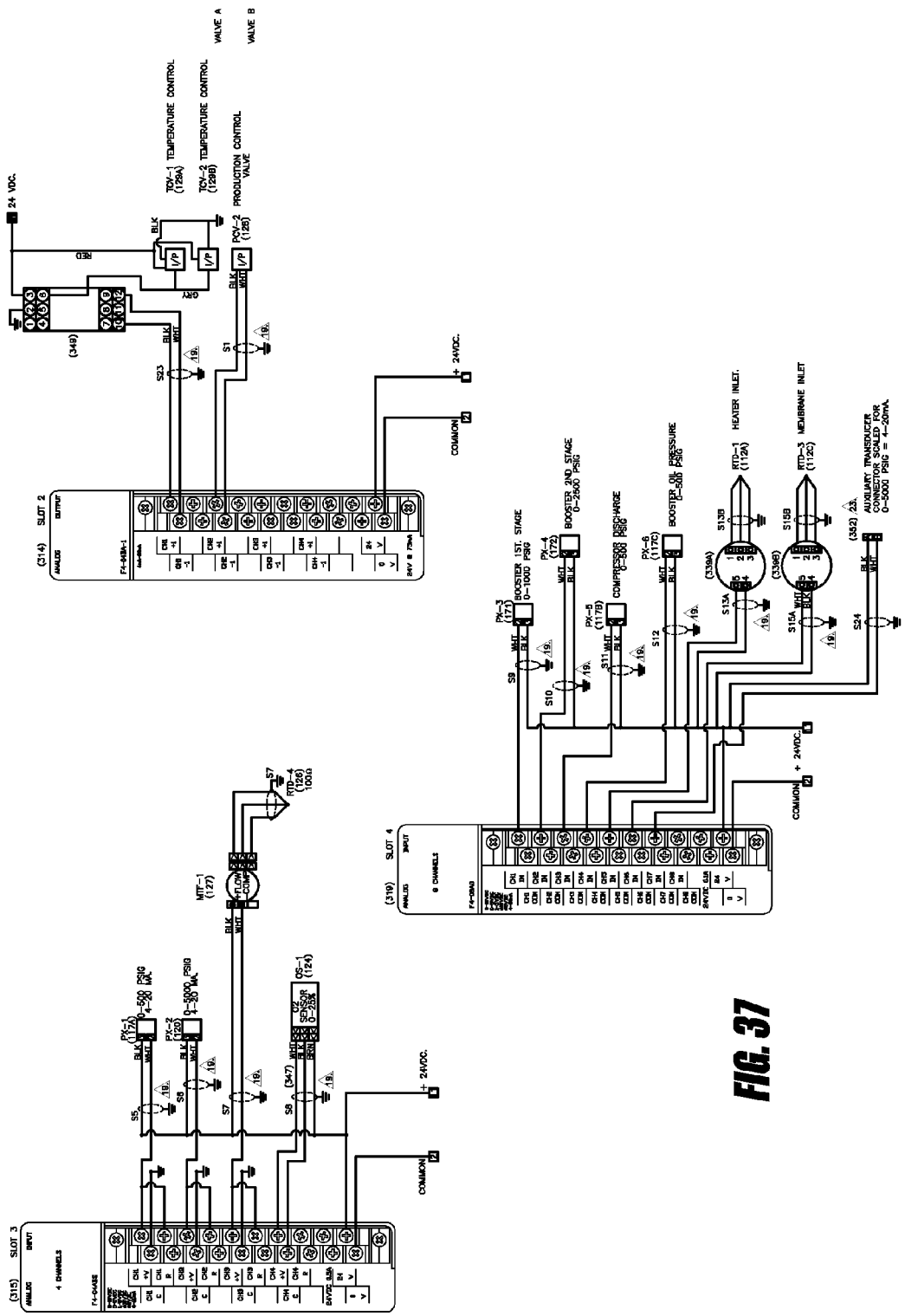

FIG. 37 is a schematic diagram of control devices that can be used with any of the above-illustrated mobile systems.

Figure 38:
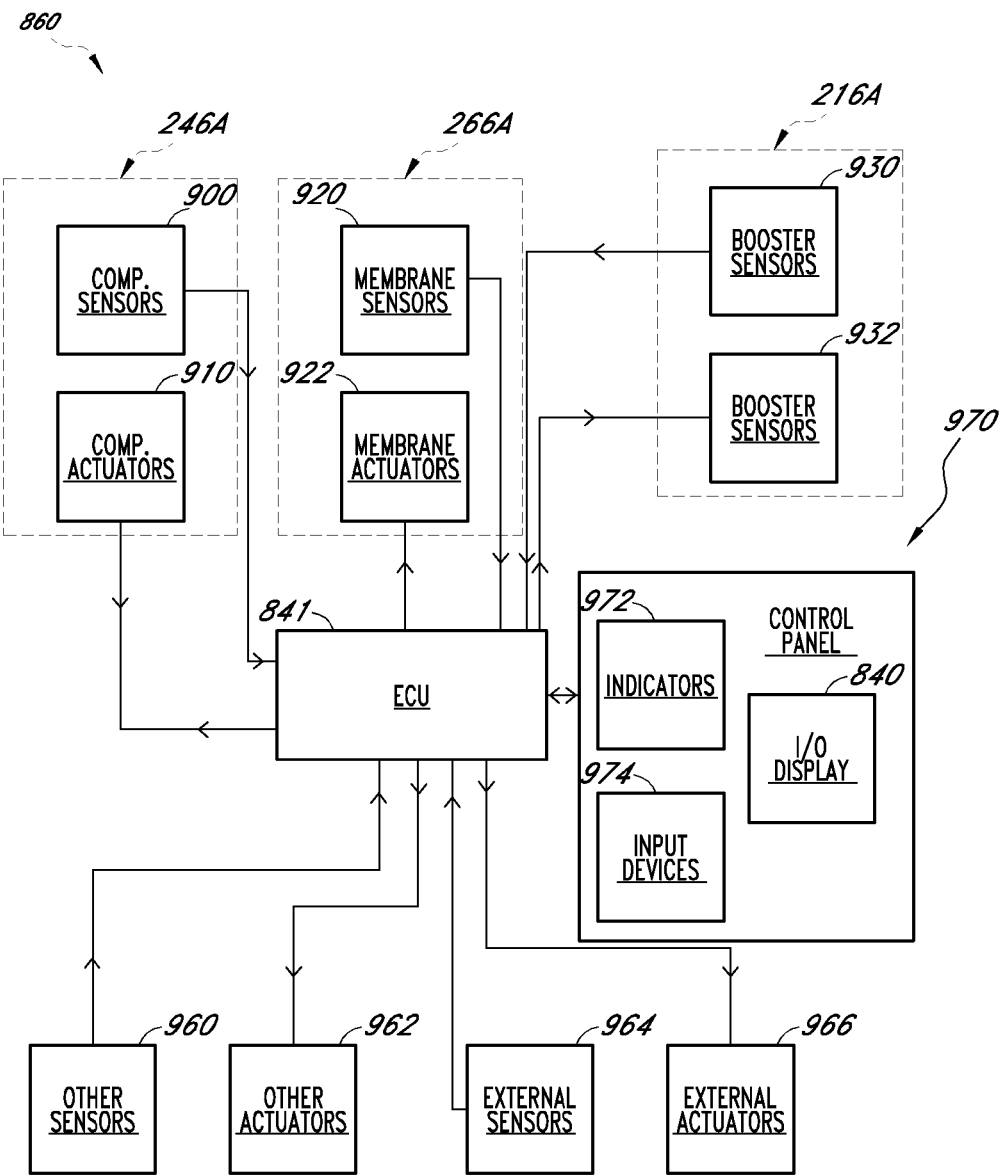

FIG. 38 is a schematic illustration of an electronic control system that can be used with any of the above illustrated mobile systems.

Figure 39:
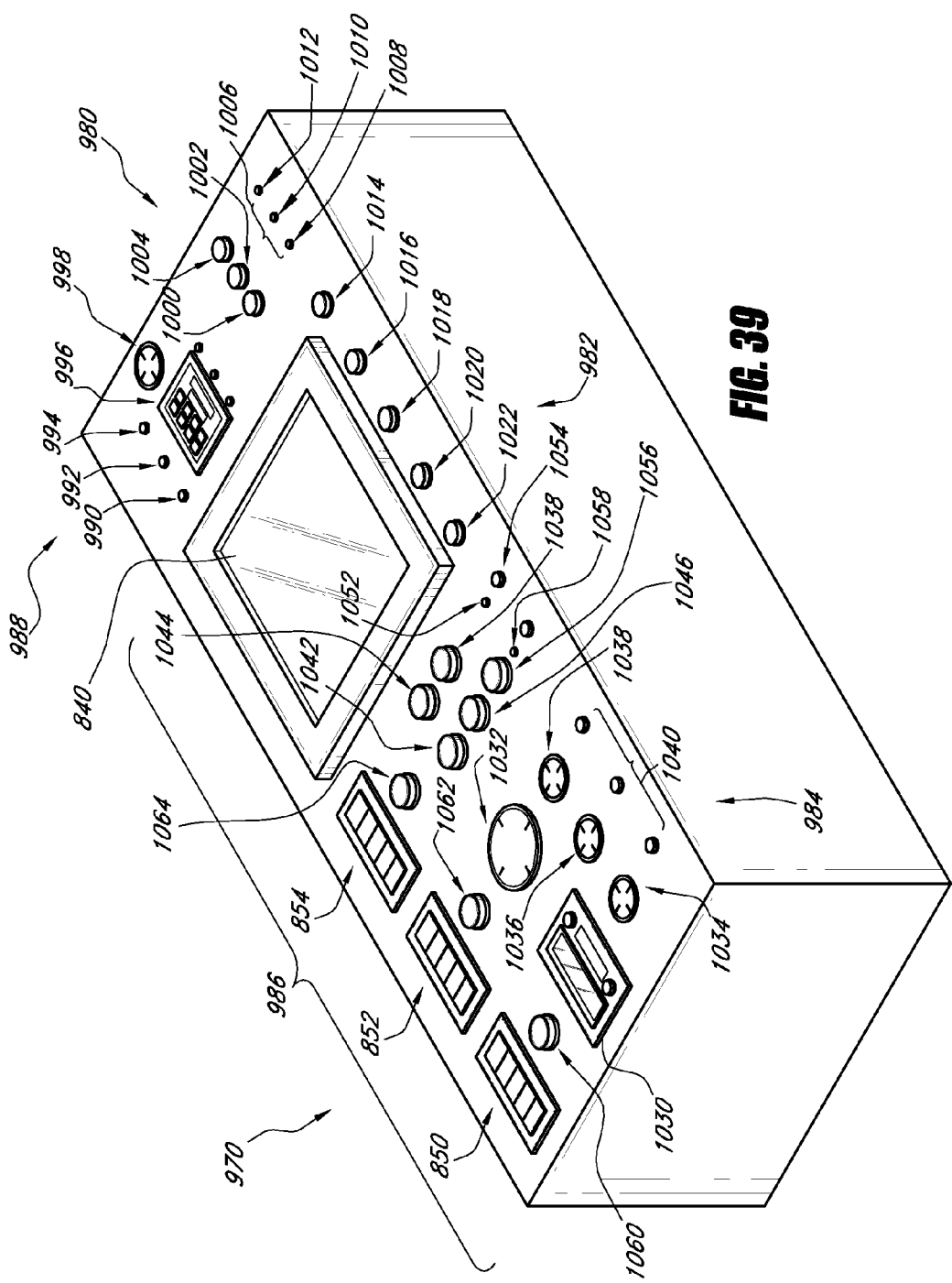

FIG. 39 is a perspective view of a control panel that can be used with any of the above illustrated mobile systems.

Figure 40:
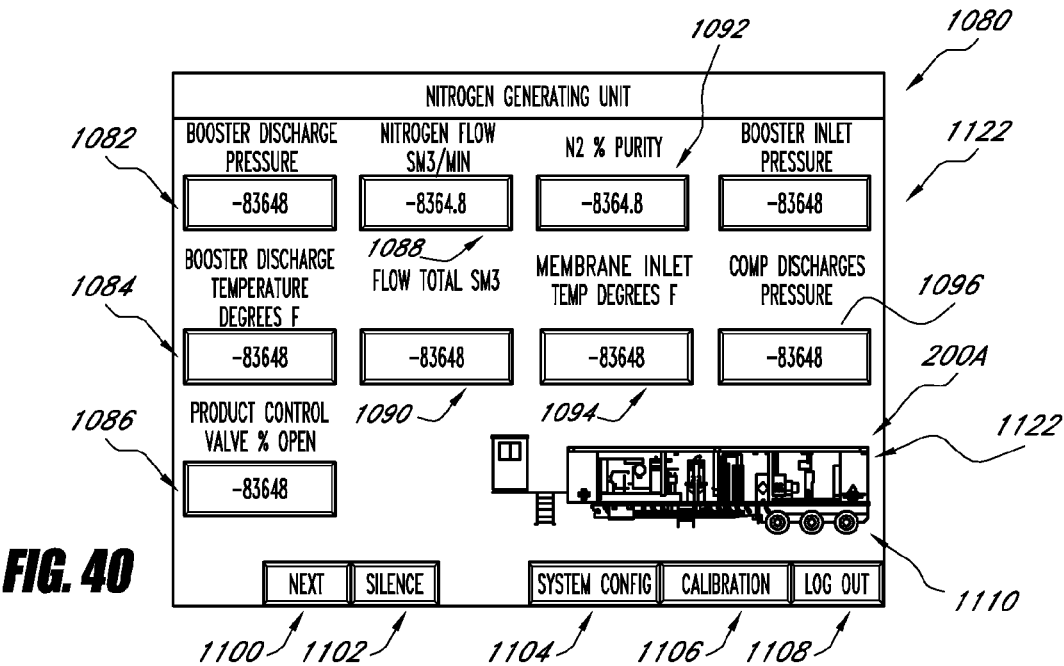

FIG. 40 is a nitrogen generating unit screen of a graphical user interface that can be used in conjunction with a control panel of FIG. 39.

Figure 41:
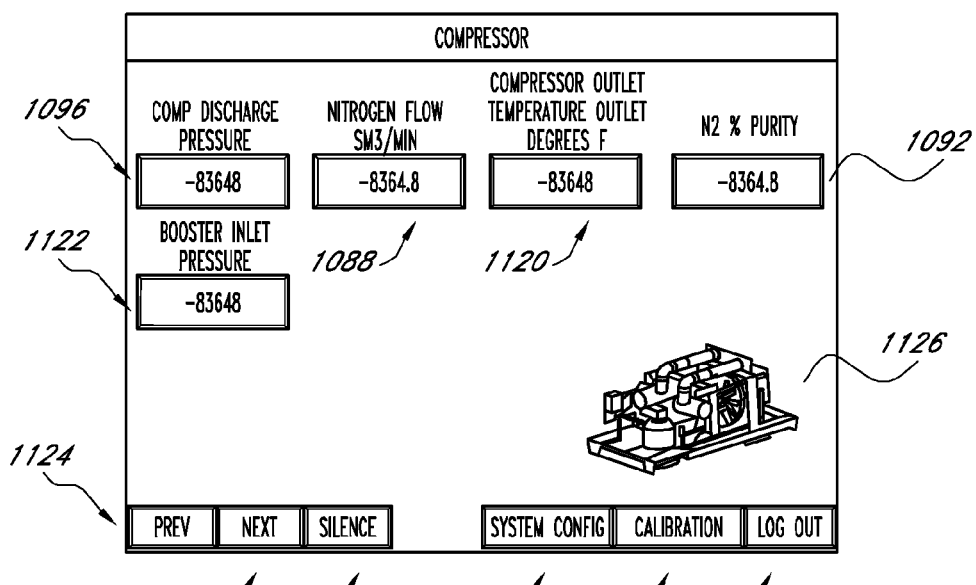

FIG. 41 is a feed air compressor screen of a graphical user interface that can be used in conjunction with a control panel of FIG. 39.

Figure 42:
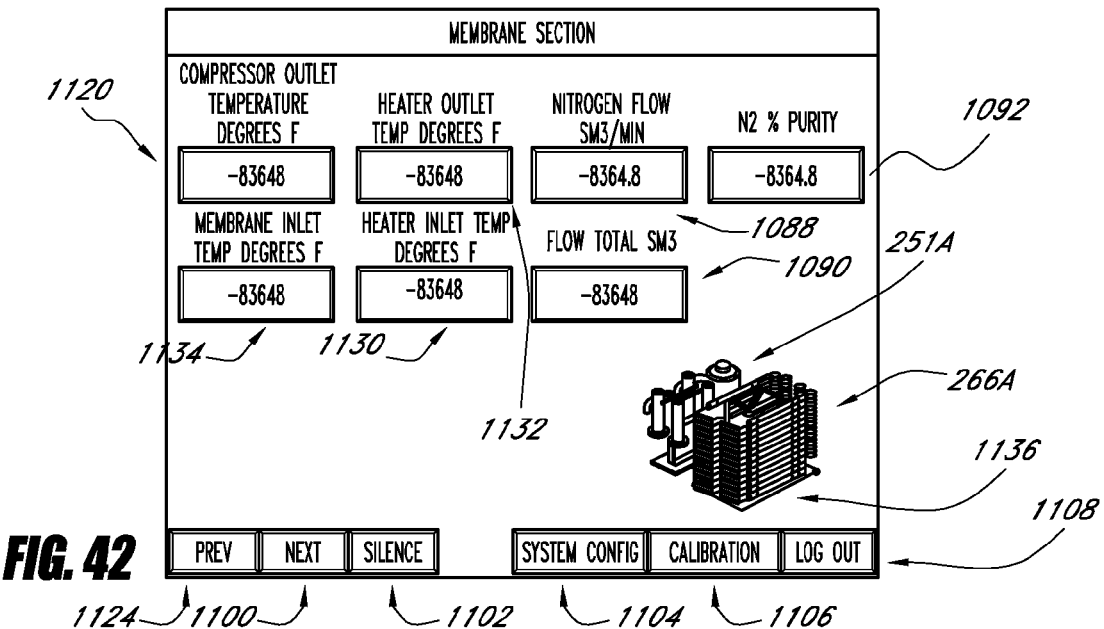

FIG. 42 is a membrane section screen of a graphical user interface that can be used in conjunction with a control panel of FIG. 39.

Figure 43:
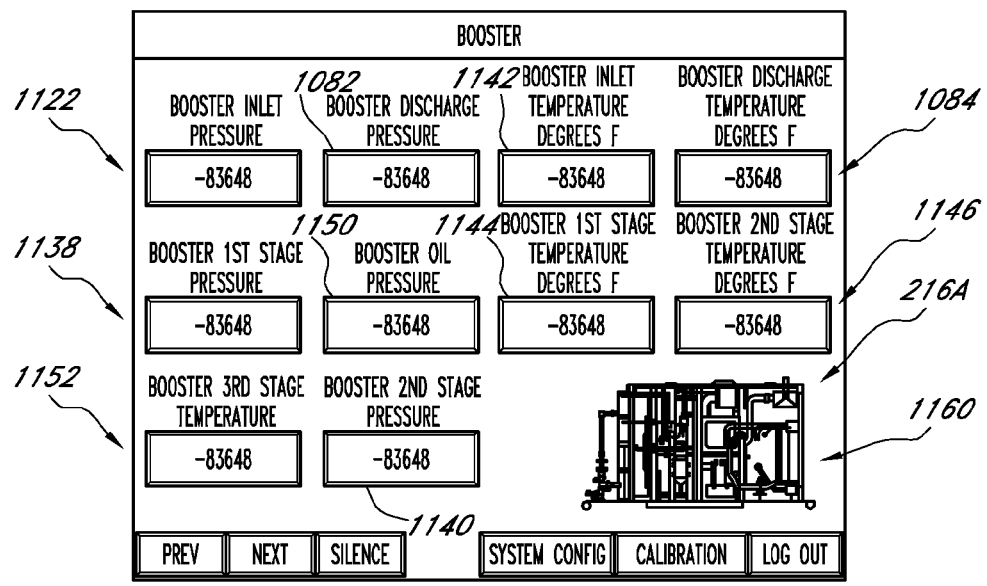

FIG. 43 is a booster compressor screen of a graphical user interface that can be used in conjunction with a control panel of FIG. 39.

FIG. 44 is another screen of a graphical user interface that can be used in conjunction with a control panel of FIG. 39.

FIG. 45 is a system configuration screen of a graphical user interface that can be used with a control panel of FIG. 39.

Figures 46, 47:
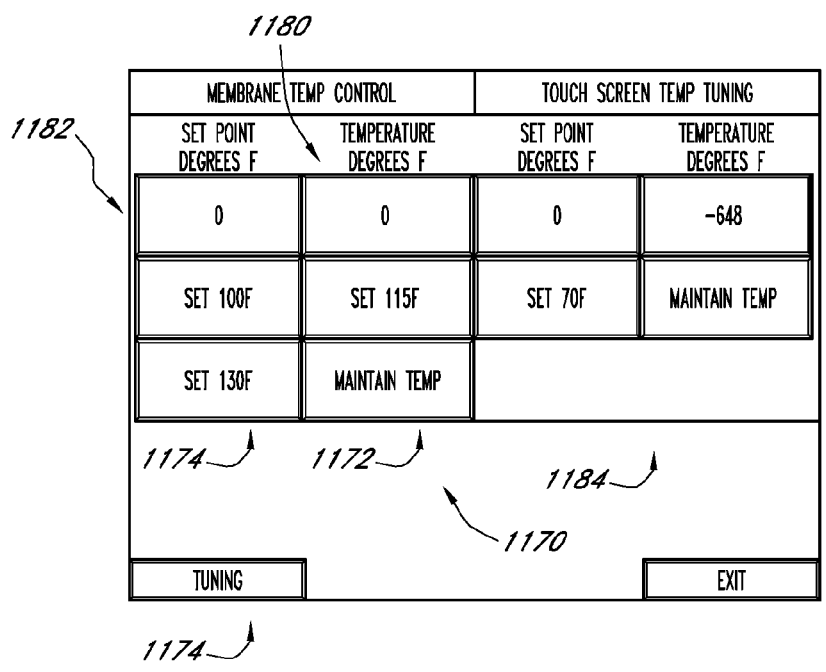

FIG. 46 is a temperature control screen of a graphical user interface that can be used in conjunction with a control panel of FIG. 39.

FIG. 47 is a temperature tuning screen of a graphical user interface that can be used in conjunction with a control panel of FIG. 39.

FIG. 48 is a device selection screen of a graphical user interface that can be used in conjunction with a control panel of FIG. 39.

FIG. 49 is a device setting screen of a graphical user interface that can be used in conjunction with a control panel of FIG. 39.

FIG. 50 is an oxygen sensor calibration screen of a graphical user interface that can be used in conjunction with a control panel of FIG. 39.

FIG. 51 is a flow device calibration screen of a graphical user interface that can be used in conjunction with the control panel of FIG. 39.

FIG. 52 is a pressure device calibration screen of a graphical user interface that can be used in conjunction with the control panel of FIG. 39.

FIG. 53 is a temperature device calibration screen of a graphical user interface that can be used in conjunction with the control panel of FIG. 39.

DETAILED DESCRIPTION OF THE PREFERRED EMBODIMENT

The present embodiments generally relate to an improved system and methods for producing inert gases on a mobile platform. The systems and methods for producing inert gases are generally described in conjunction with the production of inert gas, such as nitrogen gas ($N_2$), for use during a drilling operation because this is an application in which the present systems and methods have particular utility. Additionally, the systems and methods can be used to produce inert gas having different levels of purity. Those of ordinary skill in the relevant art can readily appreciate that the present systems and methods described herein can also have utility in a wide variety of other settings, for example, but without limitation, offshore drilling rigs as discussed in greater detail below.

Figure 1:
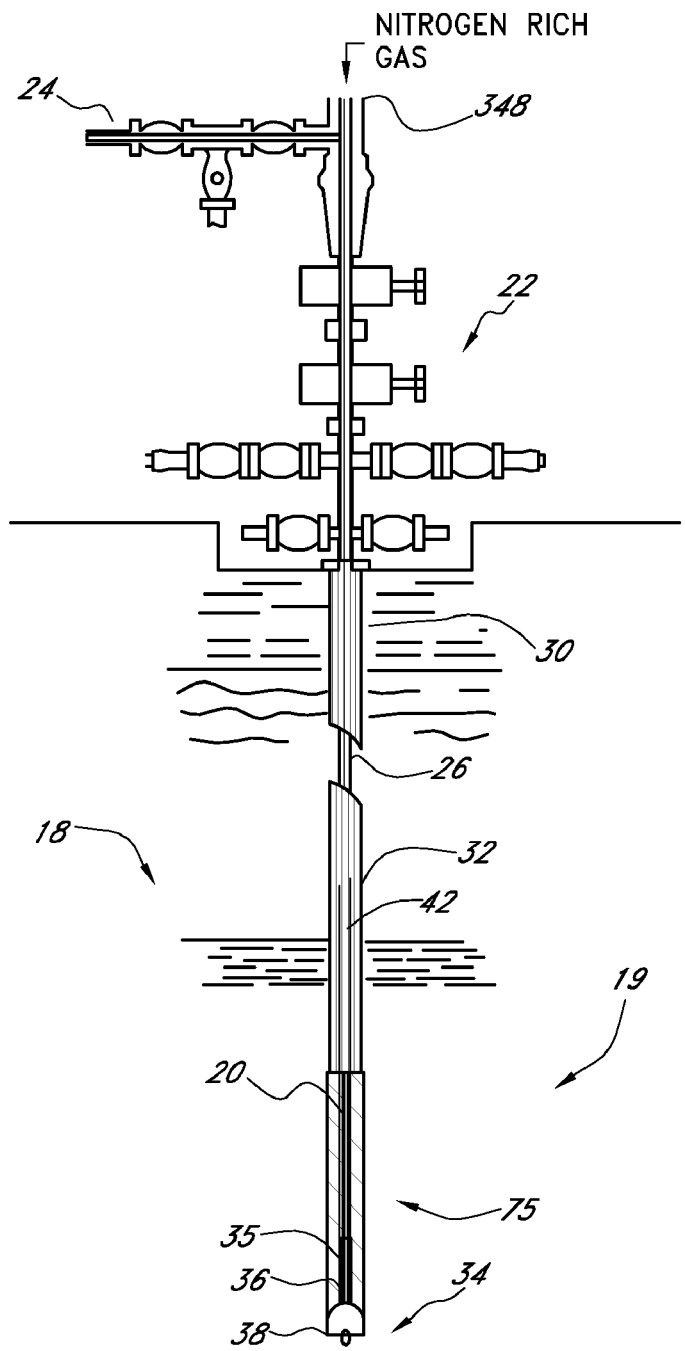
FIG. 1 is a schematic view of a drilling stem arrangement showing delivery of an inert gas to a downhole drilling region.

FIG. 1 is a schematic view of a typical drill stem arrangement 18 showing the delivery of an inert rich gas to a downhole drilling region 19. Generally, inert rich gas flows down the drill stem arrangement 18 until it reaches a drill stem assembly 20 which is typically connected in lengths known as "pipe stands". The drill stem assembly 20 can be fed through the well head assembly (identified generally by numeral 22) which may contain a series of pipe rams, vents, and choke lines. The inert rich gas is exhausted through an outlet 24 which is connected to a blooey line.

For non-drilling applications, the drill stem assembly 20 may be removed and the inert rich gas can be pumped into the downhole region through the pathway 26.

The surface installation may optionally include an injector manifold (not shown) for injecting chemicals, such as surfactants and special foaming agents, into the inert rich gas feed stream, to help dissolve mud rings formed during drilling or to provide a low density, low velocity circulation medium of stiff and stable foam chemicals to cause minimum disturbance to unstable or unconsolidated formations.

Extending below the surface of the ground into the downhole region is the drill stem arrangement 18 which provides a pathway for the flow of pressurized inert rich gas to the drilling region. There is also provided a second pathway for the flow of nitrogen gas and the drill cuttings out of the downhole region and away from the drilling operation.

With continued reference to FIG. 1, the drill stem arrangement includes an outlet or surface pipe 24 and a casing 32. The drill stem assembly 20 extends concentrically with and spaced apart from the surface pipe 24 and production casing 32 so as to define a pathway 42 for the return of inert rich gas and the drill cuttings. The center of the drill stem assembly 20 provides a pathway 26 for the flow of inert rich gas to the drilling region. At the lower end 75 of the drill stem arrangement 18, in vicinity of the lower drilling region 34, is a conventional tool joint 35, a drill collar 36 and a drill bit 38.

The inert rich gas (e.g., nitrogen rich gas) is typically pressurized by a compressor and is then delivered to the drill stem assembly 20. Because the inert rich gas is under pressure, it can swirl around the drilling region 34 with sufficient force and velocity to carry the drill cuttings upwards into the pathway 42. The drill cutting containing stream then exits the outlet 24 of the surface installation equipment where it is carried to a blooey line and eventually discarded into a collection facility, typically at a location remote from the actual drilling site.

The inert rich gas described above for removing drilling cuttings can also be injected into the drilling fluid to reduce the density thereof. This provides greater control over the drilling fluid and is particularly adapted for "underbalanced" drilling where the pressure of the drilling fluid is reduced to a level below the formation pressure exerted by the oil and/or gas formation. The inert rich gas can be provided to the drilling fluid in the following exemplary but non-limiting manner.

With continued reference to FIG. 1, the inert rich gas can be injected into a drilling fluid through an assembly shown in FIG. 1 absent the drill stem assembly 20. In one embodiment, the inert rich gas is pumped through the pathway 26 which can be in the form of linear pipe strings or continuous coiled tubing known as a "drill string". Alternatively, the inert rich gas can be pumped into the annular space 42 between the drill string or pathway 26 and the casing 32 inserted into the well. In this embodiment a drill string can be inserted directly into the annular space 42 to provide the inert rich gas directly therein. As such, the inert rich gas can be used to modify the flow properties and weight distribution of the cement used to secure the casings within the well.

Figure 2:
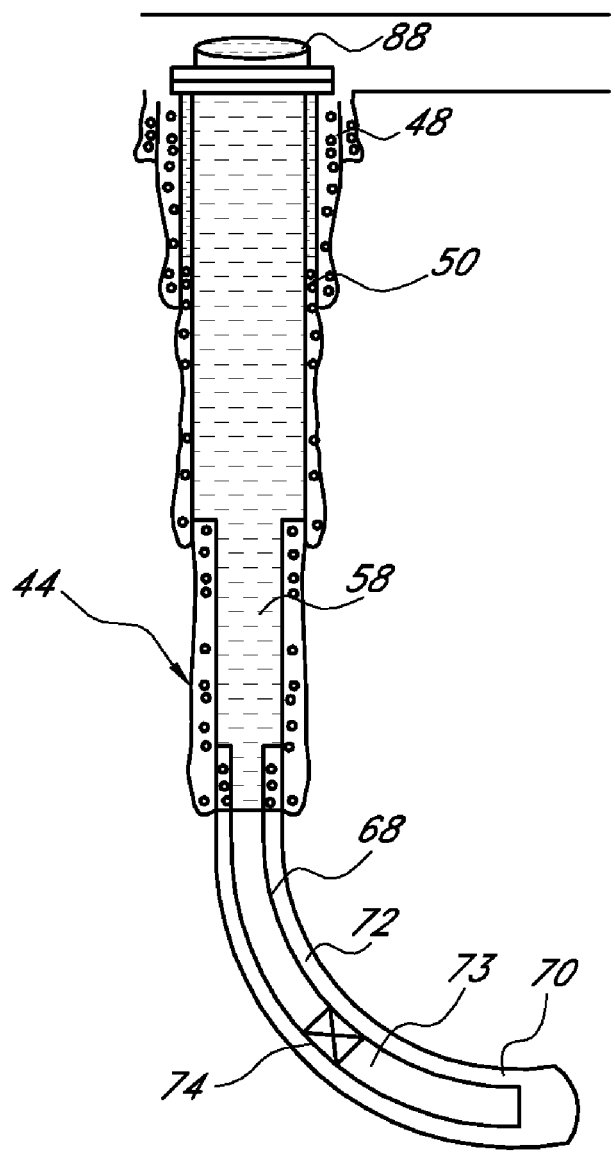
FIG. 2 is a cross-sectional schematic view of a well with a horizontally disposed section including casings and upper and lower liners with an inert rich gas present therein.
Figure 3:
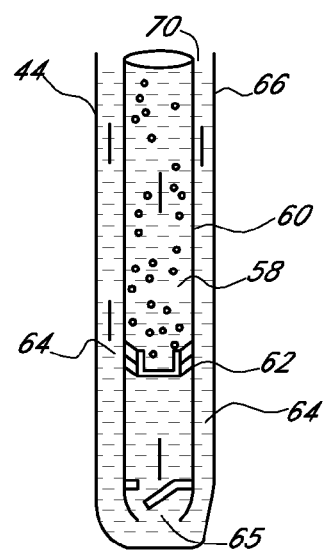
FIG. 3 is a cross-sectional schematic view of an initial injecting of a cement slurry for cementing a casing within a well.
Figure 4:
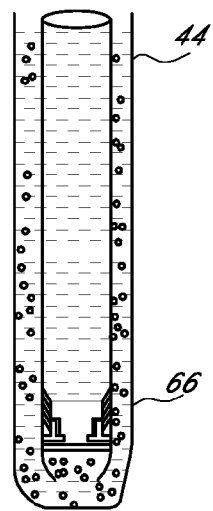
FIG. 4 is a cross-sectional schematic view of the casing of FIG. 3 with the cement in place to secure the casing within the well.

With reference to FIGS. 2, 3 and 4, a well 44 is supported by tubular casings including an intermediate casing 88, a surface casing 50, and a conductor casing 48. The conductor casing 48 is set at the surface to isolate soft topsoil from the drill bit so as to prevent drilling mud from eroding the top section of the well bore.

The surface casing 50 also extends from the surface of the well and is run deep enough to prevent any freshwater resources from entering the well bore. In addition to protecting the fresh water, the surface casing 50 prevents the well bore from caving in and is an initial attachment for the blow-out-prevention (BOP) equipment. Typical lengths of the surface casing 50 are in the range of about 200 to 2500 ft.

The intermediate casing 88 protects the hole from formations which may prove troublesome before the target formation is encountered. The casing 88 can be intermediate in length, i.e., longer than the surface casing 50, but shorter than the final string of casing (production casing) 32.

The production casing (oil string or long string) extends from the bottom of the hole back to the surface. It isolates the prospective formation from all other formations and provides a conduit through which reserves can be recovered.

The diameter of the various casings 48, 50, 88 decreases as the depth of the casing into the well 44 increases. Accordingly, the intermediate casing 88 extends the furthest into the well 44. The intermediate casing 88 is typically filled with a drilling fluid 58 such as drilling mud.

The process of securing the casing within the well using a cement-like material is illustrated in FIGS. 3 and 4. With reference to FIG. 3, a well 44 contains a casing 60 which is initially filled with a drilling fluid 58 such as drilling mud or a drilling mud modified with a nitrogen rich gas. A wiper plug 62 is inserted into the casing 60 and urged downward to force the drilling fluid out of the bottom opening 65 and up along the annular space 64 between the walls 66 defining the well bore and the casing 60. The drilling fluid proceeds upwardly through the annular space 64 and out of the opening 70 at the top of the well 44.

While the drilling fluid is being evacuated a cement-like material in the form of a slurry is loaded into the casing 60. A second wiper plug 66 is then urged downwardly as shown in FIG. 4 to force the cement out of the bottom opening 65 until the annular space 64 is filled. Excess cement escapes out of the opening 70 of the well.

An inert rich gas, preferably nitrogen gas, which can be produced as described below, can be used to reduce the density of the cement in a manner similar to that described for the drilling fluid. The inert rich gas can be injected into the casing while the cement is being added therein. The injection of the inert rich gas into the cement modifies the density and flow characteristics of the cement while the cement is being positioned in the well.

The inert rich gas is injected into the casing through a drill string of the type described in connection with FIG. 1 with the drill stem assembly 20 removed. The rate of injection and the precise composition of the inert rich gas is controlled by a compressor.

The inert rich gas can be used to improve the buoyancy of the casings so as to minimize the effects of friction as the casings are inserted into the well. This is particularly apparent when casings are inserted into horizontal sections in the downhole region. In horizontal sections, the weight of the casing causes it to drag along the bottom surface of the wellbore. In extreme cases the casing may become wedged in the wellbore and not be able to be advanced as far into the downhole region as desirable. Introducing an inert rich gas into the interior of the casing will increase the buoyancy of the casing, allowing it to float in the mud or drilling fluid surrounding the casing.

With continued reference to FIG. 2, there is shown a casing assembly including a tubular member or liner 68 which is designed to enter a horizontal section 70 of the well 44. The liner 68 is any length of casing that does not extend to the surface of the well.

The liner 68 includes an upper section 72 which contains a drilling fluid and a lower section 73. The upper and lower sections are separated by an inflatable packer 74. The lower section 73 is charged with the inert rich gas which makes it lighter and more buoyant than the upper section 72 which is filled with mud. The lower section 73 may therefore move easily into the horizontal section 70 of the well 44.

After the completion of drilling in the downhole region, inert rich gas can be used to improve well performance and maximize output of gas and/or oil from the reservoir. Quite often well production declines because of the presence of fluids, such as water, excess drilling mud and the like in the downhole region. The inert rich gas can be used to clean out the well by displacing the heavier fluids that collect therein. Removal of the heavier fluids will regenerate the flow of gas and/or oil from the reservoir if there is sufficient formation pressure within the reservoir. The inert rich gas can be used to provide an additional boost for lifting the gas and/or oil from the downhole region to a collection area. In this case the inert rich gas is pumped down into the downhole region within the casing under sufficient pressure so that the gas and/or oil entering the downhole region from the reservoir is lifted upwardly and out of the well.

Figure 5:
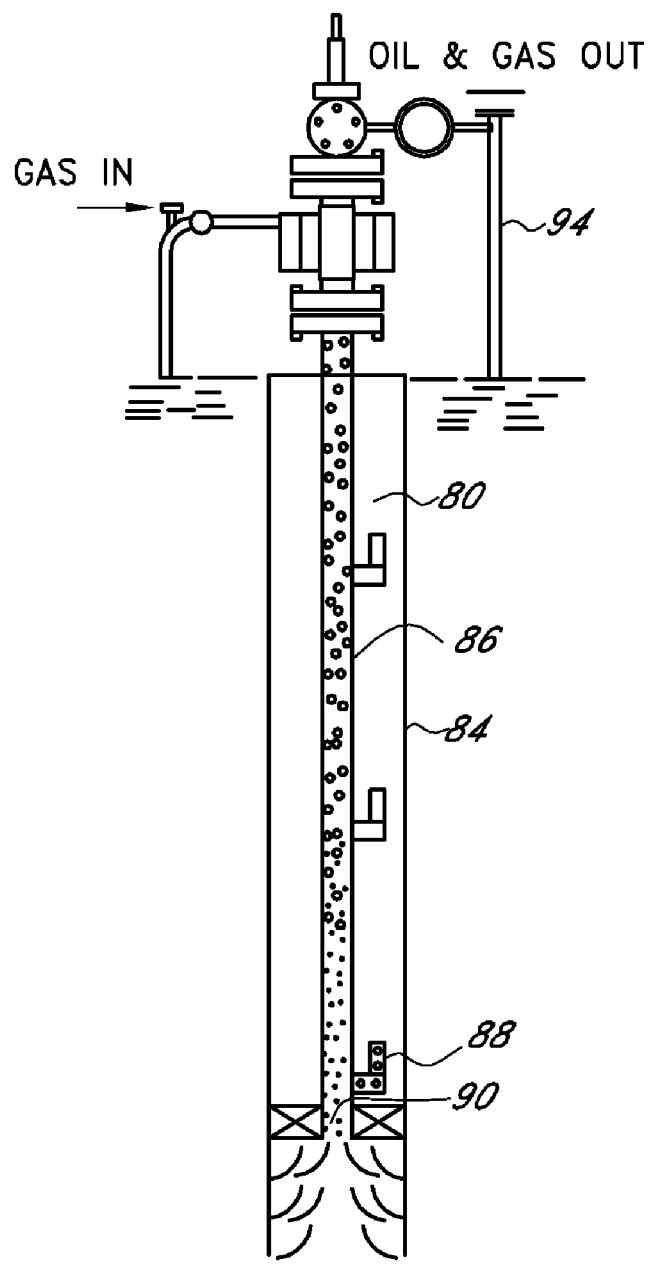
FIG. 5 is a cross-sectional schematic view of a well and equipment for removing gas and/or oil from a well with the assistance of an inert rich gas.

With reference to FIG. 5, there is shown an assembly particularly suited for injecting an inert rich gas into the gas and/or oil within the downhole region to facilitate delivery thereof upwardly through the well for collection. Such a system is applicable to downholes having reduced formation pressure. As a result the gas and/or oil has difficulty entering the downhole from the reservoir.

The inert rich gas can be injected into the annulus 80 between the casing 84 and a tubing 86. The inert rich gas is metered into the tubing 86 through a valve assembly 88. The tubing 86 has an opening 90 enabling gas and/or oil from the downhole region to enter and rise up to the surface of the well. The injection of the inert rich gas from the valve assembly 88 into the tubing 86 assists the gas and/or oil by providing buoyancy to the flow upwardly to the above ground collection area 94. This process is commonly referred to as artificial gas lift.

In another application for inert rich gas, the nitrogen rich gas is used to stimulate the well in the downhole region to enhance gas and/or recovery. More specifically, the walls of the wellbore in the downhole region characteristically have cracks or fissures through which the gas and/or oil emerges from the reservoir. As the pressure in the reservoir decreases, the fissures begin to close thereby lowering production. The most common form of stimulating the downhole region is by acidizing or fracturing the wellbore. The inert rich gas can be used as a carrier for the acid to treat the wellbore. The inert rich gas expands the volume of the acid, retards the reaction rate of the acid resulting in deeper penetration, and permits faster cleanup because there is less liquid to be displaced by the high energy inert rich gas.

Cracking of the wellbore in the downhole region can be performed by pumping a fluid such as acid, oil, water, or foam into a formation at a rate that is faster than what the existing pore structure will accept. At sufficiently high pressures, the formation will fracture, increasing the permeability of the downhole. When the stimulation procedure is completed, the pressure in the formation will dissipate, and the fracture will eventually close. Sand and/or glass beads or other so-called "poppants" may be injected into the formation and embedded in the fractures to keep the fractures open. The inert rich gas may be used as a carrier gas to carry the poppants to the wellbore.

It is well established that the pressure in a reservoir (formation pressure) provides for the flow of gas and/or oil to the downhole region. As the reserves of gas and/or oil become depleted, the formation pressure decreases and the flow gradually decreases toward the well. Eventually the flow will decrease to a point where even well stimulation techniques as previously described will be insufficient to maintain an acceptable productivity of the well. Despite the reduced formation pressure, nonetheless, the reservoir may still contain significant amounts of gas and/or oil reserves.

In addition, gas-condensate reservoirs contain gas reserves which tend to condense as a liquid when the formation pressure decreases below acceptable levels. The condensed gas is very difficult to recover.

The lack of formation pressure in a reservoir can be remedied by injecting an inert rich gas directly into the reservoir. As illustrated highly schematically in FIG. 6, an inert gas generation system is shown generally by numeral 210. The assembly is constructed above a gas and/or oil reservoir 102. Inert rich gas is pumped down the well, often called an injector well 44a, through a tubing 104 to exert pressure on the reserves in the direction of the arrow. The increased pressure on the gas and/or oil causes the same to flow to a producing formation and up a producing well 44b through a tubing 106 into an above ground collection vessel 108.

The flow rate of inert rich gas to the drilling region of an oil and/or gas well or a geothermal well can vary over a wide range depending on the size of the downhole, the depth of the well, the rate of drilling, the size of the drilling pipe, and the makeup of the geologic formation through which the well must be drilled. Some typical drilling operations require the production of 1,500 to 3,000 standard cubic feet per minute (scfm) of nitrogen gas from the inert gas separation system 210; however, other flow rates can also be used. The inert rich gas can be pressurized up to a pressure of about 1,500 to 2,000 psig before being passed to the drilling region, however, other pressures can also be used.

An average drilling operation can take about five days to two weeks, although difficult geologic formations may require several months of drilling. The inert rich gas delivery system is designed for continuous operation and all of the inert rich gas is generated on-site without the need for external nitrogen replenishment required for cryogenically produced liquid nitrogen delivery systems.

In a typical underbalanced drilling operation, 500 to 800 scfm (standard cubic feet per minute) of an inert rich gas is commingled with drilling mud to reduce the hydrostatic weight of the drilling fluid in the downhole region of a well. This reduces or prevents an overbalanced condition where drilling fluid enters the formation, or mud circulation is lost altogether. Carefully adjusting the weight of the drilling fluid will keep the formation underbalanced, resulting in a net inflow of gas and/or oil into the well.

If a drill string becomes stuck due to high differential pressure caused by combined hydrostatic and well pressure conditions, an inert rich gas at 1500-3000 scfm at pressures of 1000-2000 psig can be injected down the drill string to force the fluid up the annulus to the surface. The reduced weight and pressure will help free the stuck pipe. In this case, the inert rich gas is used as a displacement gas.

A naturally producing reservoir loses pressure (depletes) over time with a resulting loss in recoverable oil and/or gas reserves. Injection of nitrogen at 1500 scfm or greater at various locations or injection sites will keep the reservoir pressurized to extend its production life. In gas condensate reservoirs, the pressure is kept high enough to prevent gas condensation or liquefaction, which is difficult to remove once liquefied.

The inert rich gas can be introduced into the producing wells by means of special valves in the production casing positioned in the downhole region of the well. The lifting action of the inert rich gas is one form of artificial gas lift as shown best in FIG. 5.

With reference to FIG. 6A, the mobile inert gas separation system 200 can include a propulsion device 206 and a suspension device 208 supporting an inert gas separation system 210.

The propulsion device 206 can be in the form of any type of propulsion device, including, for example, but without limitation, a truck designed for towing on highway or off-road. The suspension device 208 can be in the form of a trailer configured to be towed by the propulsion device 206. Optionally, the propulsion device 206 and the suspension device 208 can be integrally formed in a rigid frame, fixed wheel base truck. However, these are merely examples of propulsion devices 206 and suspension devices 208 that can be used to allow the inert gas separation system 210 to be mobile. Other arrangements can also be used.

FIG. 7 illustrates one embodiment of an inert gas generation system 210 that can provide a supply of inert gas. The system 210 can produce inert gas of suitable quality for use, for example, in drilling operations as described above. The inert gas generation system 210 preferably includes a flow source 212, a conditioning system 214, and an output 216 of the conditioning system 214.

The flow source 212 provides an output of fluid to the conditioning system 214. The flow source 212 can be configured to output any type of fluid having a reduced amount of oxygen and an inert portion. In the illustrated embodiment, the output of the flow source 212 is exhaust gas from a combustion process. However, as noted above, output of the flow source 212 can be compressed atmospheric air.

An output of the flow source 212 is connected to the conditioning system 214. The conditioning system 214 can be configured to treat and/or condition the output to achieve desired flow characteristics of the flow passing out of output 216. For example, the conditioning system 214 can be configured to convert the output of the source 212 into a fluid with suitable pressure, purity, temperature, volumetric flow rate, and/or any other desirable characteristic depending on, for example, the end use of the output flow.

In one non-limiting embodiment, the inert gas generation system 210 is configured to produce a flow that comprises an inert gas. The inert gas can be a highly pure inert gas, such as Nitrogen gas. In one embodiment, the inert gas comprises mostly Nitrogen gas but can include other substances, such as Oxygen and particulates.

In the illustrated embodiment, the flow source 212 can comprise an air/fuel engine 220. The air/fuel engine 220 can comprise any type of air/fuel combustion engine, including open-system combustion engines such as, but without limitation, turbine engines, as well as internal combustion engines, including, but without limitation diesel, gasoline, four-stroke, two-stroke, rotary engine, and the like. In some embodiments, the air/fuel engine 220 can be configured to provide propulsion power for transporting the entire mobile separation system 200.

In an exemplary but non-limiting embodiment, the engine 220 is a diesel engine. The engine 220 can be normally aspirated, turbo-charged, super-charged, and the like. The construction and operation of such engines are well known in the art. Thus, a further description of the construction and operation of the engine 220 is not repeated herein.

In an exemplary but non-limiting embodiment, the engine 220 is configured to produce an output of about 400-650 horsepower (hp). In another exemplary but non-limiting embodiment, the engine 220 is configured to produce an output of about 550 hp. Optionally, the flow source 212 can comprise a plurality of similar or different engines 220. In one exemplary but non-limiting embodiment, the flow source 212 comprises one or more diesel engines and/or one or more gasoline engines. In another embodiment, the flow source 212 comprises a plurality of diesel engines.

The output from the engine 220 can contain various products of combustion. The exhaust produced by the engine 220 can include gases, liquids, and particles. For example, the output can comprise gases such as argon, hydrogen ($H_2$), nitrogen ($N_2$), oxides of Nitrogen ($NO_x$), carbon oxide (e.g., carbon monoxide (CO) and carbon dioxide ($CO_2$)), hydrocarbons, and/or other gases. The output can also comprise fluid such as water ($H_2O$) and oil. The output can also comprise particles such as diesel particulate matter, if the engine 220 is a diesel engine. Of course, the output of the flow source 212 will have different components depending on the type of flow source 212 that is employed.

The engine 220 can draw in ambient air through an air intake 221 and can produce exhaust containing both inert and non-inert gas. Preferably, the volume percentage of the inert gas output from the engine 220 is generally greater than the volume percentage of the inert gas typically present in ambient air.

In some embodiments, the volume percentage of the inert rich gas of the exhaust fluid produced by the engine 220 is at least 5% greater than the volume percentage of inert gas typically present in ambient air. In yet another embodiment, the volume percentage of the inert rich gas of the exhaust fluid produced by the engine 220 is at least 10% greater than the volume percentage of inert gas typically present in ambient air. In some embodiments, the proportion of inert gas in the exhaust of the engine 220 can be increased by increasing the power output from the engine 220.

For example, diesel engines do not have a throttle valve. Thus, when a diesel engine is operating at a power output level that is below full power, the amount of fuel burned in the engine is not sufficient to burn all of the air in the engine. Thus, fuel is burned in a "lean" mixture, i.e., non-stochiometric. Thus, the exhaust gas discharged from the engine 220 contains some oxygen. However, when the power output of a diesel engine is raised, more fuel is injected, and thus, more oxygen is "burned", thereby reducing the oxygen content of the exhaust. Thus, a further advantage is produced where the engine 220 used is sized such that during normal operation, the engine 220 is running under an elevated power output. For example, if the engine 220 is rated at about 550 horsepower and the engine is operated at about 225 horsepower, the engine 220 will burn a substantial portion of the oxygen in the ambient air drawn into the engine 220. Further advantages are achieved where the engine 220 is operated at near maximum power. For example, if the engine 220 is operated at about 450 horsepower, the engine will burn nearly all of the oxygen present in the air. One of ordinary skill in the art recognizes that gasoline-burning engines operate under different air/fuel principles, and thus, the proportion of oxygen present in gasoline-powered engines does not vary substantially with power output.

Normally, exhaust gas produced by the engine 220 will contain less oxygen than ambient air. In one embodiment, the exhaust gas can contains less than about 10% by volume of oxygen gas, depending on the air fuel ratio of a mixture combusted therein and operating load of the engine 220. As noted above, as the fuel injection rate of a diesel engine is increased, more oxygen is consumed, and thus, the oxygen content of the exhaust gas is similarly decreased. Preferably, the exhaust gas from the engine 220 comprises less than about 7% by volume oxygen. In another embodiment, the exhaust gas from the engine 220 contains less than about 5% by volume of oxygen gas. In another embodiment, the exhaust gas from the engine 220 comprises less than about 3% by volume of oxygen gas.

The low levels of oxygen gas contained in the exhaust gas can increase the inert gas purity of the gas discharged from the conditioning system output 216 of the conditioning system 214. Additionally, the conditioning system 214 can produce high purity inert gas even though the working pressure of the conditioning system 214 is very low. It is contemplated the type of engine 220 employed and the power output of the engine 220 can be varied by one of ordinary skill in the art to achieve the desired purity of the gas outputted from the engine 220. The operating conditions of the engine can also be controlled so as to produce the desired flow characteristics (e.g., volumetric flow rate, pressure, purity, and the like).

For example, in embodiments where the engine 220 is a diesel engine, the volumetric flow rate of exhaust gases out of the engine 220 can be controlled by controlling the speed of the engine 220. This is because diesel engines do not operate with a "throttle valve." Rather, diesel engines always displace the same volume of gas regardless of the power output of the engine 220. For example, a 13 liter engine (wherein 13 liters refers to the total volume swept by the pistons of the cylinders during operation) displaces about 13 liters of air for each two revolutions of the crank shaft (where the engine 220 is a 4-stroke engine). As noted above, the power output from the engine 220 depends on the amount of fuel injected into the combustion chambers of the engine.

During operation, diesel engines can operate over a range of different engine speeds. Additionally, diesel engines generally can output a significant amount of power or torque over a range of different speeds. Thus, in some applications, it may be desirable to set the engine to operate at a fixed speed and allow the engine controller to control fuel injection to maintain the speed of the engine by varying the power output. Thus, if it is desired to cause the engine 220 to output a relatively lower volumetric flow rate of exhaust gas, the engine 220 can be set to operate between idle speed and low engine speeds, for example, between 500 and 1,200 rpm. If higher volumetric flow rates are desired, the engine 220 can be set to operate at speeds above 1,200 rpm. However, other techniques can also be used to vary the volumetric flow rate of exhaust gas out of the engine 220.

An exhaust conduit 226 connects the source 212 with the conditioning system 214. In the illustrated embodiment, the exhaust conduit 226 connects the engine 220 to a mixing plenum 228 of the conditioning system 214. The output of the engine 220 is exhaust flow or fluid that is passed through the exhaust conduit 226 and is fed into the mixing plenum 228.

Optionally, the inert gas generation system 210 can include a temperature control system 236 for controlling the temperature of the exhaust fluid before the exhaust fluid enters the mixing plenum 228. For example, the temperature control system 236 can include a heat exchanger configured to maintain the temperature of the exhaust fluid at a desired temperature.

In the some embodiments, the temperature control system 236 can increase or decrease the temperature of the exhaust fluid as it flows down the exhaust conduit 226. By removing heat from the exhaust fluid flowing through the exhaust conduit 226, a further advantage is provided in preventing undesirable effects, such as overheating, of downstream devices. Although not illustrated, the temperature control system 236 can include temperature sensors, pressure sensors, flow meters, or the like.

Preferably, the mixing plenum 228 is configured and sized to receive a continuous flow of exhaust fluid from the exhaust conduit 226. However, the mixing plenum 228 can be configured and sized to receive an intermittent flow or any type of flow of exhaust fluid. Additionally, the mixing plenum 228 can be adapted to receive the exhaust flow at various volumetric flow rates.

In an exemplary but non-limiting embodiment, the mixing plenum 228 includes a enlarged chamber 229. The chamber 229 can comprise a plurality of channels or tubes that are configured to mix the exhaust fluid with one or more other gases. For example, in some embodiments, the mixing plenum 228 can include the air intake 230 that draws in ambient air surrounding the mixing plenum 228 into the channels within the mixing plenum 228. The mixing plenum 228 can combine and mix the ambient air with the exhaust fluid to output a generally homogeneous or heterogeneous fluid to downstream sections of the conditioning system 214. In other embodiments, the mixing chamber is substantially sealed from ambient air.

Optionally, the mixing plenum 228 can have a controller 232 configured to selectively determine the mixture and content of the output flow from the mixing plenum. For example, the controller 232 can include a device (e.g., a motor) configured to agitate and mix the fluids contained within mixing plenum 228.

Optionally, a feedback device 240 can be configured to control the total level of inert and non-inert gases within the mixing plenum 228. For example, the feedback device 240 can include a controller 242 for controlling the proportion of exhaust fluid from the exhaust conduit 226 to the amount of ambient air from the air intake 230 contained within the mixing plenum 228. In some embodiments, the feedback device 240 can be configured to reduce the amount of air flowing into the air intake 230 so as to increase the purity of the downstream inert gas, described in greater detail below. The feedback device 240 can also be configured to increase the amount of ambient air flowing into the air intake 230 and into the mixing plenum 228 so as to reduce the purity of the downstream inert gas. Thus, the feedback device 240 can selectively increase and/or decrease the content and purity of the downstream fluid in the conditioning system 214.

Although not illustrated, the feedback device 240 can include one or more sensors configured to detect, for example, the level of the constituents within the mixing plenum 228 and/or within the exhaust conduit 226, the flow parameters (e.g., temperature, flow rate, pressure) of the exhaust fluid passing through the exhaust conduit 226, and the like. The feedback device 240 can be an open or closed loop system for controlling the flow of substances passing through the conditioning system 214.

For example, the feedback device 240 can be an open system that commands the temperature control system 236 wherein an operator can determine and set the temperature of the exhaust fluid fed into the mixing plenum 228. In another embodiment, the feedback device 240 can be a closed loop system and be configured to command the temperature control system 236 to dynamically change the temperature of the fluid passing through the conditioning system 214 depending on, for example, the temperature of the fluid passing out of the conditioning system output 216.

Optionally, the system 210 can include a back pressure control device 233 configured to control a back pressure in the mixing plenum 228. For example, the back pressure control device 233 can be a throttle device having an orifice and a valve, such as a butterfly-type valve, or any other kind of valve, for metering the flow rate out of the mixing plenum 228 into the conduit 244. This restriction device 233 can also be used to control a pressure of the gases discharged from the mixing plenum 228 into the conduit 244. Optionally, an electronic controller (not shown) can be incorporated into the device 233 to allow for electronic control of the back pressure generated by the device 233.

Additionally, the device 233 can also be used to affect the oxygen concentration of the exhaust gases discharged from the engine 220. For example, as is well known in the art, as a back pressure in the exhaust system of an engine, such as the engine 220, is raised, the load on the engine increases. Thus, by increasing the restriction or the back pressure in the exhaust system of the engine 220, the load on the engine will increase. If the engine is set to operate at a constant speed, then the engine controller will increase the amount of fuel injected into the combustion chambers of the engine and thereby combust more of the oxygen of the air flowing into the engine 220. Thus, the oxygen content of the exhaust gas leaving the engine 220 will be lower.

Optionally, gas analysis can be performed on the fluid from the source 212 to ensure the gas compositions are within desired levels. Such an analysis can be incorporated into a process controller (not shown) integrated with the conditioning system 214, or any other part of the system 210. In some embodiments, the process controller is integrated with the controller 242. However, other components of the conditioning system 214 can have one or more process controllers for determining the composition of the fluid passing through the system 214 to control the composition of the output gas passing out of the conditioning system output 216.

The conditioning system 214 can also include a plenum conduit 244 that extends from the mixing plenum 228 to a compressor 246. Thus, fluid from the mixing plenum 228 can pass through the plenum conduit 244 and into the compressor 246.

In one non-limiting embodiment, the compressor 246 is configured to draw fluid from the mixing plenum 228 and increase the pressure thereof. For example, the compressor 246 can be configured to raise the pressure of the fluid from the mixing plenum 228 to pressures from about 100 psig to about 600 psig.

The compressor 246 can be any type of compressor. Preferably, the compressor 246 is a rotary screw type compressor. However, the compressor 246 can be a pump with fixed or variable displacement that causes an increased downstream fluid pressure. It is contemplated that one of ordinary skill in the art can determine the type of compressor to achieve the desired pressure increase of the fluid. For example, in one embodiment the compressor 246 is a booster compressor. Although not illustrated, the inert gas generation system 210 can have a plurality of compressors configured to draw fluid from the mixing plenum.

The compression process performed by the compressor 246 can be used to remove constituents from the exhaust fluid it receives from the plenum conduit 244. For example, the mixing plenum 228 can feed exhaust fluid that comprises water into the plenum conduit 244. The plenum conduit 244 then delivers the fluid to the compressor 246. The compression process of the compressor 246 can remove an amount, preferably a significant amount, of water from the fluid. In one exemplary non-limiting embodiment, a water knock out vessel is included in the compressor 246 to collect water removed from the fluid. Additionally, a coalescent filter (not shown) can be provided to remove additional entrained water and oil carryover that may be present in the output fluid.

The conditioning system 214 can also include a compressor conduit 250 that extends from the compressor 246 to a filtration unit 251.

The filtration unit 251 can include one or more devices to remove components from the fluid delivered by the compressor conduit 250. In the illustrated embodiment, the filtration unit 251 includes a filtration system 252 and a particulate filter 260. In one non-limiting exemplary embodiment, fluid delivered from the compressor 246 can pass through the compressor conduit 250 and into the filtration unit 251.

Optionally, the conditioning system 214 can also include a temperature control system 256 configured to adjust the temperature of fluid passing through the compressor conduit 250. Preferably, the temperature control system 256 is configured to lower the temperature of the fluid proceeding along the compressor conduit 250 to a desired temperature.

For example, the temperature control system 256 and the compressor 246 can work in combination to adjust the temperature of the fluid passing therethrough to a desired temperature to prevent, for example, overheating of downstream components (e.g., the filtration unit 251). In at least one embodiment, the compressor 246 can provide fluid to compressor conduit 250 at a predetermined pressure. The temperature control system 256 can be configured to increase or decrease the temperature of the fluid to adjust the pressure of the fluid. For example, the temperature control system 256 can reduce the temperature of the fluid passing through the compressor conduit 250 to reduce the pressure of the fluid delivered to the filtration unit 251. Alternatively, the temperature control system 256 can increase the temperature of the fluid passing through the compressor conduit 250 to increase the pressure of the fluid delivered to the filtration unit 251.

The temperature control system 256 can be different or similar to the temperature control system 236. In at least one embodiment, the temperature control system 256 is a heat exchanger that can rapidly change the temperature of the fluid that passes along the compressor conduit 250. Similar to the temperature control system 236, the temperature control system 256 can be part of an open or closed loop system.

The filtration unit 251 can be configured to capture and remove undesirable substances from the exhaust fluid. The filtration unit 251 can include a filtration system 252 configured to remove undesired substances that may be present in the exhaust fluid. For example, the filtration system 252 can be configured to capture selected gas impurities. In one embodiment, the filtration system 252 can capture carbon oxides, hydrocarbons, aldehydes, nitrogen oxides (e.g., typically nitric oxide and a small fraction of nitrogen dioxide), sulfur dioxide, and/or other particulate that may be in the exhaust fluid. The filtration system 252 can comprise one or more absorption/adsorption filters and/or vessels that are suitable for removing one or more undesirable substances. Optionally, the filtration system 252 can include a catalytic converter commonly used in the automotive industry.

With continued reference to FIG. 7, the filtration unit 251 of the conditioning system 214 can also include a filtration system conduit 254 that extends from the filtration system 252 to the particulate filter 260. Such a particulate filter 260 can comprise of one or more absorption filters and/or vessels. The particulate filter 260 can be configured to remove particulates that may undesirably adversely affect, for example, the performance of downstream components of the conditioning system 214 or purity of the gas produced by the conditioning system 214. If the engine 220 is a diesel engine, the particulate filter 260 is preferably a filter that captures and removes diesel particulate matter from the fluid passing therethrough. In one embodiment, the particulate filter 260 removes a substantial portion of the particulate matter from the fluid.

The system 210 can also include an additional heat exchanger downstream from the particulate filter 260. The heat exchanger can be configured to adjust the temperature of the filtered fluid from the particulate filter 260. Raising the temperature of the upstream fluid can be beneficial because such heating reduces the likelihood that any remaining water vapor will condense out and damage downstream components. Optionally, the additional heat exchanger can be provided with heat from upstream temperature control systems (e.g., temperature control systems 236, 256). For example, the temperature control system 236 can be a heat exchanger that cools the exhaust fluid produced by the engine 220. The heat removed by the heat exchanger 236 can be delivered to the additional downstream heat exchanger. The additional heat exchanger can then use that energy to heat the filtered fluid preferably at some point downstream of the filtration unit 251. It is contemplated that at least one of the temperature control systems can provide energy (e.g., heat) to another temperature control system or heat exchanger. One of ordinary skill in the art can determine the type, location, and configuration of one or more temperature control systems to control the temperature of the exhaust fluid as desired.

The system 210 can also include a particulate conduit 262 which extends from the particulate filter 260 to a separation unit 266.

With reference to FIGS. 7 and 7A, the conditioning system 214 can also include a device adapted for separating inert substances from non-inert substances. In the illustrated embodiment, the conditioning system 214 includes the separation unit 266. In one embodiment, the separation unit 266 is a membrane separation unit including a chamber 268 and a separation membrane 270 (shown in FIG. 7A) within the chamber 268. As shown in FIG. 7A, the membrane separation unit 266 has a membrane 270 that partitions the chamber 268 into a plurality of chambers.

In the illustrated embodiment, the membrane 270 divides the chamber 268 into an inert chamber 276 and a non-inert chamber 278. Preferably, during operation of the system 210 at least a portion of the inert chamber 276 contains fluid that comprises mostly inert gas, and the non-inert chamber 278 contains mostly non-inert gas that is separated from the exhaust fluid. Additionally, the separation unit 266 can have an inlet 280 and an outlet 281 that are located on the same side of the membrane 270. Both the inlet 280 and the outlet 281 can be in fluid communication with the inert chamber 276. Preferably, the inlet 280 and outlet 281 are in fluid communication with opposing portions of the inert chamber 276.

The inert chamber 276 can be sized and configured to define a flow path between the inlet 280 and the outlet 281. The non-inert chamber 278 can be sized and configured to define a flow path between the membrane 270 and the vent 294. Preferably, the vent 294 is located on one side of the membrane 270 and both the inlet 280 and the outlet 281 are located on the other side of the membrane 270.

The membrane 270 can be configured to allow certain substances to pass therethrough at a first flow rate and other substances to pass therethrough at a second flow rate different than the first flow rate. For example, such membrane separation units 266 can be provided with a membrane 270 that allows different gases to pass therethrough at different rates. The effect is that the retentate gas, i.e., gases that do not permeate through the membrane 270, remain on the inlet side of the membrane 270 within the inert chamber 276. These gases proceed along the chamber 276 towards, and eventually pass through, the outlet 281. The permeate gases, preferably non-inert gas, of the fluid delivered through the inlet 280 pass through the membrane 270 and through the non-inert chamber 278 and are discharged out of the vent or outlet 294 into the atmosphere, or are further sequestered.

In an exemplary but non-limiting embodiment, the membrane 270 is an elongated generally planar membrane extending across the chamber 268 and is configured to allow the migration of fluid (e.g., gas) therethrough. Fluid, preferably comprising gases, enters the inert chamber 276 through the inlet 280, some gases pass through the membrane 270 while others do not. In some membrane separation units 266, the membrane 270 can be configured to allow non-inert gases (e.g., oxygen) to pass more readily through the membrane 270 and inert gas (e.g., nitrogen) to pass through the membrane 270 at a much lower rate. The membrane 270 can thus be used to separate fluid passing in through the inlet 280 into an inert gas flow that passes out of the outlet 281 and a non-inert gas flow that passes through the membrane 270 and out of the vent 294.

In one embodiment, fluid passing through the inlet 280 and into the separation unit 266 can include, for example but without limitation, nitrogen gas, oxygen gas, oxides of carbon, oxides of nitrogen, and oxide of sulfur, as well as other trace gases. The membrane 270 can be configured to allow one or more of the non-inert gases, such as oxygen gas, to pass therethrough at a relatively higher rate than the rate at which inert gas, such as nitrogen gas, can pass therethrough. Other gases such as carbon dioxide, oxides of nitrogen, oxides of sulfur, and other trace gases may also pass at a higher rate through the membrane 270 than the rate at which nitrogen gas passes through the membrane 270. The inert gases are thus captured in the inert chamber 276 and the non-inert gases pass through the membrane 270 and into the non-inert chamber 278. The result is that the gas remaining in the inert chamber 276 has a high concentration of inert gases. Of course, the concentration of the inert gas in the inert chamber 276 can vary along the inert chamber 276 in the downstream direction. Preferably, the gas in the inert chamber 276 and proximate to the outlet 281 comprises substantially inert gas.

In the present exemplary but non-limiting embodiment, the fluid within the inert chamber 276 can be largely nitrogen gas and may include other inert gases. For example, the inert chamber 276 can contain inert gases such as, for example, without limitation, argon, carbon monoxide, and hydrocarbons. Preferably, most of the hydrocarbons have been filtered out of the exhaust fluid produced by the engine 220 by the filtration unit 251. Optionally, the membrane 270 can be configured to allow water vapor to pass therethrough at a higher rate than the rate at which nitrogen gas can pass therethrough. Thus, the separation unit 266 can receive fluid having water, inert gases, and non-inert gases. The separation unit 266 can produce a first flow of mostly inert gas flow and a second flow of non-inert gas and water. The first flow passes through the inert chamber 276 and out of the outlet 281 and the second flow passes through the membrane 270 and then through the non-inert chamber 278 and out of the vent 294.

FIG. 7B illustrates an embodiment of a membrane that can be employed by the separation unit 266 to separate fluid. The components of the system 266 have been identified with the same reference numerals as those used to identify corresponding components of the system 210, except that "'" has been used.

In one exemplary but non-limiting embodiment, the membrane 270' can be a hollow fiber, semi-permeable membrane. A body 302 of the membrane 270' can allow certain substances to pass therethrough at a first flow rate and other substances to pass therethrough at a second flow rate different than the first flow rate. Although not illustrated, the hollow fiber membrane 270' can be disposed in the chamber 268 of the unit 266 shown in FIG. 7A. The construction of this type of membrane separation unit is well-known in the art, and thus, a further detailed description of the system 266 is not included herein.

The hollow fiber membrane 270' can include an inlet 300, the body 302, a central chamber 310, and an outlet 304. The hollow fiber membrane 270' can separate the fluid provided by the conduit 262 (FIG. 7) into a purified inert gas flow and a non-inert gas flow. In some embodiments, with reference to FIG. 7B, fluid passing through the conduit 262 can pass into the separation unit 266 and into the inlet 300 of the membrane 270' in the direction indicated by the arrow 308. The fluid entering the membrane 270' can include nitrogen gas, oxygen gas, carbon dioxide, oxides of nitrogen, and oxides of sulfur, as well as other trace gases. As the fluid flows through the central chamber 310 defined by the body 302, the fluid is separated into its component gases and the more permeable gases migrate through the body 302. Preferably, the membrane 270' separates the fluid it receives into a first stream of mostly inert fluid that passes through the chamber 310 and out of the outlet 304 and another stream of fluid that passes through the body 302 of the membrane 270' in the direction indicated by arrows 311. That is, a stream of inert gases passes through the chamber 310 and out of the outlet 304. The separation unit 266 then delivers those inert gases to the conduit 290 (see FIG. 7). The non-inert gases which pass through the body 302 of the membrane 270' can be directed to the vent 294 of the unit 266 and discharged into the atmosphere, or further sequestered.

Although not illustrated, the separation unit 266 can include any suitable number of membranes 270'. The membrane separation 266 may have an increased or reduced number of membranes 270' for an increased or reduced, respectively, separation capacity of the separation unit 266. For example, the separation unit 266 can include thousands or millions of the hollow fiber semi-permeable membranes 270' that are bundled or packed together. The separation unit 266 can therefore have an extremely large membrane surface area capable of separating non-inert gas from the fluid passing through the conditioning system 214. Of course, the length of the membrane 270' can be varied to achieve the desired membrane surface area and pressure drop across the separation unit 266.

The separation unit 266 can receive exhaust fluid from the conduit 262 and remove at least a portion of the non-inert component of the exhaust fluid. The separation unit 266 can then output an inert rich gas. In one exemplary embodiment, the separation unit 266 can produce inert rich gas that comprises at least 96% by volume of inert gas. In one exemplary embodiment, the separation unit 266 can produce inert rich gas that comprises about 98% by volume of inert gas. In another embodiment, the inert rich gas comprises about 99% by volume of inert gas. In yet another embodiment, the inert rich gas comprises about 99.9% by volume of inert gas. Advantageously, because the separation unit 266 only has to remove a low amount of non-inert gas from the exhaust fluid provided by the conduit 262, the separation unit 266 can produce highly pure inert rich gas at high volumetric flow rates. The separation unit 266 can therefore rapidly separate the exhaust flow into non-inert rich gas and an inert rich flow. In one embodiment, the separation unit 266 removes less than about 10% by volume of the fluid and discharges highly pure inert rich gas.

Optionally, the conditioning system 214 can comprise a plurality of separation units 266. Each of separation units 266 can include one or more membranes 270', or membrane 270. Thus, each of the membrane separation units 266 can comprise one or more similar or dissimilar membranes. It is contemplated that a plurality of separation units 266 of the conditioning system 214 can be in a parallel configuration or in a series configuration. For example, a plurality of membrane separation units 266 can be in series along the conditioning system 214 to provide an extremely pure inert fluid, preferably a gas, out of the conditioning system output 216. Each of the separation units 266 can increase the purity of the inert gas passing through the conditioning system 214.

In one exemplary but non-limiting embodiment of FIG. 7C, the separation unit 266 is a pressure swing adsorption system (PSA) that preferably produces a purified inert gas. The PSA 266 may comprise a plurality of beds for producing inert rich gas. Preferably, each of the beds includes an adsorption material (e.g., carbon molecular sieve or silica gel) adapted to adsorb a non-inert component at a faster rate than the rate of absorption of inert components. In one non-limiting embodiment, the PSA 266 includes a pair of beds 360, 362 and each bed 360, 362 can have adsorption material adapted to adsorb oxygen at a higher rate than its rate of adsorption of nitrogen. Thus, oxygen is quickly trapped by the beds 360, 362 and nitrogen can pass, preferably easily, through each of the beds. The pressure upstream of the PSA 266 can be increased or decreased to increase or decrease, respectively, the flow rate at which gases pass through the beds 360, 362. Additionally, the proportion of the inert gas to the non-inert gas produced by the PSA 266 can be increased or decreased by decreasing or increasing, respectively, the upstream pressure.

During a first production cycle, the valves 359, 361, 363 are closed and the fluid from the conduit 262 flows through the conduits 364, 366 and into the bed 360. The adsorption material in the bed 360 captures the non-inert substances in the fluid flow and allows fluid comprising a high proportion of inert substances (e.g., nitrogen gas) to non-inert substances to pass therethrough. The inert substance, preferably inert fluid (e.g., an inert rich gas), then passes out of the bed 360 and into the conduits 368, 324. The conduit 324 can then deliver the inert rich gas to the conduit 290 (FIG. 7).

While fluid flows through the bed 360, the bed 362 can optionally undergo depressurization and can be purged by, for example, nitrogen rich fluid to remove non-inert substances, such as oxygen, that has accumulated in the bed 362. The separating capacity of the bed 362 is thus increased due to the removal of substances from the bed. For example, the valves 369, 371 can be closed so that fluid provided by the bed 360 pass through the conduits 368, 373, 374 and into the bed 362 to purge the bed 362. Optionally, valve 369 can be left open during this stage. The purge fluid can pass out of the bed 362 and into the conduits 375, 376. The purge fluid preferably comprises substantial amounts of non-inert gas such as oxygen and other trace gases. Although not illustrated, the separation system 266 can have a purge container that contains a fluid that can be used to purge the beds 360, 362.

During a second cycle, the valves 363, 377 are opened and the valves 383, 385 are closed. Fluid from the conduit 262 passes through the conduit 379 and into the conduit 375 and through the bed 362. The bed 362 can capture non-inert components of the fluid and permit inert components to flow into the conduits 374, 324. While the fluid flows through the bed 362, the bed 360 can optionally undergo depressurization and can be purged by some, for example, nitrogen rich fluid to remove oxygen that has accumulated in the bed 360. For example, the valves 371, 369 can be closed and the valve 370 can be opened so that fluid from the bed 362 passes through the conduits 374, 373, 368 to purge the bed 360. Of course, the purge cycle can be performed periodically during a production cycle.

In the illustrated embodiment, the first cycle can be performed until the bed 360 has reached a predetermined saturation level. For example, the first cycle can be performed until the bed 360 is generally completely saturated. After the bed 360 is saturated, the bed 360 can be purged so that the non-inert substances captured by the bed 360 are discharged. After the first cycle, the second cycle can be performed until the bed 362 likewise reaches a predetermined saturation level. The bed 362 and be subsequently purged to remove non-inert substances from the bed 362. These acts can be repeated to produce highly purified inert rich gas.

In some embodiments, such as that illustrated in FIG. 7D, a vacuum pump 381 can be used to increase the performance of the PSA 266. In this arrangement, the system can be referred to as a "Vacuum Swing Adsorption" (VSA) device. In such a device, the vacuum pump 381 is disposed on the outlet ends of the beds 360, 362, so as to enhance the desorption process.

Embodiments incorporating a PSA or a PSA device can further include a buffer tank, such as the buffer tank 365. In such embodiments, the buffer tank can be configured to store pressurized gas discharged from the bed 360, and thus provide a more continuous flow of gas from the separation unit 266. In such embodiments, the buffer tank 365 can be connected to the bed 360 with a discharge line 356A, which guides gas from the bed 360 to the buffer tank 365.

A further advantage can be achieved where the buffer tank is also connected to a valve 365C and a reverse flow line 365B. In such embodiments, the bed 360 can also be connected to a vent line at its inlet end. As such, when the vent is opened, the gas in the buffer tank 36 can be used to purge the bed 360 to perform the desorption process for the bed 360. In some embodiments, the buffer tank 365 can be sized to be sufficiently large that the buffer tank 365 can continue to supply gas to downstream components through the line 290 while, at the same time, purge the bed 360. As such, the separation unit 266 can continue to operate while purging (i.e., the desorption process) even though it only has one tank.

With reference to FIG. 7F, in some embodiments, the separation unit 266 can include a plurality of separation devices comprising at least one of an adsorption device and a membrane separation device. For example, in some embodiment, the separation unit 266 can include, at its upstream end, an adsorption device 266A. The adsorption device 266A can be any type of adsorption device, including but without limitation, any of the adsorption devices disclosed herein such as the PSA shown in FIG. 7C, the VSA shown in FIG. 7D, or the buffer tank type system shown in FIG. 7E.

The outlet of the adsorption device 266A can be connected to the inlet of yet another separation device. In the illustrated embodiment, the outlet of the adsorption device 266A is connected to the inlet of a membrane device 266B. The membrane device 266B can be any type of membrane separation device, including but without limitation, any of the membrane separation devices disclosed herein such as those described with reference to FIGS. 7A and 7B, or any other known membrane separation device.

In this configuration, the gas discharged from the adsorption device 266A is further purified by the membrane device 266B. In some embodiment, the order of the devices can be reversed. For example, the devices 266A, 266B can be connected such that gas discharged from the membrane device 266B is further purified by the adsorption device 266A.

In some embodiments, the separation unit 266 can comprise a series of membrane separation units 271A, 271B, as illustrated in FIG. 7G. In this arrangement, the feed gas first enters the first membrane device 271A. The permeate from this first unit 271A is more likely to be highly contaminated. Thus, the permeate from the membrane unit 271A can be vented out of the system. The retentate, on the other hand, is discharged to the inlet of the second membrane device 271B.

The permeate from the second membrane device 271B will be less contaminated than the permeate from the first membrane unit 271A. Thus, in some embodiments, the permeate from the second membrane unit 271B can be returned to the system at a point upstream from the second membrane unit, such as the inlet of the first membrane device 271A, or another location. For example, but without limitation, the permeate from the second membrane unit 271B can be returned to the system at the inlet to the compressor 246, and thus eventually returns to the inlet of the first membrane device 271A.

In some embodiments, the separation unit 266 can include more than two membrane separation devices. Further, in such embodiments, the permeates from each of the membrane devices downstream from the first membrane device 271A can be returned to the system at a point upstream of the first separation unit 271A, such as to the inlet of the compressor 246, although these permeates can be returned to the system at other points. In some embodiments, the membrane separation units can be configured to operate at different pressures, can include membranes with different pore sizes for separating different compounds, and/or can have other differences.

These types of arrangements can provide further advantages. For example, exhaust gas from an internal combustion engine can include many different compounds. Thus, using multiple separation devices can better remove numerous compounds that exist in internal combustion engine exhaust gas that may not be desired. Further, different separation devices, such as PSA, VSA, and membrane-type devices can have different performance characteristics in terms of rate at which they can separate certain compounds out of a feed stream of gas. Thus, by combining different types of separation devices, the separation unit 266 can achieve better performance, particularly in the environment of use where it is desired to separate certain compounds out of exhaust gas of an internal combustion engine or other environments of use.

Optionally, the conditioning system 214 (FIG. 7) can also include a purity control system 320 for controlling the purity of the fluid passing out of the conditioning system output 216. The purity control system 320 can selectively determine the purity of the fluid passing to the conditioning system output 216. In one embodiment, the purity control system 320 can comprise one or more valves for restricting the flow of fluid from the separation unit 266 and may have one or more sensors for measuring the contents of the fluid flow produced by the separation unit 266.

In an exemplary but non-limiting embodiment, the purity control system 320 includes a valve 322 for restricting the flow of fluid from the separation unit 266, preferably a membrane separation unit. When the inert gas concentration from the separation unit 266 is below a predetermined amount, the valve 322 can selectively restrict the flow through the conduit 324 so as to raise the pressure in the membrane separation unit 266. In the illustrated embodiment of FIGS. 7 and 7A, when the valve 322 inhibits the flow through the conduit 324 which extends from the conduit 290 to a compressor 330, the pressure within the inert chamber 276 is increased. By raising the pressure in the inert chamber 276, the volumetric flow rate of gas passing through the membrane 270 and into the non-inert chamber 278 is increased. Thus, because a greater amount of permeate gas passes through the membrane, there is increased concentration of the inert gas discharged from the membrane separation unit 266. Of course, the increased upstream pressure may reduce the volumetric flow rate of the fluid passing out the output 216.

When the separation unit 266 produces an inert gas concentration above a predetermined amount, the valve 322 can be opened so as to increase the flow rate of fluid through the conduit 324. By opening the valve 322, the upstream pressure can be reduced in the conditioning system 214 while providing an increased output from the output 216. For example, by reducing the pressure in the separation unit 266 having a membrane, the volumetric flow rate of gas passing from the inert chamber 276 through the membrane 270 (FIG. 7A) and into the non-inert chamber 278 may be reduced. Thus, a reduced amount of permeate gas may pass through the membrane. In this manner, the proportion of the inert gas to non-inert gas of the fluid discharged from the separation unit 266 into the conduit 290 may be reduced. Thus, the valve 322 can be operated to determine the volumetric flow rate and/or the purity of the fluid outputted from the conditioning system 214. One of ordinary skill in the art can determine the desired purity of the gas flowing from the conditioning system 214 and the desired volumetric flow rate based on the use of the gas.

With reference to FIG. 7, the purity control system 320 can also include an inert gas sensor 334 that is configured to detect flow parameters (e.g., the concentration of inert gases of the fluid, the amount of fluid emanating from the separation unit 266, and the like). The measurements from the inert gas sensor 334 can be used to adjust the amount of fluid that flows through the conduit 324 by operating the valve 322. It is contemplated that the purity control system 320 can be an open or closed loop system.

Optionally, the conditioning system 214 can also include a compressor 330 (e.g., a booster pump) that can be used to raise the pressure of the gas discharged from the separation unit 266 to a desired pressure. In some embodiments, the booster compressor 330 can be configured to raise the pressure of gas to about 1000 psig. In one embodiment, the booster compressor 330 can increase the pressure of the inert rich gas from about 200 psig to about 4000 psig. For example, the booster compressor 330 can increase the pressure of the exhaust fluid up to about 2000 psig. Optionally, the booster compressor 330 can be configured to increase the pressure of the exhaust fluid up to about 5000 psig. However, the booster compressor 330 can increase the pressure to any suitable pressure depending on the use of the inert rich gas. Inert gas from the booster compressor 330 can be passed through a conduit 344 and out of the conditioning system output 216 to the upper portion 348 of a drill stem arrangement 18, as illustrated in FIG. 1. The gas can continue to flow until it reaches the drill stem assembly 20 as described above. Thus, the compressor 330 can be selectively configured to raise the pressure of the gas to various pressure levels depending on the desired flow characteristic of the gas passing through the drill stem arrangement 18.

The engine 220 can be selected and configured to provide sufficient flow of exhaust fluid for generating the desired amount of inert gas outputted from the conditioning system 214 for any of the uses of inert gas described herein. That is, the engine 220 can be selected to output different levels of purity and different gas flow rates. Additionally, the operating speed of the engine 220 can be controlled to ensure further that the desired amount of exhaust fluid is delivered to the conditioning system 214. The conditioning system 214 is preferably configured to produce and deliver generally highly pure inert gas which is then, in turn, used by, for example but without limitation, a drilling operation. It is contemplated that various components can be removed from or added to the conditioning system 214 to achieved the desired flow characteristics of the output fluid flow. For example, the compressor 246 and the booster compressor 330 can be configured so that the conditioning system output 216 discharges inert fluid at a sufficient pressure and volumetric flow rate for any of the uses disclosed herein. Additionally, the filtration system 252 and the particulate filter 260 can be configured to remove any undesirable substance in the exhaust fluid produced by the engine 220. Optionally, one or more components of the conditioning system 214 can be removed or not used during a production cycle. For example, during an operation cycle, the filtration system 252 and the particulate filter 260 can be off-line if some substances do not need to be filtered out of the exhaust fluid. In another operation cycle, the filtration system 252 and the particulate filter 260 can be online such that the inert gas generating system 210 provides an extremely pure inert gas from the conditioning system output 216.

In an exemplary but non-limiting embodiment, the conditioning system 214 may have a bypass system 350 for controlling the mixture of the fluid flow flowing out of the conditioning system output 216. For example, the bypass system 350 can include a bypass system conduit 352 which extends from a location upstream from the unit 266 to a location of the conditioning system 214 downstream from the unit 266. In the illustrated embodiment, the bypass system conduit 352 extends from the particulate conduit 262 to the conduit 344. However, the bypass system conduit 352 can extend from any point along the conditioning system 214 upstream from the separation unit 266 to any point of the conditioning system 244 downstream from the separation unit 266.

In the illustrated embodiment, the flow passing through the conduit 262 can be separated into a first flow flowing into the separation unit 266 and a second flow flowing into the bypass system conduit 352. An amount of the first flow can pass through the separation unit 266 and through the conduits 290, 324, compressor 330, and the conduit 344. Of course, the separation unit 266 can filter out non-inert portions of the first flow. The concentrated inert gas flow produced by the separation unit 266 can be combined with the second gas flow passing through the conduit 352 at the junction of the conduits 352, 344. Thus, when the concentration of inert gas produced by the conditioning system 214 is below a predetermined amount, the bypass system 350 can reduce, or stop, the flow of fluid through the conduit 352. By reducing the flow of the fluid through the conduit 352, the purity of gas discharged from the conditioning system output 216 can be increased.

Alternatively, when the concentration of inert gas produced by the conditioning system 214 is above a predetermined amount, the bypass system 350 can increase the amount of fluid flowing through the conduit 352, which is then combined with the inert fluid flow produced by the separation unit 266. In this manner, the concentration of inert gas outputted from the conditioning system output 216 can be reduced. The bypass system 350 can therefore be operated to control selectively and determine the purity of the inert gas produced and delivered out of the conditioning system 214. Optionally, of course, the operating speed of the engine 220 can be varied to control the purity and the amount of gas discharged from the conditioning system.

Optionally, the bypass system 350 can include a valve 354 that can be used to control selectively the flow rate of the fluid passing through the conduit 352. Those skilled in the art recognize that the valves of the conditioning system 214 may be manually or automatically controlled and may comprise sensors.

Optionally, a further advantage can be achieved wherein one or more of the components of the conditioning system 214 can be powered by the engine 220. This provides the advantage that the source of the exhaust fluid can also be used to provide power to various components of the conditioning system 214. Preferably, engine 220 can provide sufficient power to operate one or more of the components of the conditioning system 214. Thus, those components may not require any additional power from another power source.

In some embodiments, engine 220 can produce exhaust fluid and a another secondary output, such electrical power. For example, the engine 220 can be a generation system (e.g., a generator) that generates power in the form of electricity. The electricity can be passed through an electrical line 348 and can be delivered to a motor of the compressor 246. The electricity generated from the engine 220 can therefore be used to power the compressor 246. The engine 220 advantageously provides exhaust fluid that can be treated by the conditioning system 214 to produce a highly pure inert gas and can be used to power the compressor 246. It is contemplated that one of ordinary skill in the art can determine the appropriate sized engine 220 to provide the desired power suitable for driving one or more of the components, such as compressor 246.

Although not illustrated, the engine 220 can be in communication with other components of the conditioning system 214. For example, the engine 220 can be in communication with the booster 330. An electric power line can provide electrical communication between the engine 220 and the booster 330. Additionally, the engine 220 can provide power to the compressor 246 and the booster 330 simultaneously, or independently.

Optionally, the engine 220 can be in communication with one or more of the temperature control systems of the conditioning system 214. For example, the engine 220 can provide power in the form of electricity to a temperature control system that can increase the temperature of the fluid passing through the conditioning system 214. Optionally, the valves 322 and 354 may be automatic valves that are also powered by the engine 220. The valves 322, 354 can comprise controllers and other sensor devices that can optionally be powered by the engine 220.

The engine 220 can be in communication with one or more of the feedback devices of the conditioning system 214. Although not illustrated, the engine 220 can have a communication line connected, for example but without limitation, to the feedback device 240 and also the inert gas sensor 334. The feedback devices may selectively control the operating speed of the engine 220. For example, if the exhaust fluid flow reaches a predetermined volumetric flow rate, a feedback device may reduce the engine's operating speed. Additionally, the operating speed of the engine 220 may be selectively controlled to determine the amount of power produced by the engine 220. In one embodiment, the operating speed of the engine 220 can be increased or decreased to increase or decrease, respectively, the amount of electricity produced by the engine 220.

Optionally, a further advantage can be achieved where the engine 220 can provide mechanical power to one or more components of the conditioning system 214. In an exemplary but non-limiting embodiment, the engine 220 has a mechanical output system 351 in the form of an output shaft 352 that can be connected to one or more of the components of the conditioning system 214. For example, the output shaft 352 in the illustrated embodiment is connected to the mixing plenum 228. As the engine 220 operates, the output shaft 352 rotates. The rotation of the output shaft 352 can be used to agitate the fluid contained in the mixing plenum 228. In one embodiment, the rotational movement of the output shaft 352 is translated into linear movement of at least one plenum within the mixing plenum 228. The movement of the plenum can agitate fluid comprising the exhaust fluid and the air drawn through the air intake 230. Although not illustrated, a further advantage is achieved where the output shaft 352 is connected to the compressor 246 to as to drive the compressor 246. In the system 210, the compressor 246 can require substantial power to compress the gases flowing therethrough. Thus, by driving the compressor with a shaft from the engine 220, the compressor 246 can be driven more efficiently. For example, a direct shaft drive connection between the engine 220 and the compressor 246 avoids the losses generated by converting shaft power from the engine 220 into electricity, then back to shaft power with an electric motor at the compressor 246. Further, the entire system 210 can be made lighter and more easily portable. For example, a mechanical connection between the engine 220 and the compressor 246 can eliminate the need for an electric motor for driving the compressor 246.

Optionally, a further advantage can be achieved where at least one or more devices of the drilling operation uses inert gas and/or power produced by the engine 220. For example, various components of the drill stem arrangement 18 (FIG. 1) can use inert rich gas produced by the conditioning system 214 and can be operated by power generated by the engine 220. Many devices, such as lights, fans, blowers, venting systems, and/or other electrical devices, can receive power generated by the engine 220. For example, in one non-limiting embodiment, the engine 220 generates power that operates the compressor 246, the booster 330, lights proximate to the generation system 210, a fan which blows across the inert gas generating system 210, and/or a plurality of lights that illuminate the area surrounding the drilling operation.

The engine 220 can also provide power to a battery or storage device. For example, the engine 220 can operate and can deliver power in the form of electricity to a battery which, in turn, stores the power. The battery can then deliver power to one or more components of the conditioning system 214 or the drilling operation.

In operation generally, the engine 220 can be operated to generate exhaust fluid. The exhaust fluid can pass through the exhaust conduit 226 and into the mixing plenum 228. The exhaust fluid can be discharged from the mixing plenum 228 and through the plenum conduit 244 and into the compressor 246. The compressor 246 can increase the pressure of the exhaust gas and deliver the exhaust gas through the conduit 250 to the filtration unit 251. The filtration unit 251 can remove various substances from the exhaust fluid, which is then passed through the separation unit 266. The separation unit 266 can receive fluid having a first concentration of inert gas and output a fluid having a second concentration of inert gas higher than the first concentration. The inert gas can then be passed through the conduits 290, 324 and into the booster compressor 330. The booster compressor 330 can increase the pressure of the fluid and discharge the fluid to the conduit 344 which, in turn, delivers the fluid out of the output 216.

With reference to FIG. 7H, a further modification of the separation unit is illustrated therein and is identified generally by the reference numeral 266'. In this arrangement, the separation unit 266 can include a plurality of separation devices, for example, separation devices 266, 266a, and 266b. However, any number of separation devices can also be used.

Each of the separation devices 266, 266a, 266b, etc., can be constructed in accordance with the description set forth above of the various embodiments of the separation unit 266. Thus, while the separation device 266 may be any one of a membrane, pressure screen adsorption, or a hybrid separation device. The separation devices 266a, 266b can be the same as the unit 266, or have a different arrangement than the unit 266.

In some embodiments, the separation unit 266' can be configured to allow for the selective activation or deactivation of the plurality of separation units 266, 266a, 266b that form the separation unit 266'. For example, the inlet side of the separation unit 266 can include an intake manifold 267 connecting each of the separation units 266, 266a, 266b with the conduit 262. Additionally, the separation unit 266' can include a discharge manifold 269 connecting the outlets of the separation devices 266, 266a, 266b.

The separation unit 266' can include a plurality of inlet and outlet valves configured to allow each of the separation units 266, 266a, 266b to be connected to the intake and discharge manifolds 267, 269. For example, intake valves 265, 265a, 265b can be configured to connect the inlets of the separation devices 266, 266a, 266b, respectively, to the intake manifold 267. Similarly, valves 273, 273a, 273b can be configured to selectively connect the separation devices 266, 266a, 266b, respectively, to the discharge manifold 269.

Thus, by selectively opening or closing the valves 265, 265a, 265b, 273, 273a, 273b, the devices 266, 266a, 266b can be selectively activated or deactivated. In other words, the devices 266, 266a, 266b can either be connected or disconnected from the intake manifold 267 and discharge manifold 269, independently.

Optionally, the system 210 can include a $CO_2$ scrubber 340 configured to remove carbon dioxide discharged from the booster compressor 330 through the conduit 344. Additional valves 382 can be arranged to guide all or some of the gas discharged through the conduit 344 into the carbon dioxide scrubber 380. The carbon dioxide removal device 380 can be any type of such device.

Optionally, the system 210 can also include a bypass inlet line 386 having an input port 388 configured to allow a gas to be input into the system 210 at a point downstream from the compressor 246. However, the inlet conduit 386 can be connected to any portion of the system 210.

In the illustrated embodiment, the inlet conduit 386 allows a gas, such as compressed air, to be input into the system 210 bypassing the flow source 212. For example, the inlet conduit 386 can be connected to the conduit 351 so as to be downstream from the engine 220. Optionally, the input conduit 386 can be connected to the conduit 244 upstream from the compressor 246, and thus ambient air can be allowed to flow into the input conduit 386 and thereafter be compressed by the feed air compressor 246. However, in yet other embodiments, the input conduit 386 can be connected downstream of the conditioning system 214, as illustrated in FIG. 7.

In such arrangements, the input conduit 386 allows a gas to be introduced into the system 210. This can be advantageous if a portion or all of the flow source 212 or a portion or all of the conditioning system 214 are inoperative.

For example, an alternative source 390 can be connected to the input port 388 and thus supply fluid to the system 210 bypassing the flow source 212 and/or the conditioning system 214. In some embodiments, the source 390 can be an air compressor configured to discharge compressed air into the input conduit 386. As such, the remainder of the system 210, i.e., the portion of the system 210 downstream from the flow source 212 and the conditioning system 214, can operate on compressed atmospheric air, or any other source fluid. This provides an advantage that if the engine 220 is inoperative, and/or if the compressor 246 is inoperative, pressurized fluid can be introduced into the system 210 and be treated by the downstream components.

In yet other embodiments, the source 390 can be in the form of a flue gas supply. For example, in applications where the system 210 is used in the vicinity of a supply of a sufficient flow rate of exhaust gas, or another type of gas with a reduced concentration of oxygen, such gas can be introduced into the system 210 through the inlet conduit 386. In some embodiments, the source 390 can be the exhaust system of the engine driving a ship, or other kind of vehicle.

In embodiments where the source 390 is the exhaust system of a ship engine, such flue gas is generally at a low pressure, near atmospheric pressure. However, this will depend on the point in the exhaust system at which the flue gas is bled from the exhaust system. Thus, as noted above, the source 390 can be connected to the system 210 up or downstream from the compressor 246, depending on the desired pressure. In other embodiments, an additional compressor (not shown) can be used to deliver pressurized flue gas from the exhaust system into the inlet conduit 386.

Optionally, the system 210 can also include a reheat bypass arrangement 392. In some embodiments, the reheat bypass 392 can be configured to direct gases from the downstream end of the system 210, for example, gases comprised of mainly nitrogen gas, to an additional heating device.

For example, the reheat bypass 392 can include an inlet end arrangement 393 configured to draw gas from an inlet conduit 394 connected to a point in the discharge line 324 upstream from the booster compressor 330, an inlet line 395 connected to a part of the system 210 downstream from the booster compressor 330, or an inlet line 396 connected to an output of the carbon dioxide removal device 380.

The downstream end of the bypass 392 can be connected to a heat transfer device 397 configured to transfer heat from the exhaust gas of the engine 220 to the gas flowing through the bypass 392. For example, the heat exchange device 397 can include a heat input portion 398 and a heat output portion 399. In the illustrated embodiment, the heat input portion 398 is a portion of the heat exchanger device 397 through which the exhaust gas from the engine 220 is directed. The heat from the exhaust gas is thereby transferred to the gas directed through the reheat bypass 392, as it flows through the heat output portion 399. As such, gases discharged from the downstream end of the system 210 can be reheated through the heat transfer device 397, such that the gas eventually discharged from the system 210 is at a desired temperature and/or humidity for the desired application.

FIG. 8 illustrates a modified generation system and is identified generally by the reference numeral 210'. The components of the system 210' have been identified with the same reference numerals as those used to identify corresponding components of the system 210, except that "'" has been used. Thus, the descriptions of those components are not repeated herein.

In the illustrated embodiment, the conduit 226' extends from the engine 220' to a filtration unit, such as a catalytic converter 400. The catalytic converter 400 can remove many of the components of the exhaust fluid passing through the conduit 226'. In an exemplary but non-limiting embodiment, the catalytic converter 400 can be configured to remove non-inert components of the exhaust fluid, such as carbon monoxide, hydrocarbons, volatile organic compounds, and/or nitrogen oxides (nitrogen oxide or nitrogen dioxide) to increase the purity of the inert gas of the exhaust fluid.

In an exemplary but non-limiting embodiment, the catalytic converter 400 of the conditioning system 214' comprises a reduction catalyst and oxidation catalyst that operate to take non-inert components out of the exhaust fluid. It is contemplated that the catalytic converter can be an oxidation or three way type catalytic converter depending on the desired removal of the non-inert components of the exhaust fluid. The construction and operation of such catalytic converter is well known in the art and thus further description of the construction and operation is not repeated herein.

A catalytic converter conduit 406 extends between the catalytic converter 400 and a fluid separation unit 408. Preferably, the fluid separation unit 408 includes a high temperature membrane configured to remove the water from the exhaust fluid passing therethrough.

For example, the engine 220' can output exhaust fluid comprising various gases and a liquid, such as water. The fluid separation unit 408 can remove the water from the exhaust fluid as the fluid passes through the unit 408. In one embodiment, the fluid separation unit 408 has a membrane (not shown) that is configured to allow gases to pass therethrough without permitting the passage of water. In other words, the gas component of the exhaust fluid can flow into and out of the fluid separation unit 408 and into the conduit 412. The membrane of the fluid separation unit 408 can remove water from the exhaust fluid and deliver it to a water knock out vessel in the unit 408. The water knock out vessel can be periodically removed from the unit 408 and emptied. Additionally, a coalescing filter (not shown) can be provided to remove oil carryover that may be present in the exhaust fluid.

Optionally, the fluid separation unit 408 can have a heat exchanger to increase the temperature of the fluid delivered by the conduit 406. The heat exchanger can increase the temperature of the liquid component of the exhaust fluid for easy removal of the liquid.

The conditioning system 214' can also include a temperature control system 416 that is connected to the fluid separation conduit 412. The temperature control system 416 can be configured to increase or reduce the temperature of the exhaust fluid fed from the fluid separation conduit 412. Because the fluid separation unit 408 may have features, such as a heat exchanger, to raise the temperature of the exhaust fluid, the temperature control system 416 can be configured to reduce the temperature of the exhaust fluid to desirable temperatures for feeding the exhaust through the temperature control system conduit 420 and into the compressor 246'.

The conditioning system 214' can have a compressor 246' which raises the pressure of the exhaust fluid. The compressor 246' then delivers the fluid to a compressor conduit 250', which, in turn, feeds the exhaust fluid to a filtration unit 424. That filtration unit 424 can be configured to capture and remove undesired substances that may be present in the exhaust fluid. The filtration unit 424 can be can similar or different than the filtration unit 251.

The exhaust fluid from the filtration system 424 can pass through the conduit 262' and into the separation unit 266'. The separation unit 266' can be similar or different that the units illustrated in FIGS. 7A, 7B, 7C, 7D, 7E, 7F, 7G, and 7H. The separation unit 266' can receive exhaust fluid and can remove at least a portion of the non-inert component of the exhaust fluid and pass inert rich gas into the conduit 324'. The inert fluid can then be fed into the booster pump 330'. The booster pump 330' can increase or decrease the pressure of the fluid and can pass the fluid into the conduit 344' and out of the conduit system output 216'.

The engine 220', of course, can generate and provide power to one or more components of the conditioning system 214'. For example, the engine 220' can be in electrical communication with at least one of the compressors 246', 330'. The engine 220' can therefore power one or more of the compressors which can provide a pressure increase in the conditioning system 214. Optionally, the engine 220' can provide power to any other type of power consumption device.

Optionally, a further advantage can be achieved where the inert gas generation systems 210, 210' can be arranged in one or plurality of containers. For example, but without limitation, the systems 210, 210' can be assembled into a single ISO container or broken down into simple parts and assembled into a plurality of ISO or other containers. An ISO container containing parts or complete inert gas generation system 210, or 210', can be conveniently transported to various locations.

The generation systems 210, 210' can be used in a variety of applications. Additionally, due to the benefits provided by various features of the generation systems 210, 210', further advantages are achieved with respect to some applications.

With reference to FIGS. 9A and 9B, any of the embodiments disclosed above with reference to either of the generation systems 210, 210', as noted above, can be configured to be mobile units, such as the mobile separation system 200 illustrated in FIG. 6A.

FIGS. 9A-37 illustrate exemplary but non-limiting embodiments of mobile separation units 200A (FIGS. 9A and 9B) and 200B (FIG. 32). In each of these embodiments 200A, 200B, any of the above-described embodiments of the separation systems 210, 210' can be used. Thus, although the mobile separation units 200A, 200B are described below in the contents of specific arrangements of the separation systems included therewith, any of the above-identified separation systems 210, 210' can be used.

Additionally, FIGS. 9A-36 include dimensions, sizes, material thicknesses, model numbers, voltages, etc. However, these values are merely disclosed for purposes of providing exemplary embodiments of at least some of the inventions disclosed herein. These values do not limit the inventions disclosed herein.

With reference to FIGS. 9A-30, components of the mobile separation unit 200A that are the same or similar components as the mobile separation unit 200 have been identified with the same reference numerals, except that that a "A" has been added thereto. Additionally, because the separation system 210A of the mobile separation unit 200A can be any of the above-described embodiments of the separation systems 210, 210', many of the components, features, and functions of the separation system 210A are not repeated below.

Additionally, it is to be noted that FIGS. 9A-37 include reference numerals set off by parenthesis. The reference numerals contained within the parenthesis in these figures do not correspond to the reference numerals used in the text of this specification. Rather, the text of this specification uses reference numerals that are not set off in parenthesis in the figures.

The mobile separation unit 200A can include a control cab 205 and a suspension device 208A. The control cab 205 can include a plurality of control panels and devices for controlling the various parts of the separation system 210A. Additionally, the control cab 205 can include all of its own dedicated control panels in a NEMA 4 enclosure. Compressor controls can indicate critical oil temperatures and pressures, as well as exhaust gas pressures and temperatures. The membrane control system can also provide instantaneous and cumulative nitrogen flow information, as well as nitrogen purity pressure, pure pressures, and temperatures.

FIGS. 33-37 include various schematic diagrams of control panels in units that can be disposed within the control cab 205 for remotely controlling the various corresponding devices within the separation system 210A.

For example, as is illustrated in many of the following schematic diagrams, the components of the separation system 210A can be controlled with electronics, including electronically controlled pneumatic actuators. Thus, with reference to these schematic diagrams, one of ordinary skill in the art can determine how to connect the various components of the separation systems 210A with control devices disposed within the control cab 206A.

The suspension device 208A can be in the form of a trailer, such as those commonly designed to be pulled by a towing vehicle referred to as a "tractor," for on-highway transportation. The design, suspension, wheels, etc. of the suspension unit 208A can be determined based on the total weight of the unit 200A. In the illustrated embodiment, the suspension device 208A includes three axels at its rear end, and is configured to be towed as a "fifth wheel trailer." However, other configurations can also be used.

As noted above, the separation system 210A can be in the form of any of the above-identified embodiments and modifications of the separation system 210, 210'. Thus, the following description of the separation system 210A is merely an exemplary but non-limiting embodiment of the features, devices, and methods of operation of the separation systems 210, 210'. However, other configurations can also be used.

As shown in FIGS. 9A, 9B, the mobile separation unit 200A includes a flow source 212A, a conditioning system 214A, and an output 216A. In the illustrated embodiment, the flow source 212A is in the form of a feed air compressor 246A configured to draw in atmospheric air, compress the air, and deliver it to the conditioning system 214A. The conditioning system 214A can include a filtration unit 251A and a separation unit 266A.

The gases leaving the conditioning system 214A are guided to the output 216A. In some embodiments, the output 216A is a booster compressor configured to raise the pressure of the gases discharged from the conditioning system 214A.

With reference to FIG. 10, the feed air compressor 246A can include an engine 220A, a compressor 246A, and an outlet conduit 250A. During operation, the engine 220A can drive the compressor 246A, and thereby pressurize atmospheric air and discharge it through the output 250A.

However, the feed air compressor 246A can include many other devices and features that are optional. Many of these optional features are illustrated in FIG. 10. Set forth below is a description of some of the optional features. The features that are illustrated in FIG. 10 but not described below can be readily implemented by those of ordinary skill in the art.

With continued reference to FIG. 10, the feed air compressor 246A can include an intake filter unit 500, an oil separator 502, a pressure loading device 504, an after cooler 506, and a water separator 508, as well as other features.

For example, but without limitation, the feed air compressor 246A can also include engine coolant input and output ports 510, 512 for allowing engine coolant to be circulated through a heater, described in greater detail below. Further, the feed air compressor 246A can include compressor oil input and output ports 514, 516 for allowing the lubricating oil for the compressor 246A to be circulated through a heater, described in greater detail below.

During operation, the separation process can be commenced by starting the flow source 212A. For example, the engine 220A can be started. After a delay, for example, to allow the engine 220A to warm up, the feed air compressor 246A can be started. For example, a clutch mechanism 518 can be selectively engaged to allow the engine 220A to selectively drive the feed air compressor 246A.

After the feed air compressor 246A begins to turn, ambient air begins to enter the system through the inlet and filter device 500. As such, pressure begins to build in the oil separator 502.

While the engine 220A is idling or operating at a low engine speed, the system 210A can be unloaded. For example, the pressure loading device 504 can be "open" so as to allow pressurized air from the feed air compressor 246A to be vented. However, other techniques can also be used to allow the system to remain unloaded while the engine 220A is idling or operating at low engine speed.

In some embodiments, the flow source 212A is substantially unloaded so that the maximum pressure reached in the flow source 212A is only about 40-60 psig. However, the separation flow source 212A can be designed to reach other maximum pressures when the engine 220A is idling or running at low speeds, depending on the application. When the engine 220A is idling or operating at low speed, very little or substantially no air is flowing through the flow source 212A or the conditioning system 214A.

As the flow source 212A is loaded, the engine 220A can be adjusted to run at a target operating speed (e.g., 1800 to 2100 rpm), and the pressure loading device 504 can be controlled to load the compressor 246A to increase the pressure up to a target pressure. As noted above, the pressure loading device 504 is configured to operate from a remote location. For example, the pressure loading device 504 can include electrically controlled pneumatic actuators for operating the various valves and devices within the pressure loading device 504.

When the flow source 212A is loaded, the engine 220A can operate at normal operating speeds. In some embodiments, the pressure can be increased to about 350 psig (2.4 MPa). At this point, the compressor 246A can deliver air to the after cooler device 506 where the air can be cooled.

For example, but without limitation, the after cooler device 506 can be configured to bring the temperature of the compressed air down to within about 15° F. of the ambient temperature. After the after cooler device 506, the compressed air can be guided to the water separator device 508 and then out of the output 250A to the conditioning system 214A.

In some embodiments, the engine 220A can be a high performance diesel engine. For example, but without limitation, the engine 220A can be a Caterpillar C-16 ATAAC high performance engine rated at about 630 bhp at 1800 rpm or equivalent. The engine can be cooled by a radiator that incorporates an air charge cooler and a fuel cooler. The fan for the heat exchanger can be driven off of the front of the engine via a pulley arrangement. The engine 220A can also be equipped with electronic engine controls to ensure low emissions and improved fuel economy. Any number of various types of engines can also be employed.

In some embodiments, the feed air compressor 246A can be a Sullair two-stage oil flooded rotary screw compressor or another type of a compressor, configured to couple, directly or indirectly, for example, through the clutch mechanism 518, to the engine 220A. The air filter 500 can be a heavy duty air filter configured to remove larger particles from the incoming air. The compressor 246A can be fitted with an unloading valve 519 on its inlet end.

The unloading valve 519 can be part of the pressure loading device 504, and can be configured to modulate the inlet flow into the compressor 246A to control the capacity of the compressor, and as may be desired or required by system operating conditions. The air from the compressor 246A can flow directly to the oil separator 502 where oil can be removed from the air stream down to about 2-3 parts per million. The air and oil can then each be directed to their own section of an air cooled heat exchanger assembly (not shown) which can be combined with the radiator of the engine 220A. However, other configurations can also be used. By cooling the compressed air, water vapor in the compressed air is condensed and becomes liquid which can be removed by the water separator 508.

With continued reference to FIG. 10, although the after cooler 506 is illustrated as a single device, the after cooler 506 can be in the form of a plurality of heat exchangers. For example, the after cooler 506 can be in the form of a main heat exchanger and a second heat exchanger. The main heat exchanger can contain one or more of the following: the radiator of the engine 220A, an engine air charge cooler, an engine diesel fuel cooler, a compressor oil cooler, and a compressed air after cooler.

In some embodiments, the main heat exchanger can be located on the front of the engine 220A, although the main heat exchanger can be positioned at other suitable locations. The second heat exchanger can be a compressed air reheater and can use hot compressor oil to heat the cooled and dried feed air up to a desired operating temperature, for example, for more ideal operation of the membrane separation process. The reheater can be located next to the compressor oil separator or on the membrane tower.

The water separator device 508 can be any known type of water separator device. In some embodiments, the water separator device 508 is a centrifugal-type water separator device disposed on the discharge side of the after cooler device 506. Such a centrifugal water separator device can remove the bulk of liquid water from the compressed air. As noted above, the pressurized air is discharged from the flow source 212A from the outlet 250A.

With reference to FIG. 11, the filtration unit 251A can receive the compressed air from the flow source 212A at its inlet 520. The filtration unit 251A can include a plurality of filtering devices. In the illustrated embodiment, the filtration unit 251A includes four coalescing filters 522, 524, 526, 528.

The coalescing filters 522, 524, 526 can each include an auto drain system 530 configured to drain liquids out of the filters 522, 524, 526 into a common drain discharge 532. Although not illustrated, the coalescing filter 528 can also include an auto drain system.

Additionally, in the illustrated embodiment, the filtration unit 251A includes a carbon tower unit 534. However, other configurations can also be used.

Filtered air is discharged from the filtration unit 251A through its discharge 534. Optionally, the filtration unit 251A can include a feed air heater system 540. The feed air heater system 540 can include any type of heating device configured to heat the air traveling through the filtration unit 251A.

In the illustrated embodiment, the feed air heater device 540 includes a heat transfer device 542 (FIGS. 11 and 20) disposed between the initial three coalescing filters 522, 524, 526 and the carbon tower 534. However, other configurations can also be used. In the illustrated embodiment, the heat transfer device 542 is supported on a membrane tower 620, described in greater detail below.

The feed air heater assembly 540 can also include a plurality of valves 544 configured to allow air from the upstream side of the heating device 540 to be passed through the heat transfer device 542 or to bypass the heat transfer device 542. By operating the valves 544 in an appropriate manner, the temperature of the air discharged from the heater 540 can be controlled even where the heat transfer device 542 is operated continuously or non-continuously or with uniform or changing internal temperatures.

The coalescing filters 522, 524, 526 can have the same or different designs. For example, the filter 522 can be configured to remove condensate. For example, but without limitation, the filter device 522 can be a device configured to form a water separator and a moisture separator filter configured to remove at least about 99% of condensate along with larger particulates. The removed condensate can be collected in the collector within the filter unit 522. For example, the filter unit 522 can include a condensate drain bowl or other suitable device. When the drain bowl is full, the drain bowl automatically opens, with the operation of the auto drain devices 530, and thus dumps the condensate into the drain 532.

The partially dry air can then enter coalescing filters 524, 526. These filters 524, 526 can be configured to remove about 99.999% of all fine aerosols as well as particles 0.01 microns and larger, however, other filters can also be used. These coalescing filters 524, 526, as noted above, can also include auto drain devices 530 for dumping condensates to the drain 532.

As noted above, the feed air heater device 540 can be used to control the temperature of the air flowing through the filtration unit 251A. For example, the dried compressed air from the filters 522, 524, 526 can be reheated before entering further filtering devices. For example, the air can be reheated before entering the carbon tower 534.

In some embodiments, the heat added to the compressed air flowing through the heating device 540 can be transferred to the heat transfer device 542 from the compressor oil of the compressor 246A (FIG. 10). As shown in FIG. 11, the feed air heating device 540 can include fluid input and output ports 550, 552. The ports 550, 552 can be connected so as to direct hot compressor oil from the output port 516 (FIG. 10) to enter the input port 550 (FIG. 11).

As such, the hot compressor oil can travel through the heat transfer device 542 and thereby impart heat into the compressed air flowing through the feed air heater 540. After passing through the heat transfer device 542, the compressor oil can return to the compressor 246 by being discharged through the output port 552 and reintroduced through the input port 514 (FIG. 10). This design provides additional efficiency in that the heat contained within the circulating compressor oil from the compressor 246A would normally be discharged as waste heat. Thus, this waste heat can be utilized for improving the performance of the filtration unit 251A without the need for additional energy input. However, other designs can also be used.

The valves 544, as noted above, can be used to adjust the temperature of the compressed air ultimately discharged from the feed air heater device 540. For example, the air flowing through the feed air heater device 540 can be modulated to either flow through the heat transfer device 542 or to by-pass the heat transfer device 542. The valves 544, as noted above, can be electronically actuated pneumatic valves. Thus, a control device (not shown) can be configured to utilize the output from temperature sensors 554, 556 to control the valves 544 and to thereby adjust the temperature of the compressed air ultimately discharged from the feed air heater device 540.

More specifically, the heating process performed by the feed air heater device 540 can be controlled by the valves 544 that are controlled to open and close based on the measurement of the temperatures by the temperature sensors 554, 556. The control, which can be in the form of a program run by a general purpose or purpose-made processor, uses the output from the temperature sensors 554, 556 to control the valves 544. In some non-limiting embodiments, the temperature of the compressed air discharged from the feed air heat device 540 can be set at approximately 120-130° F. (49°

C.-54° C.). The reheating of the air as such keeps the air temperature substantially above the dew point temperature of the air. As such, little or no condensate forms as the air travels through the carbon absorber of the carbon tower 534, and thus proceeds to the membrane separator. Any suitable type of heat exchangers can be used to control the temperature of the air. Exemplary heaters include, but are not limited to, resistance heater, double pipe heat exchangers, and the like.

As noted above, the reheated air enters the carbon tower 534. The carbon tower 534 can be configured to remove substances to increase the operating life of downstream equipment. In some embodiments, the carbon tower can be configured to remove hydrocarbon vapors from the compressed air. In some embodiments, the compressed air or gases exit the carbon tower 534 with less than 5 parts per billion (ppb) of hydrocarbon vapors (excluding methane). This low concentration of hydrocarbon vapor can maximize nitrogen membrane operating life. Other types of filters can also be used to remove undesirable substances from the compressed air or other gases.

With reference to FIGS. 12-14, the filters 522, 524, 526, 528 can be mounted in one integral filter unit 560. This provides a unique and compact arrangement. In some embodiments, because the filters 522, 524, 526, 528 can all be generally the same type of coalescing filter, although designed to filter out different size particles or droplets, they can have the same general overall shape and configuration, as shown in FIGS. 12-14.

The filter stand 560 includes a base portion 562 configured to support the assembly 560 on an upper surface of the suspension device 208A (FIGS. 9A, 9B). The assembly 560 can also include at least one upright member 564 to which the filters 522, 524, 526, 528 are mounted. In some embodiments, as shown in FIGS. 12-14, the assembly 560 includes a plurality of cross members 566, 568 for supporting the filters 522, 524, 526, 528 at both lower and upper positions. However, other configurations can also be used.

This space saving arrangement can be accomplished even though, in the direction of air flow through the perspective filters, the carbon tower 534 is disposed between the filter 526 and 528. Although this requires additional plumbing connecting the discharge end of the filter 526 to the feed air heater 540 and the carbon tower 534 and additional plumbing to connect the output side of the carbon tower 534 to the input side of the filter 528, the structural similarities of the filter devices 522, 524, 526, 528 allow for a compact design that is more space efficient.

FIGS. 15-18 illustrate an exemplary embodiment of the carbon tower 534. As shown in FIGS. 15-18, the carbon tower 534 is included within a carbon tower assembly 570. The carbon tower assembly 570 can include a base 572 and a plurality of upright support members 574 configured to support the carbon tower 534 in a generally upright configuration.

In this configuration, the carbon tower 534 includes an inlet 576 at its upper end and an outlet 578 at its lower end. The inlet 576 is connected to the feed air heater device 540 and the outlet 578 is connected to the inlet side of the filter 528 (FIG. 12).

With reference to FIG. 9A, the arrangement of the filter unit 560 and the carbon tower unit 570 provides a compact arrangement enhancing the overall space efficiency of the system 210A, and thus allowing the overall size of the suspension unit 208A to be made as small as possible.

With reference to FIG. 19, the separation unit 266A can be configured and constructed in accordance with any of the above-described separation devices 266, 266'. Thus, like reference numerals are used to identify components of the separation unit 266A that correspond to the above-described separation units 266, 266'.

The separation unit 266A can include an inlet 262A and an outlet 290A. In the illustrated embodiment, the separation unit 266A includes an array of membrane separation devices 266a, 266b, etc. arranged in parallel with each other, such as the arrangement partially illustrated in FIG. 7H.

During operation, the filter gases discharged from the output 534 (FIG. 11) of the filtration unit 251A are guided to the inlet 262A of the separation device 266A. The illustrated separation unit 266A includes a pair of bundles, each comprising a plurality of membrane units (266a, 266b), which in the illustrated embodiment, are membrane separation units. Each of the membrane separation units 266a, 266b can be configured to separate one or more components of the gas input into the input port 262A.

The membrane separation units 266a, 266b can allow certain substances to permeate therethrough. In some embodiments, the separation units comprise membranes in the form of a bundle of hollow fibers configured to separate the air flow, as described above. For example, the separation membranes can allow oxygen, water vapor, and carbon dioxide to permeate the walls of the hollow fibers, leaving a high pressure concentration of nitrogen on the inside of the hollow fibers.

During normal operation, in some exemplary but nonlimiting embodiments, the pressure in the membrane separation units 266a, 266b can be maintained at about 330-350 psig (2.3-2.4 MPa) through the use of a flow control valve device 322A. The nitrogen can be collected in a manifold, identified generally by the reference numeral 600, and can be directed through the flow control valve 322A.

In some embodiments, a product isolation valve 602 can be used to vent the flow of some of the nitrogen overboard during that portion of the production cycle. In some embodiments, the product isolation valve 602 can be opened to vent the flow of nitrogen out of the system during warm-up until the nitrogen purity reaches the minimum desired level. Once the flow of nitrogen reaches the target purity, the product isolation valve 602 can be closed. Exemplary membrane separation units can be used to separate any desired gas (e.g., inert gases) from a feed gas. As such, an output gas of a particular desired purity can be produced.

With reference to FIGS. 20-23, the separation unit 266A can be assembled into a single integral membrane tower 620. As shown in FIGS. 20-23, the membrane tower 620 can include an arrangement of membrane separation units 266a, 266b in two vertical stacks, although other numbers of stacks can also be used. This provides a high level of space efficiency due to the vertical stacking arrangement, and thus further enhances the ability of the separation system 210A to be disposed on a suspension unit 208A for transportability.

In the illustrated embodiment, the membrane tower 620 includes a base 622 and at least one vertical support configured to support the weight of the individual membrane separation units 266a, 266b. In the illustrated embodiment, the tower 620 includes four vertical members 624, 626, 628, 630 configured to support each of the individual membrane separation devices 266a, 266b. However, other numbers of vertical supports and/or configurations can be used.

With reference to FIG. 20, each of the individual membrane separation devices 266a, 266b are suspended from the vertical supports 624, 626, 628, 630 by cross member devices 632. However, other configurations can also be used.

The membrane tower 620 can include a plurality of intake and discharge manifolds 640, 642, respectively, for feeding each of the individual membrane separation devices 266a, 266b. As shown in FIG. 22, all of the intake manifolds 640 are disposed at one end of the tower 620 and all of the discharge manifolds 642 are disposed at the opposite end. However, other configurations can also be used.

In some embodiments, the intake manifold 640 is connected to the inlet 262A, and thus receives filtered air from the filter unit 251A. The discharge manifold 642 can be connected to the outlet 290A, and thus is used for discharging nitrogen from the separation unit 266A.

A further advantage is achieved where the structural components of the tower 620 are used both for providing structural support for the tower 620 as well as for fluid handling. In the illustrated embodiment, the vertical support 628, 630 include permeate discharge manifolds 650, 652, each of which are connected to the individual membrane separation devices 266a, 266b so as to allow the permeate gases to flow into the permeate manifolds 650, 652. This provides an additional space and weight efficiency in that the vertical supports 650, 652 are used both for supporting the weight of the components of the separation device 266a as well as for guiding fluids.

The permeate entering the vertical supports 650, 652 can be discharged to the atmosphere, or it can be handled in other ways. However, in other embodiments, the manifolds 650, 652 can be used for intake air or the discharge of nitrogen gas.

Optionally, the separation device 266A can include a flow meter 654. Additionally, as noted above, the membrane tower 620 supports the heat transfer device 542. As illustrated in FIGS. 21 and 23, the heat transfer device 542 is supported by the vertical members 626, 630 and is arranged generally horizontally. This provides an additional advantage in that the heat transfer device 542 is similar in shape to the membrane devices 266a, 266b, etc., and thus can be supported by the tower 620 in a compact and space-saving configuration. For example, but without limitation, the heat transfer device 542 is nested with the other membrane devices 266a, 266b, etc. In other words, there is a vertical stack of membrane devices 266a, 266b, stacked above the heat transfer device 542 with both the membrane devices 266a, 266b, and the heat transfer device 542 supported by the same members, in this case, the vertical members 626, 630 at a position that could other wise have been used to support additional membrane devices 266a, 266b. As such, the heat transfer device is compactly positioned between the membrane tower 620 and the filter stand 560 without the need for an additional separate mounting arrangement for supporting the heat transfer device 542 relative to the trailer.

Both the filter unit 251A and the separation unit 266A, including the above-described space efficient tower designs, as noted above, provide a particularly compact design that is helpful in arranging the components of the separation system 210A into a configuration that will fit on an on-highway device, such as the suspension device 208A. For example, with the arrangement of the mobile separation system 200A described herein, all the components can be supported on a single 53 ft. long trailer or on a self-propelled unitary frame truck of about 41 ft. long. However, other size trailers and trucks can also be used.

As noted above, the output 216A of the system 200A can include a booster compressor 330A. The booster compressor 330A can be configured to raise the pressure of the nitrogen gas discharged from the separation device 266A to a desired pressure.

The booster compressor 330A can include an engine 700 and a compressor device 702. Optionally, the booster compressor 330A can include a clutch mechanism 704 for selectively engaging the engine 700 with the compressor device 702.

The booster compressor 330A can also include an inlet 706 connected to the outlet of the membrane separation unit 266A.

During operation, nitrogen gas flowing into the inlet 706 can initially be received in a nitrogen receiver device 708. The nitrogen can then enter a first stage booster compressor 710 of the compressor device 702. Optionally, the compressor device 702 can include second and third stages 712, 714, the operation of which is described in greater detail below.

In some non-limiting exemplary embodiments, the pressure of the nitrogen can be increased up to about 600 psig (4.1 MPa) in the first stage 710. The pressurized nitrogen can be discharged out of the compressor device 702 and into a first stage of a high pressure heat exchanger 716. The high pressure heat exchanger 716 can be configured to cool the nitrogen compressed by the first stage 710. Optionally, the first stage heat exchanger 716 can have an output connected to an oil separator 718 configured to separate any compressor oil in the compressed nitrogen.

After leaving the oil separator device 718, the compressed nitrogen can be introduced into this second stage compressor 712. After being compressed by the second stage compressor 712, the nitrogen can be further compressed by the third stage compressor 714. After passing through each of the second and third stage boosters 712, 714, the pressurized gas discharge from each stage can optionally be directed into another high pressure heat exchanger and/or additional oil separation devices.

For example, pressurized nitrogen discharged from the second stage 712 can be directed to a second stage high pressure heat exchanger configured to cool the pressurized gas and a second stage oil separation device 722 configured to separate oil out of the compressed nitrogen. Similarly, pressurized nitrogen discharged from the third stage booster 714 can be directed through a third stage heat exchanger 724 and, optionally, an additional oil separator (not shown).

The flow of pressurized nitrogen can be controlled by a combination of inlet pressure variations to the booster 702, e.g., by modulating the flow control valve 654 (FIG. 19) and/or by changing the speed at which the booster compressor 702 is operated. For example, the speed of the crankshaft or the engine 700 can be changed by adjusting a "throttle" position of the engine 700. Changing the speed of the engine 700 also thus changes the speed of the compressor 702.

Optionally, the flow of nitrogen can also be controlled by passing nitrogen from the final discharge 730 back to the first stage 710 of the compressor 702. For example, a bypass line 732, which is connected to the discharge side of the third stage compressor 714, can also be connected back to an inlet side of the first stage compressor 710. In some embodiments, as illustrated in FIG. 24, the bypass line 732 is connected to the nitrogen receiver tank 708. From there, this highly pressurized nitrogen can then be again fed into the first stage compressor 710.

Optionally, a high pressure control valve 734 can be used to control the flow of nitrogen through the bypass line 732. Nitrogen that is not bypassed through the bypass line 732 can be directed to the final discharge 730. Optionally, the final discharge 730 can also include a check valve 740 and a plug valve 742 with an integral discharge port. However, other configurations can also be used.

In some embodiments, the booster compressor 330A can be a hurricane model 6T-276-43B-4000 compressor, or an equivalent. Such a nitrogen booster can deliver high pressure nitrogen to about 5,000 psig (35 MPa). The booster can be a single stage or have a plurality of stages of compressors.

In the illustrated embodiment, the booster compressor 330A includes three stages 710, 712, 714. However, other numbers of stages can also be used.

The booster can be constructed with a water cooled reciprocating compressor engine having a suction pressure of about 320-350 psig (2.2-2.4 MPa). As noted above, the intercoolers can be provided between one or more of the stages to dissipate the heat of compression. Additionally, an air cooled aftercooler can also be provided to reduce the temperature to within about 20° F. (11.1° C.) of ambient temperatures.

The engine 700 of the booster compressor 330A can be a diesel engine, or any other type of engine. The engine 700 can be coupled directly or indirectly (perpendicular) to the booster 702. Additionally, as noted above, a clutch mechanism 704 can optionally be used to selectively connect and disconnect the engine 700 from the booster 702.

The engine 700 can be, in an exemplary but non-limiting embodiment, a Caterpillar C9 diesel engine rated at 350 bhp at 1,800 rpm or an equivalent engine. Such an engine can have a 6-cylinder configuration with a total engine displacement of 732 cubic inches. If the booster is driven indirectly with a high tower and PTO drive (perpendicular) by a diesel engine from a self-propelled carrier or a tractor diesel engine that pulls the trailer mounted equipment, the engine can be rated at 500 bhp or greater.

With reference to FIG. 25, the mobile separation system 200A can include a supplemental heater system 800. For example, where the system 200A will be operated in arctic-like conditions, the supplemental heater system 800 can be configured to assist in start-up and operation of the system 200A.

In some embodiments, with continued reference to FIG. 25, the supplemental heater system 800 can be configured to circulate engine coolant from the engines 220, 700 through heating devices 802, 804, respectively. For example, as noted above, with reference to FIG. 10, the engine 220A can include engine coolant input and output ports 510, 512. Coolant from these ports can be connected to the heater 802 via input and output ports 808, 810.

Similarly, the engine 700 can include coolant input and output ports 750, 752 (FIG. 24) can be connected to coolant input and output ports 812, 814 (FIG. 25). As such, engine coolant from the engine 700 can be circulated through the heater device 804. As such, engine coolant from the engine 220A can be circulated through the heater 802.

The heaters 802, 804 can generate heat in any known manner. For example, the heaters 802, 804 can include fuel supply lines for kerosene or diesel fuel for generating heat to heat the engine coolant. However, other types of heaters can also be used. Additionally, the heaters 802, 804 can be used to heat other devices within the system 200A as well. For example, in some embodiments, the supplemental heater system 800 can also be used to heat the batteries and fuel of each of the engines 220A, 700.

In some embodiments, the supplemental heater system 800 is formed in essentially two independent systems, one system heating the feed air compressor engine, batteries, control cabin heater, and the intake fuel line. The other independent system can be used to warm the engine of the booster compressor, the booster block itself, batteries, fuel tank, and intake fuel lines.

For example, with continued reference to FIGS. 25 and 28-30, the heater 802 can be powered by the batteries of the feed air compressor device 212A, and can be configured to burn diesel fuel from the common diesel fuel tank 820. The heater 802 can include a pump (not shown) configured to pull engine coolant from the engine 220A and through the heater manifold device 822. The heater manifold device can be used to circulate heated engine coolant into heat exchanger devices 824, 826 that are in thermal communication with the batteries of the feed air compressor 212A. Similarly, the heat from the heater 802 can be used to provide heat to a heat exchanger device 828 configured to transfer heat to portions of the control cab. Similarly, heat from the heater 802 can be directed to a heat exchanger device 830 for heating fuel for the engine 220A. The heater 804 can include similar plumbing for heating other devices.

As noted above, the complete mobile separation system 200A can be operated from a central location, for example, the control cabin 205. However, in other embodiments, such controls can be mounted within the sleeper portion section of a self-propelled carrier or another remote control box.

The control system can be configured to use a combination of PLC (Programmable Logic Controller) equipment (FIGS. 35-37) and a touch screen arrangement (FIG. 33) for allowing an operator to operate and monitor the system 200A. The central operating location allows for functions, such as starting engines, controlling nitrogen purity, pressure, and flow rate. The central operation system also provides continuous feedback of the operating status of the separation system 200A via the touch screen display.

FIG. 26 illustrates an electrical schematic of the feed air module. FIG. 27 illustrates an electrical schematic of the booster compressor module 330A. These two FIGS. 26, 27, show the electrical systems for operating engine driven components from one central location.

FIG. 34 illustrates a power distribution system which can be provided at the central location to power the PLC monitoring system and other ancillary equipment, such as a cabin heater, fan, and lights.

As noted above, FIG. 33 illustrates a touch screen device 840 and an Electronic Control Unit (ECU) 841. The ECU 841 can be in the form of any type of device that can accept input from sensors and provide output to actuators. For example, but without limitation, the ECU 841 can be in the form of a hard-wired control circuit. Alternatively, the ECU 841 can be constructed of a dedicated processor and a memory for storing a computer program configured to perform the functions of the ECU 841 described herein. Additionally, the ECU 841 can be constructed of a general purpose computer having a general purpose processor and the memory for storing the computer program for performing the functions of the ECU 841 described above.

In the illustrated but non-limiting embodiment, the ECU 841 is in the form of a programmable logic controller which has a plurality of Programmable Logic Controller (PLC) slots 842, 844 that can be used for monitoring the separation system operation 200A. The PLC slot 804 can be used to connect the PLC system to a recording device (e.g., lap top computer) so that the separation system operations can be recorded for future use or comparison.

FIG. 35 illustrates connections with the PLC slot identified as "Slot 0" which can be used to provide digital display devices 850, 852, 854. The digital data can be collected by the PLC slot identified as "Slot 5" (FIG. 33).

FIGS. 36 and 37 illustrate optional uses for the PLC slots identified as "Slot 1"-"Slot 4," and "Slot 6." These connections illustrate how different operating data, such as feed air module pressure and temperature, filter and membrane module pressures and temperatures, operate the automatic filter dump valves, nitrogen purity, nitrogen flow rate, and booster modules pressures and temperatures. However, other arrangements can also be used for displaying operating data of the separation system 200A in case the touch screen 840 is not operating correctly. This is a back-up monitoring system that can display all the data that the touch screen provides by selecting the parameter from the display selector shown in FIG. 36.

With continued reference to FIG. 32, a modification of the mobile separation system 200A is illustrated therein and identified generally by the reference numeral 200B. The components of the mobile separation system 200B can be the same as those identified above with reference to the separation system 200A, except as expressly indicated below. Thus, components of the system 200B corresponding to the system 200A that are similar or the same are identified with the same reference numeral, except that a "A" has been changed to a "B."

As with the system 200A, the mobile separation system 200B can include a feed air compressor or a flow source 212B, a conditioning system 214B, and an output device 216B.

In this embodiment, the output device 216B, which is in the form of a booster compressor 330B, is essentially the same as the booster compressor 330A, except that the booster compressor 330B does not include an engine that can provide the sole means for powering the booster compressor unit 702B. Rather, the system 200B includes a PTO device configured to convert shaft power from an engine 900 disposed with the propulsion device 206B to drive the compressor unit 702B.

The engine 900 can be any type of engine. In this embodiment, the engine 900 is configured to generate shaft power for driving one or a plurality of the front wheels 902 and/or the rear wheels 904 of the system 200B. The PTO device 906 can be any type of known PTO device.

In the illustrated embodiment, the PTO device 906 is configured to receive shaft power from, for example, a first drive shaft 910 driven by the engine 900, and use that shaft power to drive a second vertical drive shaft (not shown) which is connected to the compressor unit 702B. Additionally, a third drive shaft 912 can extend rearwardly from the PTO device 906 to the axle of one or more of the rear wheels 904.

The propulsion device 206B can include an internal control for changing the mode of operation of the PTO device 906. For example, the input device (not shown) can allow an operator of the propulsion device 206B to change the operation of the PTO device 906 between two modes of operation, including, for example, but without limitation, a mode in which shaft power from the shaft 910 is directed only to the compressor unit 702, and a second mode in which shaft power from the shaft 910 is only directed to the drive shaft 912 for powering one or more of the rear wheels 904. Such a type of input control and PTO device are well known in the art, and thus are not described in further detail.

Such an arrangement provides a substantial advantage in that the cost of an additional engine, such as an engine 700 (FIG. 24), can be avoided. Rather, the booster compressor 330B can utilize the shaft power from the engine 900, which, when the booster compressor 330B is not being used, can be used to move the system 200B. This provides a significant savings in weight and in the cost of engines. In some embodiments, the PTO device can be configured to drive the feed air compressor 246B.

Further advantages can be achieved where exhaust from the engine 900 is fed to the inlet of the feed air compressor 212B. For example, as shown in FIG. 32, the engine 900 can include an exhaust discharge 920 configured to guide exhaust gases from the combustion chambers within the engine 900 toward the atmosphere. Of course, as is widely known in the art, the engine 900 can also include pollution controls which reduce or eliminate certain contaminants that can be found in exhaust gases from internal combustion engines, such as diesel engines.

As explained above with reference to the separation systems 210, 210', exhaust gas, such as the exhaust gas discharge from the exhaust discharge 920, can be fed to the inlet 500B of the feed air compressor 212B. As such, the system 200B can operate to separate nitrogen out of the exhaust gas discharge from the engine 900. This provides further advantages, as noted above, in that there is significantly less oxygen in the exhaust gas from an internal combustion engine than there is in ambient air. Thus, for some applications, the entire system 200B can be run at lower power settings because there is overall less oxygen to separate out of the gases being fed to the conditioning system 214B.

Additionally, with such a configuration, all of the equipment that can be disposed in the control cab 205 can be contained in the cab of the propulsion unit 206B.

As such, because the cabs of trucks are normally provided with sufficient light, heaters, and weather protection, it is not necessary to provide a separate control cab such as the control cab 205 (FIGS. 9A, 9B). Thus, with all the control panels disposed within the cab of the propulsion unit 206B, further savings are achieved.

Optionally, the propulsion unit 206B can be provided with a "sleeper cab," which can therefore provide more room for control panels and for the operator to operate such control panels, as well as room for a passenger in the propulsion unit 206B.

With reference to FIG. 38, the ECU 841, along with the various sensors, actuators, displays, and control devices noted above, can form an electronic control system 860. It is to be noted that the electronic control system 860 can be used with any of the above-described embodiments of the mobile separation units 200, 200A, 200B. Thus, although only components of the mobile separation system 200A are referenced below with respect to certain features, functions or advantages, those of ordinary skill in the art will understand how the description of the electronic control system 860 can be used with the other mobile separation systems 200, 200B.

As reflected in the schematic of FIG. 38, at least some of the sensors and actuators of the mobile separation system 200A can be grouped or organized based on the components of the separation system 200A with which they operate. For example, as described above, the separation system 200A can include a feed air compressor 246A, a separation unit 266A, and an output, which can be in the form of a booster compressor 216A. As noted above, each of these devices 246A, 266A, 216A, include various sensors and actuators that are used during operation of these respective devices.

For example, the feed air compressor 246A can include, as illustrated in FIG. 10, a compressor discharge pressure sensor 900 and a compressor outlet temperature sensor 902. Additionally, other sensors can also be considered as effecting or effected by the operation of the compressor 246A, and thus, can be considered part of the compressor sensors. For example, but without limitation, the nitrogen flow rate, nitrogen purity, and booster inlet pressure, are all affected by the operation of the compressor 246A. Thus, the compressor sensor group 900 can be considered to also include the nitrogen flow meter 654 (FIG. 19) which, optionally, can also include a nitrogen purity sensor 906.

Further, the compressor sensors group 900 can also include a pressure sensor 908 (FIG. 19) which is disposed at an outlet of the membrane separation unit 266A. However, because it is at the outlet end of the membrane separation unit 266A, it can also be considered as providing the pressure at the inlet of the booster 216A.

The compressor 246A can also have a group of actuators 910 associated with the operation of the feed air compressor 246. For example, but without limitation, the feed air compressor 246 can include a combustion air valve 912 (FIG. 10) for controlling the flow of air into the engine 220A, an engine speed control actuator 914 (FIG. 26), a starter switch 916, the unloading valve 519 (FIG. 10), and/or other actuators.

Similarly, the membrane separation unit 266A can include a membrane sensors group 920 and a membrane actuator group 922. The membrane sensors group 920 can include, similarly to the compressor sensor group 900, sensors that are specifically dedicated to only the membrane separation unit 266A as well as sensors that are also considered part of other sensor groups.

For example, the membrane sensors group 920 can include the compressor outlet temperature sensor 902, the nitrogen purity sensor 906, the nitrogen flow sensor 654, the temperature sensor 556 indicating the temperature at the outlet of the heater 542, the temperature sensor 554 indicating the temperature at the inlet of the heater 542, a temperature sensor 922 (FIG. 11) configured to detect the temperature of the gases discharged from the filter assembly 251A, or, in other words, flowing into the membrane system 266A, and one or plurality of additional temperature sensors 924, 926, disposed on the outlet end of the membrane separation unit 266A. The membrane actuator group 922 can include the flow control valve 322A (FIG. 19), a dump valve 928 configured to vent all of the nitrogen gas from the membrane separation unit 266A, as well as other actuators.

Additionally, the booster compressor 216A can include a booster sensors group 930 and a booster actuator group 932. The booster sensors group 930 can include the temperature sensor 926 at the outlet of the membrane separation unit 266A (FIG. 19), the pressure sensor 908, a pressure sensor 934 at the discharge end of the booster compressor 216A, a temperature sensor 936 configured to detect the temperature at the outlet of the booster compressor, a pressure sensor 938 configured to detect a pressure produced by the first stage of the booster compressor, a pressure temperature sensor 940 configured to detect a temperature at the outlet of the first stage of the booster, a pressure sensor 942 configured to detect a pressure at the outlet of the second stage of the booster compressor, a temperature sensor 944 configured to detect a temperature at the outlet of the second stage of the booster compressor, a temperature sensor 946 configured to detect the temperature at the discharge of the third stage of the booster compressor, a pressure sensor 948 configured to detect an oil pressure in the booster compressor, as well as other sensors.

The booster actuator group 932 can include a plurality of actuators configured to allow an operator to operate the booster compressor 216A. For example, the booster actuators group 932 can include actuators (not shown) for starting, loading and controlling a pressure output from the booster compressor 216A.

The electronic control system 860 can also include other sensors and actuators, schematically represented by the other sensors group 960 and other actuators group 962. Those of ordinary skill in the art can readily determine what sensors and actuators may be used to provide further operability of the mobile gas separation system 200, 200A, 200B.

Additionally, the electronic control system 860 can also include an external sensors group 964 and an external actuators group 966. The external sensors group 964 can include any other sensor that an operator or user may desire to use at a site of operation of the mobile separation system 200, 200A, 200B. Thus, the electronic control system 860, as part of the external sensors group 964, can include one or a plurality of auxiliary sensors input ports configured to allow a sensor (not shown) external to the mobile separation units 200, 200A, 200B, to be connected to the ECU 841. As such, a user or operator can monitor the output of such an external sensor from the same location from which the output of the other sensors are monitored, or other locations.

Similarly, as part of the external actuators group 966, the electronic control system 860 can include connectors or output ports configured to allow other external actuators to be connected to the ECU 841. As such, a user or operator of the electronic control system 860 can operate other actuators from the same location that the above noted actuators are operated, or from another location.

As one exemplary but non-limiting embodiment, a sensor that can be considered part of the external sensors group 964, in a well drilling operation, is a pressure sensor (not shown) that can be mounted at a gas discharge outlet so as to monitor the pressure at which a gas, originally supplied by the system 200A, is discharged from a well during the drilling operation. As such, the discharge pressure of the booster 216A can easily be compared with the discharge pressure detected by such an external sensor. Those of ordinary skill in the art can determine other types of external sensors and/or actuators that can also be used.

As shown in FIG. 38, the electronic control system 860 also includes a control panel 970, an exemplary but non-limiting embodiment of which is illustrated in FIG. 39. With continued reference to FIG. 38, the control panel 970 can include a plurality of indicators 972, and a plurality of input devices 974 configured to allow an operator or user to input commands into the ECU 841. Additionally, the control panel 970 can optionally include an input/output (IO) display 840, such as, for example, but without limitation, a "touch screen" device.

With reference to FIG. 39, the control panel 970, including the indicators 972, input devices 974, and the I/O display 840, can be disposed in an control cabin 205 (FIG. 9B), the cab of a propulsion device 206B (FIG. 32) or any other location.

As illustrated in FIG. 39, the control panel 970 can be considered as including four different panels; a feed air compressor panel 980, a nitrogen flow control panel 982, a booster compressor panel 984, and a display panel 986.

The feed air compressor panel 980 can include any number of various indicators and input devices for the convenience of an operator. In the illustrated but non-limiting embodiment, the feed air compressor panel 980 includes a plurality of warning lamps 988, including a check engine lamp 990, a warning lamp 992, and a compressor high temperature lamp 994. These warning lamps 990, 992, 994 are configured to provide overt warnings to the operator of the control panel 970.

For example, the check engine lamp 990 is illuminated by the ECU 841 when the controller of the engine 220A issues a check engine warning. The warning lamp 992 can be configured to be illuminated when voltage of the battery of the engine 220A is too low. Additionally, the compressor high temperature lamp 994 can be configured to be illuminated when the temperature detected by the temperature sensor detected by the temperature sensor 904 (FIG. 10) is over a temperature threshold.

The feed air compressor panel 980 can also include an engine monitor system 996 which can include a plurality of additional warning lamps and a generic display device that can be adjusted to display a number of operating parameters of the engine 220A. Such monitoring devices are well known and commercially available. In an exemplary but non-limiting embodiment, the engine 220A is a diesel engine made by the Caterpillar Corporation. The monitoring system 996 illustrated in FIG. 39 is available from the Caterpillar Corporation. Additionally, the panel 980 can include a voltage meter 998 configured to continuously display a voltage of a battery of the engine 220A.

The panel 980 can also include a warm up control knob 1000, a high-low pressure valve control knob 1002 and an engine control switch 1004. The warm-up control knob 1000 (FIG. 39) can be configured to control a pressure loading device 504 (FIG. 10) which can provide for cold weather starting. When placed in the "Start" position, the warm-up control valve cuts off the pressure signal to the pressure regulating valve causing the inlet valve 519 (FIG. 10) to remain closed. This will allow the engine 220A (FIG. 10) to run unloaded until it is properly warmed up at which time the warm-up control knob 1000 (FIG. 39) can be set in the "Run" position which can open the inlet valve 519 (FIG. 10) and cause the feed air compressor 246A (FIG. 10) to start producing air flow.

The control knob 1002 can be configured to allow the feed air compressor 246A to operate under a high or low pressure mode, the low pressure mode being used during start-up. For example, The High-Low pressure control knob 1002 (FIG. 39) can be configured to allow the feed air compressor 246A (FIG. 10) to operate under rated pressure or forces the compressor to a lower standby pressure.

Finally, The engine control knob 1002 (FIG. 39) can be configured to de-energize the control power and shut the engine 220A (FIG. 10) off by moving to the OFF position. In the Start position, control power is energized and the engine start will start the engine 220A (FIG. 10). After the engine 220A (FIG. 10) is started, the control knob can be released and the knob will return to the Run condition.

The control panel 970 can include a plurality of heat control switches 1006. For example, the heater control switches 1006 can include a main heater toggle switch 1008, a filter heater toggle switch 1010 and a cab heater switch 1012. However, these are merely optional switches and controls that can be used, other controls can also be used.

The nitrogen flow panel 982 can include a nitrogen gas flow control knob 1014, a totalizer reset knob 1016, a filter dump control 1018, a main power knob 1020 and an emergency stop button 1022. The nitrogen flow control knob 1014 can be connected, through the ECU 841, to the nitrogen flow control valve 322A. In some embodiments, the control 1014 is used only during low pressure operation. The totalizer reset 1016 can be configured to signal the ECU 841 to reset a counter that can be configured to cumulatively calculate the total amount of nitrogen gas delivered by the corresponding system 200, 200A, 200B.

The filter dump control 1018 can be configured to operate the valve 928. For example, if desired, the valve 928 can be opened to depressurize and thus discharge the nitrogen gas out of the nitrogen separation unit 266A.

The power actuator 1020 can be configured to control power to the control panel 970. Finally, the emergency stop actuator 1022 can be configured to shut off the engines of both the feed air compressor 246A and the booster compressor 216A. The nitrogen control panel 982 could also include other controls.

The booster compressor panel 984 can include controls similar to that of the feed air compressor panel 980. For example, the booster compressor panel 984 can include an engine monitoring device 1030 configured to display various operating parameters of the engine 700 (FIG. 24) of the booster compressor. In a non-limiting exemplary embodiment, the monitoring device 1030 is a Murphy Powerview 100, which is commercially available. However, other engine monitoring devices can also be used.

In the illustrated embodiment, the booster compressor panel 984 includes a plurality of analog gauges configured to continuously display certain operating parameters of the engine 700. For example, the booster compressor panel 984 includes a tachometer 1032, an exhaust temperature gauge 1034, a coolant gauge 1036 configured to display a temperature of the coolant of the engine 700, and an oil pressure gauge 1038 configured to display an oil pressure of the engine 700. Additionally, the booster compressor control panel 984 can include a plurality of circuit breakers 1040.

The booster compressor panel can also include a three-way off/run/by-pass switch 1042, a starter button 1044, an indicator light 1046, a loading switch 1048 and an engine rpm adjustment knob 1050. The three-way Off/Run/By-Pass switch 1042 can be configured to de-energize the control power and shut the engine 700 (FIG. 24) off by moving to the OFF position. When placed in the "By-Pass" position, the bypass valve 746 (FIG. 24) is energized to allow the engine 700 (FIG. 24) to start without loading the booster 702 (FIG. 24). After the engine 700 (FIG. 24) is started, the switch can be released and the switch will return to the Run condition.

The starter button 1044, can be connected through the ECU 841 to the starter 916 of the feed air compressor engine 700 (FIG. 26). The loading switch 1048 can be connected to a valve for loading or unloading the booster compressor 216A. The engine rpm control 1050 can be connected to a throttle sensor 914 which can be used by the engine 700 to adjust the engine speed of the engine 700.

The booster compressor panel 984 can also include a filter heater toggle switch 1052, a pumper fault relay 1054, a main heater toggle switch 1056, and an air temperature fault relay 1058, however, other controls can also be included.

The display panel 986 can include any number of display devices configured to display the status of various components of the systems 200, 200A, 200B, the output of the various sensors described above, or any other parameter.

The display devices 850, 852, 854, described above with reference to FIG. 35, are generic digital four-digit display panels configured to display numeric or alphanumeric representations of the output or status of various components of the systems 200, 200A, 200B. Optionally, the control panel 970 can include control knobs 1060, 1062, 1064, configured to define which parameters displayed on each of the devices 850, 852, 854, respectively. Preferably, the knobs 1060, 1062, 1064, are configured to allow the display devices 850, 852, 854 to display any one of the parameters described below with reference to the input/output device 840.

The input/output device 840 can be in the form of any known generic or graphical display, commonly used in the computer industry. In the illustrated but non-limiting embodiment, the display 840 is a "touch screen" device. The following figures illustrate exemplary but non-limiting user screens that can be programmed into the ECU 841 for the display and control of various parameters. These figures, which include FIGS. 40 through 53, include an exemplary set or sub-set of screens that can be provided with one of the systems 200, 200A, 200B. However, other screens can also be included.

Optionally, upon actuation of the main power switch 1020 (FIG. 39), the display 840 can include a log in screen (not shown), which requires a user to enter a user name or a password.

The ECU 841 can be configured to display any screen as the initial screen after log in is completed. In some embodiments, the first screen viewable after log in is complete, is shown in FIG. 40. In each of the user interface screens, illustrated in FIGS. 40-53, the screen includes a header area 1080 indicative of the values or fields displayed on the screen. For example, the screen illustrated in FIG. 40 is the "nitrogen generation unit" screen. This screen is intended to be a summary overview of a subset of the data received by the ECU 841. The data fields illustrated in FIG. 40 as included in the nitrogen generation unit screen are merely exemplary, other data fields can also be used. In some embodiments, the ECU 841 is configured to allow a user to change the fields displayed on each screen.

As shown in FIG. 40, the nitrogen generating unit screen includes a booster discharge pressure field 1082 that is configured to display data indicative of the pressure from the booster compressor 216A. For example, the field 1082 can be configured to display data indicative of the output of the sensor 934 (FIG. 24). The nitrogen generating unit screen can also include a booster discharge temperature field 1084 configured to display a value indicative of the temperature of the gas discharged from the booster compressor 216A. For example, the field 1084 can be configured to display data indicative of the output of the temperature sensor 936.

This screen can also include a field 1086 configured to display a value indicative of the opening degree of the valve 742 (FIG. 24). In some embodiments, those values can be expressed as a percentage, 100% being fully opened.

The nitrogen generating unit screen can also include a field 1088 configured to display a flow rate of nitrogen being discharged from the associated system 200, 200A, 200B. For example, the field 1088 can be configured to display data indicative of the output from the sensor 654 (FIG. 19).

This screen can also include a field 1090 configured to display total amount of gas discharged from the associated system, 200, 200A, 200B. Thus, the ECU 841 can be configured to provide a running total of the amount of gas discharged from the associated system. Additionally, as noted above, the control panel 970 can include a totalizer reset 1016 (FIG. 39). As such, the reset 1016 can be configured to clear the running total displayed in the field 1090.

With continued reference to FIG. 40, the nitrogen generating unit screen can also include a field 1092 configured to display the purity of nitrogen discharged from the associated system. For example, the field 1092 can be configured to display data indicative of the output from the sensor 906 (FIG. 19).

The nitrogen generating unit screen can also include a field 1094 configured to display a temperature of the gases entering the membrane separation unit 266A. For example, the field 1094 can be configured to display data indicative of the output of the sensor 922 (FIG. 11). Finally, this screen can also include a field 1096 configured to display the pressure at the outlet of the feed air compressor 216A. For example, the field 1096 can be configured to display data indicative of the output of the pressure sensor 902 (FIG. 10). However, other fields can also be included.

Additionally, the nitrogen generating unit screen can also include a plurality of fields that are "active" in the sense that a user can touch the screen in these areas to select or trigger a function associated with that field. These fields, as used herein, are referred to as "buttons" for ease of description.

For example, as illustrated in FIG. 40, the nitrogen generating unit screen can include a next button 1100, a silence button 1102, a system configuration button 1104, a calibration button 1106, and a log out button 1108.

The next button 1100 is configured to trigger the ECU 841 to display the next screen; a plurality of such screens are described with reference to FIGS. 41-53. The silence button 1102 can be configured to silence all audible alarms associated with the display 840.

The system configuration button 1104 can be configured to cause the ECU 841 to display a system configuration screen on the display 840. Similarly, the calibration button 1106 can be configured to cause the ECU 841 to display a calibration screen on the display 840. Finally, the log out button 1108 can be configured to cause the ECU 841 to exit the operation mode of the system and require a password to be input before any further use of the display 840 is allowed.

Optionally, the nitrogen generating unit screen can include a graphical representation of the entire system associated with the control panel 970. In the illustrated embodiment, the system associated with the control panel 970 is the system 200A and the graphical representation 1110 is a graphical representation of a side elevational view of the system 200A.

Optionally, the graphical representation 1110 can include labels indicating the location at which the data from the various fields 1082-1096 are detected. For example, the graphical representation 1110 can include a position identifier 1112 schematically representing a general position on the system 200A at which the data in the booster discharge pressure field 1082 is detected. Optionally, indicators or labels similar to the label 1112 can be provided for each of the fields 1084-1096.

Further, the graphical representation 1110 can be configured to only generate such indicators when a user presses a portion of the screen in the vicinity of the fields 1082-1096. For example, the graphical representation 1110 can normally be displayed without any labels including the label 1112. Then, only if a user or operator presses the field 1082, does the ECU 841 generate the label 1112. This technique can be used for any or all of the fields 1082-1096 as well as any of the fields described below with reference to FIGS. 41-53.

Further, the ECU 841 can be further configured to only generate labels, such as the label 1112, if the data from the corresponding sensor or other component breaches a threshold value indicating an alarm or a time period for maintenance of that particular sensor or component. Optionally, the ECU 841 can be configured to cause such a label to blink and/or also trigger an audible alarm. As such, a user or operator is quickly and conveniently reminded of the location at which the corresponding sensor or component is located.

It is to be noted that the screens described below with reference to FIGS. 41-53 include some of the same data fields identified above with reference to FIG. 40. Thus, a description of those fields will not be repeated.

With reference to FIG. 41, the ECU 841 can also be configured to display a "compressor" screen which can be organized to illustrate data relevant to the operation of the booster compressor 246A. For example, in addition to the fields 1088, 1092, 1096 described above with reference to FIG. 40, the compressor screen can also include a compressor outlet temperature field 1120 configured to display a temperature of the gases discharged from the compressor. For example, the field 1120 can be configured to display data indicative of the output of the temperature sensor 936 (FIG. 24).

The compressor screen can also include a booster inlet pressure field 1122 configured to display a pressure at the inlet of the booster compressor 216A. For example, the field 1122 can be configured to display data indicative of the output of the sensor 908 (FIG. 19). Although the sensor 908 is disposed downstream from the membrane separation unit 266A, and thus, is not spatially close to the compressor 246A, the booster inlet pressure is affected by the operation of the feed air compressor 246A. For example, if the booster inlet pressure is too low, the compressor discharge pressure, which can be displayed in field 1096, can be raised until the booster inlet pressure is at an acceptable level. Thus, the compressor screen provides an advantage in that an operator has relevant information conveniently arranged for the operation of the system 200, 200A, 200B.

In addition to the "buttons" 1100, 1102, 1104, 1106, 1108 described above with reference to FIG. 40, the compressor screen can also include a previous button 1124 configured to allow a user to return to a previously viewed screen.

Additionally, the compressor screen includes a graphical representation 1126 including a schematic representation of a booster compressor. The graphical representation 1126 can include all the features and options described above with reference to the graphical representation 1110 illustrated in FIG. 40. Thus, the description of those features will not be repeated.

With reference to FIG. 42, the ECU 841 can also be configured to display a membrane section screen. In addition to the fields described above with reference to FIGS. 40 and 41, the membrane section screen can also include a heater inlet temperature field 1130 configured to display a temperature of the gases entering the heater device 540. For example, the field 1130 can be configured to display data indicative of the output of the temperature sensor 554 (FIG. 11). Additionally, the membrane section screen can also include a heater outlet temperature field 1132 configured to display a temperature of the gases discharged from the heater 540. For example, the field 1132 can be configured to display data indicative of the output of the temperature sensor 556 (FIG. 11).

Further, the membrane section screen can include a membrane inlet temperature field 1134 configured to display a temperature of the gases entering the membrane separation unit 266A. For example, the field 1134 can be configured to display data indicative of a temperature detected by the temperature sensor 922.

Finally, the membrane section screen can include a graphical representation 1136. In the illustrated embodiment, the graphical representation 1136 includes a schematic illustration of the membrane separation unit 266A as well as the filter assembly 251A. As such, as noted above with reference to the graphical representation 1110 of FIG. 40, the graphical representation 1136 can be modified to include indicators or labels corresponding to the status or state of the sensors and/or components displayed in the above noted fields.

With reference to FIG. 43, the ECU 841 can also be configured to display a booster screen configured to display data relevant to the operation of the booster compressor 216A. In addition to the fields described above, the booster screen can also include a booster first stage pressure field 1138 configured to display a pressure at the discharge at the first stage of the booster compressor 216A. For example, the field 1138 can be configured to display data indicative of the pressure detected by the pressure sensor 938 (FIG. 24). Additionally, the booster screen can include a booster second stage pressure field 1140 configured to display a pressure at the discharge of the second stage of the booster compressor 216A. For example, the field 1140 can be configured to display data indicative of the output of the pressure sensor 942 (FIG. 24).

The booster screen can also include a booster inlet temperature field 1142, a booster first stage temperature field 1144, and a booster second stage temperature field 1146. These fields 1142, 1144, 1146 are configured to display temperatures corresponding to the titles of those fields. For example, the field 1142 can be configured to display data indicative of the output of the sensor 926, the field 1144 can be configured to display data indicative of the output of the sensor 940, and the field 1146 can be configured to display data indicative of the output of the sensor 944.

The booster screen can also include a booster oil pressure field 1150 configured to display a pressure of the oil of the booster compressor 216A. For example, the field 1150 can be configured to display data indicative of the output of the sensor 948 (FIG. 24).

With continued reference to FIG. 43, the booster screen can also include a booster third stage temperature field 1152 configured to display a temperature of the third stage of the booster compressor 216A. For example, the field 1152 can be configured to display data indicative of the output of the temperature sensor 946 (FIG. 24).

Additionally, the booster screen can also include a graphical representation 1160 of the booster compressor 216A. As noted above with reference to the graphical representations 1110, 1126, 1136, the graphical representation 1160 can also be modified to include labels or indicators, the description of which will not be repeated.

Optionally, the ECU 841 can be configured to display an "all devices" screen configured to display the data from all sensors described above. Additionally, although not illustrated, the "all devices" screen can also include a graphical representation (not shown) of the entire system 200, 200A, 200B, such as the graphical representation 1110.

With reference to FIG. 45, the ECU 841 can also be configured to display a system configuration screen, for example, when a user activates the system configuration buttons 1104, to allow an operator to adjust various operating parameters of the ECU 841 and/or corresponding system 200, 200A, 200B.

With reference to 46, the ECU 841 can also be configured to display other screens configured for adjusting parameters of feedback control loops. For example, as illustrated in FIG. 46, the ECU 841 can be configured to display a membrane temperature and touch screen temperature control screens. With respect to the membrane temperature control field 1170, this screen includes a plurality of buttons 1172, 1174, 1176, and 1178 configured to allow a user or operator to set a temperature at which the ECU 841 is to use as a target temperature for maintaining the temperature of the gases output from the membrane separation unit 266A.

In the illustrated embodiment, the buttons 174, 176, 178 each provide the user the option of using a predetermined temperature setting of 130°, 100°, 115°, respectively. Additionally, the button 1172 allows a user to maintain a currently detected temperature, as displayed in the temperature field 1180. Another field, 1182 is configured to display the set temperature under which the system is operating.

The screen illustrated in FIG. 46 also includes a touch screen temperature tuning field 1184 that is configured to allow a user to adjust the sensitivity of the touch screen 840.

The screen of FIG. 46 also includes a membrane temperature control tuning button 1186. By depressing this button, the user advances to the screen illustrated in FIG. 47.

As shown in FIG. 47, a tuning screen allows a user to access a number of parameters for adjusting the operation of the feedback control routine used by the ECU 841 for maintaining a temperature discharged from the membrane separation unit 266A. In some embodiments, the ECU 841 uses the output of the sensor 926 to control the operation of the valves 544 to adjust the temperature of the gases discharged from the filtration unit 251A, which thereby controls the temperature of the gases discharged from the membrane separation unit 266A.

The remaining screens illustrated in FIGS. 48-54 provide means for a user or operator to adjust various settings with respect to different sensors and components of the corresponding system 200, 200A, 200B. The fields and buttons illustrated in these figures are generally self-explanatory to those of ordinary skill in the art. Thus, a further description of these screens is not set forth herein.

Additionally, with respect to the screens illustrated in FIGS. 40-44, any one of these screens can include an additional field (not shown) for displaying the output of the sensors included in the external sensors group 964 (FIG. 38). The ECU 841 can be configured to allow a user to edit any one of the screens illustrated in FIGS. 40-44 to include an additional field for displaying the output of such a sensor.

It is contemplated that inert gas, such as nitrogen rich gas ($N_2$), can be used for various applications. For example, the inert gas can be used in manufacturing facilities. In one embodiment, inert gas can be used in semiconductor manufacturing processes. Many kinds of inert gas (e.g., nitrogen gas) can be used to purge and provide an inert environment for semiconductor wafer processing. The inert environment prevents air from contacting materials that are prone to oxidation. Nitrogen can be used to purge equipment, such as equipment used in refineries or petrochemical plants. For example, inert gas can be employed to purge fluid lines containing explosive or flammable fluids. Many kinds of fluid lines can be purged of dangerous fluids before components in the fluid system are replaced or repaired. Inert gases can also be used in other settings, such as for packaging to prevent oxidation of packed items. Set forth below are additional examples of application for which the systems 200, 200A, 200B can be used.

Coal Mine Fire Suppression

For example, the systems 200, 200A, 200B, or other generation systems, can be used to suppress or stop underground coal mine fires. As is known in the art, underground coal mine fires can burn for years if fed by a source of air leaking into the coal mine from the atmosphere. Reducing or removing the available oxygen for combustion can extinguish these fires.

However, extinguishing coal fires is difficult given the large surface areas that would have to be treated with inert gas to stop the leak of oxygen into the mine. Such a large source of inert gas must have a sufficiently low content of oxygen to not only extinguish the fire, but to keep the fire out while the combustible materials cool down so that they do not reignite when oxygen eventually is reintroduced. The latest technologies include special foaming agents utilizing nitrogen or other inert gases as a carrier gas for the foam. The foam treats the surface of the coal ash on the unburnt coal fuel so as to provide a barrier that prevents oxygen from reaching the unburned coal. The foam also helps seal off crevices and leakage points to isolate the fire from incoming oxygen and contain the fire in desired locations within the mine. As such, fires are extinguished more quickly than with using nitrogen gas alone because the foam can better isolate and stop the spreading of fires within the mine.

The systems 200, 200A, 200B, or other systems, can be used to suppress coal mine fires, with or without a carbon dioxide separation process.

Thus, because the carbon dioxide removal device 380 can generate a significant back pressure, the flow rate and discharge pressure of gases from the system 210 can be higher if the gases are not passed through the carbon dioxide removal device 380.

In the application of coal mine fire suppression or extinguishing, the discharge pressures from the system 210 can be in the range of about 100-125 psig, as this is a common pressure range to use for foam generation or direct injection of nitrogen gas into a coal mine fire. Thus, in some applications, it is not necessary to run the booster compressor 330.

Additionally, often times, mines are equipped with high capacity air compressors. Thus, with reference to FIG. 7, the source 390 can be in the form of an air compressor at the site of a coal mine. Such compressed air can be delivered directly to the intake conduit 386 and thus passed through the separation device 266 to generate the desired nitrogen gas. Further, this technique can also be used if the engine 220 and/or the compressor 246 are inoperable.

In some embodiments, the purity of the inert gas, such as nitrogen gas, can be adjusted by adjusting the capacity of the separation device 266, 266'. For example, as illustrated with reference to FIG. 7H, the separation unit 266' can be adjusted so as to activate or deactivate the desired number of separation devices 266, 266a, 266b. For example, as noted above, the valves 265, 265a, 265b, 273, 273a, 273b, can be opened and closed to activate or deactivate the separation devices 266, 266a, 266b, and thereby adjust the purity of the gas discharged from the device 266.

In some embodiments, the back pressure regulator valve 233 (FIG. 7) can be adjusted to adjust the flow rate of exhaust gas through the system 210. Optionally, further purity control can be achieved by adjusting the speed of the engine 220. For example, the speed of the engine 220 can be reduced, thereby lowering the volumetric flow rate of exhaust gases out of the engine 220 and the amount of ambient air mixed into the mixing plenum 229 can be reduced such that more exhaust gas is delivered to the compressor 246. As such, the oxygen content of the exhaust gas will be lower and thus a higher level of "purity" can be obtained. Additionally, other adjustments can be made to the system 210 to achieve the desired flow rate, output pressure, and purity. For example, as noted above, the valve 322 can also be adjusted to change the output pressure and purity of the gas discharged from the system.

Well Construction

The systems 200, 200A, 200B can also be used during the construction of a well. For example, as is known in the art, a dry inert gas is desirable for assisting drilling operations of vertical and horizontal wells. For example, nitrogen gas can be added to a drilling mud when a drill string is being used to drill a new well. Additional nitrogen gas can be added if a drill string becomes stuck during drilling because of lost or reduced circulation or low pressure zones or when more velocity is required to lift drill cuttings from the well bore.

When the drill string has cut the well to the desired or "critical" depth, a casing pipe is typically cemented into place to protect the well bore. During this process, nitrogen can be used to assist the cementing process. For example, nitrogen can be added to the cement as the cement is pumped into the casing and returned back up the annulus, creating a bond between the well bore and the casing outside protecting the well bore. This process can be used when the cement hydrostatic pressure is higher than the well bore pressure, which in turn could cause lost or reduced circulation and loss of cement height required to protect the well bore in segregated zones. During such construction processes, nitrogen can be supplied up to about 5,000 standard cubic feet per minute (scfm) at pressures up to about 5,000 psi. Such cementing procedures are described above with reference to FIGS. 1-4.

With the systems 200, 200A, 200B, or other similar systems, the purity of the inert gas discharged from these systems 200, 200A, 200B can be adjusted to be about 95% or higher. Additionally, the booster compressor 330 or an additional booster compressor may be used to inject the gas discharged from the separation unit 266, 266' into the well or cementing system.

As noted above, during these procedures, the purity of the gas discharged from the separation unit 266, 266', can be adjusted by adding or deleting active membranes, as described above with reference to FIG. 7H. Additionally, the purity of the gas discharged from the systems 210, 210', can be adjusted by adjusting the flow rate of the exhaust gas through the separation units 266 by adjusting the back pressure regulator valve 233. Further purity control can be achieved by adjusting the speed of the engine 220 and/or the compressor 246. Additionally, as noted above, the valve 322 can also be adjusted to change the output pressure and purity of the gas discharged from the system.

Under Balanced Drilling (UBD)

Dry inert gas, such as nitrogen gas, is commonly used to assist drilling for hydrocarbons in vertical and in horizontal wells where the well bore pressure is lower than the hydrostatic pressure of the drilling mud used during drilling. For example, nitrogen gas can be added to the drilling mud at a rate required to reduce the hydrostatic pressure of the well bore to reduce losses of hydrocarbon to the bearing zone around the bore or to allow the hydrocarbon bearing zone to produce hydrocarbons during drilling. Further, using a gas such as nitrogen gas to reduce the hydrostatic pressure of the mud can help drilling through lost or lowered circulation zones or to increase the rate of penetration (ROP) of the drilling process.

The drilling mud flow rate can produce enough velocity and volumetric flow to return drill cuttings back to the surface. In some applications, the drilling mud or fluid may be nitrogen gas alone pumped at a rate sufficient to carry drill cuttings upwardly to the surface. This flow rate could be as high as about 5,000 standard cubic feet per minute at pressures up to about 5,000 psi.

Drilling of such wells can be performed using a drill string and bit rotated by surfaced equipment and/or the use of a down hole positive displacement motor (PDM). Such drill strings can be conventional jointed pipes deployed with a conventional drilling rig, a hydraulic work over rig, or a coil tubing strings deployed with an injector system.

Using the systems 200, 200A, 200B, or a similar system, lower discharge pressures can be used, for example, pressures from about 15 to 350 psig. Thus, the booster compressor 330 can be shut down or otherwise not used for these types of applications. Additionally, for underbalanced drilling, nitrogen purities at about 95% or higher can be used. However, there are other applications where higher purities are recommended. For example, but without limitation, where the well contains certain sensitive chemicals such as $H_2S$, also known as "sour gas," higher purity nitrogen should be used, for example, up to about 99.5% nitrogen, due to the corrosive effects of the sour gas on the drill string.

As in other applications, the nitrogen purity can be adjusted in several different ways. For example, with reference to FIG. 7H, the number of separation units 266, 266a, 266b can be adjusted by operating the valves noted above. Further, the flow rate of exhaust gas directed to the separation device 266 can be adjusted by adjusting the back pressure regulator valve 233. Additionally, the speed of the engine 220 and/or the speed of the compressor 246 can be adjusted to adjust the volume of exhaust gas directed to the separation unit 266. As noted above, the valve 322 can also be adjusted to change the output pressure and purity of the gas discharged from the system.

In under balanced drilling operations where higher pressures are desired, such as pressures above 350 psig, the booster compressor 330 can be operated to raise the pressure. For example, the booster compressor 330 can be set to raise the pressure of the gas discharged from the separation unit 266 up to about 5,000 psig.

Well Bore Maintenance

Well bore maintenance procedures often incorporate an inert dry gas. For example, after a well has been constructed and completed, the well will start to produce hydrocarbons. From time to time, the well may require maintenance if production starts to decrease.

For example, the well bore may benefit from being cleaned out, stimulated, or gas lifted. In these procedures, nitrogen gas is often injected alone or with other fluids through the completion string, a jointed tubing, or coil tubing, back to the surface so as to lift out debris such as sand, water, sludge, organic matter, or scale. This procedure restores the flow rate of hydrocarbons into and up through the well bore.

Occasionally, well bores may also need stimulation to start or restart the flow of hydrocarbons or to maintain hydrocarbon production. Such stimulation techniques can include acidizing, chemical treatments, fracturing, or gas lifting. In these procedures, nitrogen gas can be used to flush out the stimulation fluids noted above and return them back to the surface. For example, the nitrogen can be used to reduce the hydrostatic pressure of the stimulation fluids used and to creating energy in the well bore to push these fluids back to the surface. Flow rates of the nitrogen gas can be as high as about 5,000 standard cubic feet per minute at pressures up to about 5,000 psi.

The systems 200, 200A, 200B can be used to perform these types of well bore maintenance procedures. Typically, nitrogen gas at a purity of about 95% or higher can be used.

As noted above, the purity of the nitrogen gas discharged by the systems 200, 200A, 200B can be adjusted by adding or deleting membrane units 266, adjusting the flow rate of exhaust gas through the separation devices 266, or by adjusting a back pressure regulator valve 233. Optionally, the purity can also be affected by adjusting the speed of the engine 220 and/or the compressor 246. As noted above, the valve 322 can also be adjusted to change the output pressure and purity of the gas discharged from the system.

Enhanced Oil (and/or Gas) Recovery (EOR)

After a well has produced for a significant amount of time, large voids can be left behind within the producing formation and additionally, the pressure within the formation can be reduced over time. Thus, nitrogen gases can be used to fill the voids left behind and to increase the pressure of the formation.

As such, the production from the formation and the life of the field itself can be improved. For example, nitrogen gas or other inert gases can be injected directly into the void spaces, an injection well can be drilled into the same formation through which the gas can be injected, or additional formation pressure can be generated through other artificial means to enhance the production from the well.

Additionally, nitrogen gas or other inert gases can be used to enhance oil and gas recovery by injection into an injection string or gas lift mandrel in the production string. For example, nitrogen gas can be continuously added to the production to reduce the hydrostatic pressure and thereby increase the velocity of the hydrocarbon, even though the formation pressure has decreased below a critical flow pressure point.

In using the systems 200, 200A, 200B, or other similar systems, nitrogen gas can be generated at about 95% or higher purity and the booster compressor 330 can also be used. As noted above, the purity of the nitrogen can be adjusted by adding or deleting separation units (FIG. 7H), by adjusting the flow of exhaust gas through the separation units 266, and/or adjusting a back pressure regulator valve 233. Additionally, the purity of the discharged gas can be controlled by changing the speed of the engine 220 and/or the speed of the compressor 246. As noted above, the valve 322 can also be adjusted to change the output pressure and purity of the gas discharged from the system. In these applications, the flow rates for nitrogen gas can be as high as about 5,000 standard cubic feet per minute and up to pressures of about 5,000 psi.

Pipeline Purging, Drying, And Pressure Testing

In applications such as pipeline purging, drawing, and pressure testing, an inert dry gas is often used to displace chemicals, volatile materials, or moisture within plant processing systems or operating pipelines. For example, an inert dry gas, such as nitrogen, can be used to directly displace such fluids out of the pipes or to push a "pig" or other internal plug to displace the materials remaining in the piping or pipeline. Dry nitrogen is a preferred gas for its flame retardant properties and its inert nature.

The pigs noted above can also be used to scrape the pipeline in preparation for inspection, corrosion treatment, or pressure testing. It is often desirable that moisture is removed from such pipelines as well. Thus, in these applications, it is desirable to use an inert gas with a low dew point (e.g. −40° F. or lower) to achieve a sufficiently fast drawing of the pipeline. Further, hot dry gases also accelerate the drying process.

In using the system 200, 200A, 200B, or other similar systems for pipeline purging, drying, and/or pressure testing, the systems 200, 200A, 200B can be operated at lower pressures, for example, but without limitation, about 15 to about 350 psig. Thus, in such applications, the booster compressor 330 is not required.

Typically, for these types of applications, the gas generated by the systems 200, 200A, 200B can be a nitrogen gas at about 95% or higher purity. Some applications require higher purities. For example, in catalyst regeneration applications in which an oxygen sensitive catalyst is being removed or replaced, it is desirable to use nitrogen gas of at least about 99% or higher purity.

In applications where very low dew points are desired, higher purity is advantageous because the higher the nitrogen purity, the lower the dew point of the gas. Thus, higher purity nitrogen gas is desirable for low dew point applications. Further, in applications where other sensitive chemicals are present, a higher nitrogen purity, such as about 99.5% nitrogen or higher, may be desirable.

As noted above, the purity of the nitrogen discharged from the systems 200, 200A, 200B can be adjusted by adding or deleting membranes 266, or adjusting the flow of exhaust gas through the separation devices 266 by adjusting a back pressure regulator valve 233. The purity of the nitrogen gas can also be adjusted by changing the speed of the engine 220 and/or the speed of the compressor 246 so as to change the volume of exhaust gas directed to the separation units 266. As noted above, the valve 322 can also be adjusted to change the output pressure and purity of the gas discharged from the system. Optionally, a dew point analyzer device (not shown) can be included in either of the systems 200, 200A, 200B to provide a reading on the dew point of the gas discharged from the systems 200, 200A, 200B.

As described above with reference to FIG. 7, the systems 200, 200A, 200B can also include the bypass 392 for directing the gases discharged from the separation unit 266 to a heating device 397. This bypass 392 allows the discharge gas to be reheated through heat from the exhaust gas from the engine 220. However, other heaters can also be used.

For such applications, preferably, the systems 200, 200A, 200B can include inlet and outlet pressure gauges, temperature gauges, etc., and these parameters can be used to trigger safety alarms and for controlling shut down protocols. Additionally, fluid flow meters can also be provided at various points in the systems 200, 200A, 200B, including the inlets and outlets therefrom.

For applications requiring higher pressures, such as pneumatic testing, relief valve testing, or other applications requiring pressures above 350 psig (for example, up to about 5,000 psig), the booster compressor 330 can be used to raise the fluid discharged from the separation unit 266 up to such pressures. In applications where it is desired to raise the temperature of high pressure fluid, i.e., fluid discharged from the booster compressor 330, the fluid can be directed through the bypass line 395 to flow through the bypass 392 to the heater 397.

Shipboard Inerting of Chemical and Oil Tankers

As is known in the art, maritime regulations require certain chemical tankers, crude oil tankers, and liquid natural gas (LNG) tankers to have a "pad" of inert gas within the cargo tanks. The "pad" is used to reduce the concentration of oxygen such that there is insufficient oxygen to support combustion. For example, typically, it is required that there is less than 8% and as low as 0.5% oxygen in such storage tanks depending on the safety factors applied in the particular commercial practice.

The inert gas can also be used to pressurize chemical tanks as they are unloaded, for example, to replace the void created within the tank as the desired fluid is removed from the tank. As such, the inert gas provides a constant positive pressure of inert gas within the filled tank which prevents venting and contamination by the ingress of air that might have been drawn into the void.

As noted above, flue gas systems can use combustion of hydrocarbon fuels and air to generate low oxygen gases. However, these systems also generate high percentages of carbon dioxide (typically over 10%) which is a normal product of combustion. Thus, such high carbon dioxide content exhaust gases may not be appropriate for tanks containing chemicals that react with carbon dioxide. Additionally, carbon dioxide can be acidic in the pressure of moisture.

Thus, flue gas from combustion sources are not always acceptable as a "padding gas" even though it may be considered to be generally inert. In applications where flue gas can be used, some known flue gas systems have supplemental "gas topping" inert gas generators and compressors that operate at positive pressures because flue gas pressure is usually too low to properly pressurize cargo tanks.

In using either of the systems 200, 200A, 200B, or other similar systems for shipboard inerting, nitrogen gas of a desirable purity can be used for all of these applications. Additionally, because the systems 200, 200A, 200B are configured to deal with the normal contaminants from fuel air combustion, the systems 200, 200A, 200B can also accept exhaust gases from other systems.

For example, as noted above, the source 390 (FIG. 7) can be an exhaust system of a shipboard engine. As described in detail above, the filtration unit 251 is configured to deal with the typical types of contaminants found in exhaust gases from air/fuel combustion engines. Additionally, the systems 200, 200A, 200B can also operate using only the exhaust gases from the engine 220 or a mix of atmospheric air and the exhaust gas from the engine 220. Optionally, the systems 200, 200A, 200B can operate on a mix of ambient atmospheric air, the exhaust gas from the engine 220, and/or other flue or exhaust gases from the source 390.

As noted above, the filtration unit 251 can be configured to remove carbon dioxide, sulfur, oxides of nitrogen, and other contaminants. Thus, the systems 200, 200A, 200B can utilize flue gases that are plentiful and available on ships and use those gases, after being passed through the filtration unit 251, in applications for which flue gas has previously been unacceptable.

As noted above, the purity of the nitrogen gas discharged from the systems 200, 200A, 200B can be adjusted by activating or deactivating separation units within the separation unit 266, adjusting the flow rate of the exhaust gas from the engine 220 by adjusting the back pressure regulator valve 233. Optionally, the flow of exhaust gas can also be changed by adjusting the speed of the engine 220 and/or the speed of the compressor 246. As noted above, the valve 322 can also be adjusted to change the output pressure and purity of the gas discharged from the system.

The systems 200, 200A, 200B can produce an inert gas that is relatively dry, e.g., with water content in the parts per million range. Most currently available flue gas systems cannot generate useable gases with such a low moisture content. Because of the low flow and pressure requirements for cargo tank padding, higher pressure storage tanks on a ship can be filled with the systems 200, 200A, 200B, either on the ship or at a terminal. Thus, the high capacity high pressure storage tanks can eliminate the need for an onboard gas generator system, even eliminating the need for flue gas systems currently used. Further, the dry nitrogen gas produced by the systems 200, 200A, 200B can also be used for instrument air or other shipboard requirements.

The various methods and techniques described above provide a number of ways to carry out the disclosed embodiments. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the inventions.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, the inventions are not intended to be limited by the specific disclosures of preferred embodiments herein.

What is claimed is:

1. A system configured to separate nitrogen from atmospheric air comprising:
    a feed air compressor unit having a screw compressor with an inlet and outlet driven by an air/fuel engine so as to compress atmospheric air to a pressure of at least 200 psi at the outlet of the screw compressor;
    a filtration assembly comprising at least first, second, third, and fourth coalescence filters supported on a filter frame, the first, second, and third coalescence filters being connected in series with an inlet of the first coalescence filter connected to the outlet of the screw compressor, the first, second, third, and fourth coalescence filters disposed adjacent to each other on the filter frame;
    a carbon tower filter having an inlet communicating with an outlet of the third coalescence filter and an outlet of the carbon tower filter being connected to an inlet of the fourth coalescence filter, the carbon tower filter being disposed in a position that is not spatially between the third and fourth coalescence filters;
    a heater device having an inlet connected to an outlet of the third coalescence filter and an outlet connected to an inlet of the carbon tower filter;
    a membrane separation assembly having a plurality of membrane separation devices arranged in at least first and second vertical stacks, at least first and second vertical members supporting the first and second vertical stacks, at least the first vertical member defining either an inlet or an outlet manifold of a plurality of the membrane separation devices, and inlet of the membrane separation assembly being connected to an outlet of the fourth coalescence filter and being configured to distribute a filtered gas from the fourth coalescence filter to inlets of a plurality of the membrane separation devices, the heater device and being supported by at least one of the first and second vertical members;
    a booster compressor having an inlet connected to an outlet of the membrane separation assembly and configured to raise a pressure of nitrogen rich gas discharged from the membrane separation assembly, the booster compressor having an engine driving a compressor device having an outlet, the compressor device being configured to raise a pressure of the nitrogen rich gas to at least 1000 psi; and
    a control cab having an electronic control system comprising at least a first sensor being configured to detect an operational parameter of the feed air compressor, at least a second sensor being configured to detect an operational parameter of the membrane separation assembly, and at least a third sensor configured to detect an operational parameter of the booster compressor, the electronic control system comprising an electronic control unit connected to the first second and third sensors and configured to allow an operator of the electronic control system to monitor the output of the first, second, and third sensors; and
    a wheeled vehicle supporting the feed air compressor, the filtration assembly, the carbon tower filter, the heater device, the membrane separation assembly, the booster compressor, and the control cab.

2. The system according to claim 1, wherein the wheeled vehicle comprises a trailer configured to be towed on a highway.

3. The system according to claim 1, wherein the wheeled vehicle comprises a flatbed truck.

4. The system according to claim 3, wherein at least one of the engines of the feed air compressor and the booster compressor is also configured to provide shaft power to at least one wheel of the flatbed truck.

5. The system according to claim 1, wherein the wheeled vehicle comprises at least one pair of wheels, and wherein the booster compressor and the feed air compressor are disposed on opposite sides of the at least one pair of wheels.

6. The system according to claim 1 additionally comprising an auxiliary sensor input port configured to be connected to a sensor disposed external to and is not supported by the wheeled vehicle.

7. The system according to claim 1, wherein the electronic control system comprises a graphical user interface having at least first, second, and third screens, the first screen being configured to display data indicative of the output of the first sensor, the second screen being configured to display data indicative of the output of the second sensor, and the third screen being configured to display data indicative of the output of the third sensor.

8. The system according to claim 1 additionally comprising a heater system configured to circulate lubricant from at least one of the feed air compressor and the booster compressor to the heater device.

9. The system according to claim 1, wherein the inlet of the screw compressor is connected to an exhaust outlet of the air fuel engine.

10. A system configured to separate a component gas from atmospheric air comprising:
    a plurality of membrane separation devices supported by at least first and second generally vertical members, at least one of the generally vertical members defining an intake or discharge manifold for the plurality of membrane separation devices;
    a heater device supported by at least one of the first and second generally vertical members; and
    a filtering device connected, in series, between the heater device and one of the plurality of membrane separation devices.

11. The system according to claim 10 additionally comprising a feed air compressor configured to pressurize atmospheric air and deliver the pressurized atmospheric air to an inlet of the plurality of membrane separation devices.

12. The system according to claim 11 additionally comprising a booster compressor configured to raise a pressure of the inert gas discharged from the plurality of membrane separation devices.

\* \* \* \* \*

UNITED STATES PATENT AND TRADEMARK OFFICE
CERTIFICATE OF CORRECTION

| | | |
|---|---|---|
| PATENT NO. | : 7,588,612 B2 | Page 1 of 1 |
| APPLICATION NO. | : 11/489698 | |
| DATED | : September 15, 2009 | |
| INVENTOR(S) | : Marwitz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 282 days.

Signed and Sealed this

Twenty-first Day of September, 2010

David J. Kappos
*Director of the United States Patent and Trademark Office*